United States Patent [19]

Sasaki

[11] 4,349,616

[45] Sep. 14, 1982

[54] DISAZO PIGMENT CONTAINING ELECTROPHOTOGRAPHIC ELEMENT

[75] Inventor: Masaomi Sasaki, Shizuoka, Japan

[73] Assignee: Ricoh Co., Ltd., Tokyo, Japan

[21] Appl. No.: 218,383

[22] Filed: Dec. 19, 1980

[30] Foreign Application Priority Data

| | | | |
|---|---|---|---|
| Dec. 28, 1979 | [JP] | Japan | 54-170421 |
| Dec. 28, 1979 | [JP] | Japan | 54-170422 |
| Dec. 29, 1979 | [JP] | Japan | 54-172602 |
| Apr. 23, 1980 | [JP] | Japan | 55-54632 |
| Oct. 13, 1980 | [JP] | Japan | 55-141923 |
| Nov. 26, 1980 | [JP] | Japan | 55-167015 |
| Nov. 26, 1980 | [JP] | Japan | 55-167016 |

[51] Int. Cl.$^3$ .......................... G03G 5/06; G03G 5/14

[52] U.S. Cl. .......................................... 430/58; 430/71; 430/72; 430/75; 430/76; 430/79; 260/160; 260/188

[58] Field of Search ........................ 430/58, 59, 71, 72, 430/75, 79, 76; 260/160, 188

[56] References Cited

U.S. PATENT DOCUMENTS 4,272,598 6/1981 Sasaki et al. .......................... 430/72

*Primary Examiner*—Roland E. Martin, Jr.

*Attorney, Agent, or Firm*—Blanchard, Flynn, Thiel, Boutell & Tanis

[57] ABSTRACT

An electrophotographic element comprising an electrically conductive substrate and a monolayer or multilayer type photo-sensitive layer, superposed thereon, containing as an effective ingredient a disazo pigment having the general formula (I):

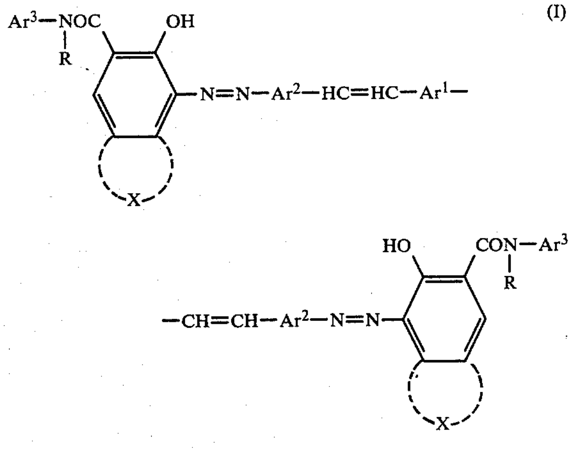

(I)

wherein $Ar^1$ and $Ar^2$ each represent a phenylene group. However, when $Ar^1$ is 1,4-phenylene group $Ar^2$ is 1,2- or 1,3-phenylene group; when $Ar^1$ is 1,3-phenylene group $Ar^2$ may be any one of 1,2-, 1,3- and 1,4-phenylene groups; and when $Ar^1$ is 1,2-phenylene group $Ar^2$ is 1,3-phenylene group. X represents aromatic rings such as benzene ring, naphthalene ring and the like, hetero rings such as indole ring, carbazole ring, benzofuran ring and the like or their substitution products; $Ar^3$ represents aromatic rings such as benzene ring, naphthalene ring and the like, hetero rings such as dibenzofuran ring and the like or their substitution products; and R represents a hydrogen atom, a lower alkyl group, phenyl group or its substitution product.

19 Claims, 4 Drawing Figures

DISAZO PIGMENT CONTAINING ELECTROPHOTOGRAPHIC ELEMENT

BACKGROUND OF THE INVENTION (1) Field of the Invention

This invention relates in general to an electrophotographic element, and in particular to a novel electrophotographic element which comprises a photosensitive layer containing as an effective ingredient a disazo pigment having the general formula (I):

(I)

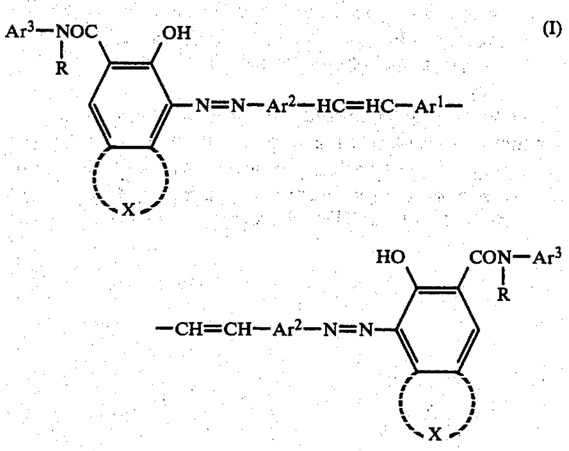

(wherein $Ar^1$ and $Ar^2$ can each represent a phenylene group. However, when $Ar^1$ is 1,4-phenylene group $Ar^2$ is 1,2- or 1,3-phenylene group; when $Ar^1$ is 1,3-phenylene group $Ar^2$ may be any one of 1,2-, 1,3- and 1,4-phenylene groups; and when $Ar^1$ is 1,2-phenylene group $Ar^2$ is 1,3-phenylene group. X can represent aromatic rings such as benzene ring, naphthalene ring and the like, hetero rings such as indole ring, carbazole ring, benzofuran ring and the like or their substitution products; $Ar^3$ can represent aromatic rings such as benzene ring, naphthalene ring and the like, hetero rings such as dibenzofuran ring and the like or their substitution products; and R can represent a hydrogen atom, a lower alkyl group, phenyl group or its substitution product.)

(2) Description of the Prior Art

As light-sensitive materials which have long been utilized in electrophotographic elements, there are widely known inorganic light-sensitive materials such as amorphous selenium, selenium alloys, calcium sulfide, zinc oxide, etc., poly-N-vinyl carbazole and its derivatives.

It is known that among them, the amorphous selenium and selenium alloys are universally put to practical use because of the fact that they possess exceedingly superior characteristics indispensable for electrophotographic elements. However, the amorphous selenium is observed to be defective in that its light sensitive wavelength region is limited to the blue region and is scarcely sensitive to the red region.

Various kinds of methods have hitherto been proposed in order to widen the sensitivity to the long wave regions. However, the fact is that the sensitivity of the amorphous selenium to the long wave light is not improved to such a degree as intended by those methods because the selection of the light sensitive wavelength region is subjected to various limitations. In the case of utilizing zinc oxide or cadmium sulfide as light-sensitive material, it is needed to add various kinds of sensitizers in order that said zinc oxide or calcium sulfide may serve for practical purposes, because the light sensitive wavelength region of these materials is also limited.

While the poly-N-vinyl carbazole, universally known as organic photoconductive material, is abundant in superior abilities such as transparency, film forming ability, flexibility, hole transportability and the like, it is observed to be defective in that it is itself scarcely sensitive to 400 to 700 nm visible light wave length.

As a photosensitive element which has successfully overcome the above mentioned deficiencies, Japanese Patent Publication No. 10496/1975 discloses one utilizing therein a charge transfer complex consisting of poly-N-vinyl carbazole and 2,4,7-trinitrofluorenone.

In Japanese Patent Publication Nos. 5349/1970, 3168/1974, 14914/1975, 10982/1976, etc. are further discussed photosensitive elements of the type which comprises, in successive layers; a charge carrier generating layer formed of amorphous selenium or selenium alloy and a charge transfer layer, each layer being designed to play a part allotted thereto.

Still further, the following different photosensitive elements of the type which comprises, in successive layers, a charge carrier generating layer including a different kind of pigment and a charge transfer layer, have hitherto been developed. U.S. Pat. No. 3,837,851 discloses a photosensitive element which comprises a charge carrier generating layer and a charge transfer layer including at least one tri-arylpyrazoline. In U.S. Pat. No. 3,850,630 is disclosed a photosensitive element which comprises a transparent charge transfer layer and a charge carrier generating layer including an indigo dye. U.S. Pat. No. 3,871,882 discloses a photosensitive element which comprises a charge carrier generating layer including a perylene pigment derivative and a charge transfer layer including a condensate of 3-bromopylene and formaldehyde. Japanese Laid-open Patent Application No. 133445/1978 discloses a photosensitive element which comprises a transparent charge transfer layer and a charge carrier generating layer including a disazo pigment having astilbene skeleton. Some of the above mentioned photosensitive elements have already been commercially available. However, the fact is that there have not been developed yet photosensitive elements capable of satisfying various proposed properties in a satisfactory degree.

SUMMARY OF THE INVENTION

The inventor has carried out various studies to thereby discover that a compound having the general formula referred to below, when utilized in electrophotographic elements, works effectively as the charge carrier generating material or photoconductive material. The present invention has been completed on the basis of this discovery.

It is therefore a primary object of this invention to provide a charge carrier generating material which has a flat sensitivity to the visible light region, in particular the short wavelength region and thereby provide an electrophotographic element which is capable of exhibiting a superior reproducibility in the visible light region irrespective of various kinds of light sources to be employed in electrophotographic copying machines. It is another object of this invention to provide an electrophotographic element containing as the effective ingredient a charge carrier generating material capable of exhibiting a higher sensitivity to the visible light region, in particular the short wavelength region as compared with conventional charge carrier generating materials.

In other words, the electrophotographic element according to the present invention is characterized in that it comprises an electrically conductive substrate and a photosensitive layer, superposed thereon, containing as an effective ingredient a disazo pigment having the general formula:

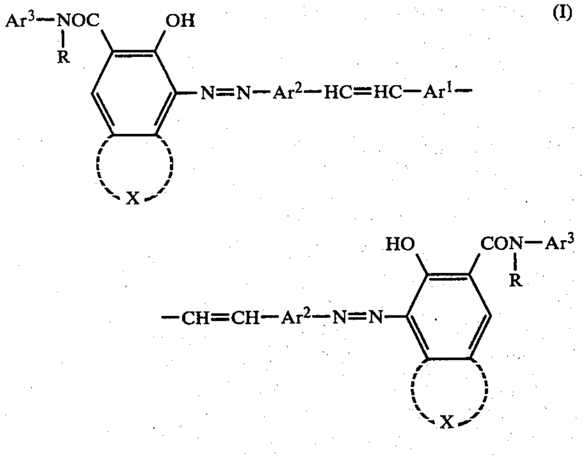
(I)

(wherein $Ar^1$ and $Ar^2$ can each represent a phenylene group. However, when $Ar^1$ is 1,4-phenylene group $Ar^2$ is 1,2- or 1,3-phenylene group; when $Ar^1$ is 1,3-phenylene group $Ar^2$ may be any one of 1,2-, 1,3- and 1,4-phenylene groups; and when $Ar^1$ is 1,2-phenylene group $Ar^2$ is 1,3-penylene group. X can represent aromatic rings such as benzene ring, naphthalene ring and the like, hetero rings such as indole ring, carbazole ring, benzofuran ring and the like or their substitution products; $Ar^3$ can represent aromatic rings such as benzene ring, naphthalene ring and the like, hetero rings such as dibenzofuran ring and the like or their substitution products; and R can represent a hydrogen atom, a lower alkyl group, phenyl group or its substitution product.)

The disazo compounds having the above mentioned general formula (I) may be classified into six types according to the bonding modes of $Ar^1$ with $Ar^2$. These modes may be represented by the following general formulas (II) to (VII), wherein

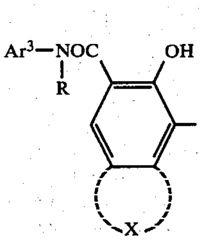
is abbreviated as A:

(II)
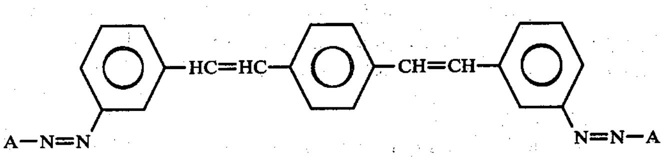

(III)
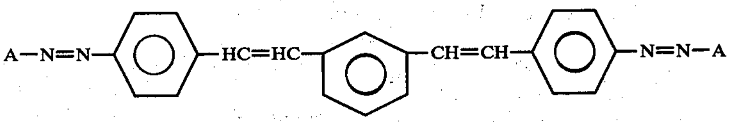

(IV)
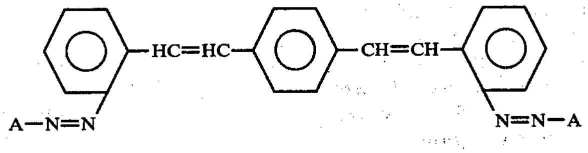

(V)
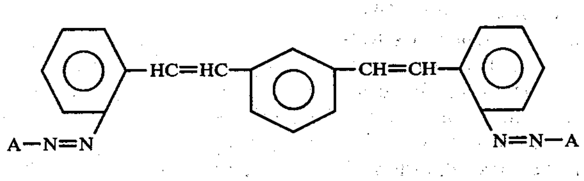

-continued
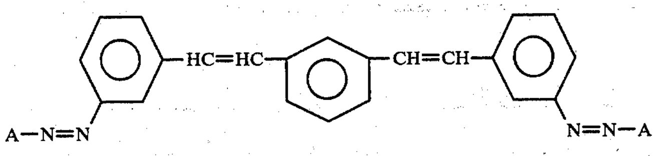
(VI)
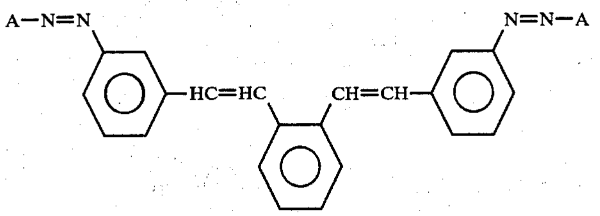
(VII)
The disazo compounds having the above mentioned general formula (I) suitably used in the present invention can be specifically represented by the following structural formulas in accordance with the aforesaid types:
(1) Disazo pigments having the general formula (II)
| Pigment No. | Structural formula |
|---|---|
| II-1 | 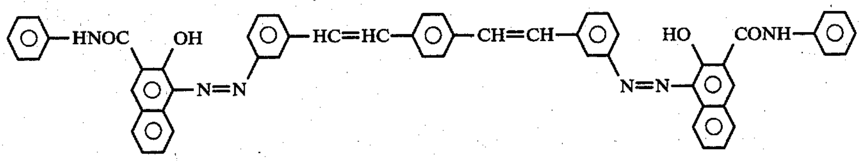 |
| II-2 | 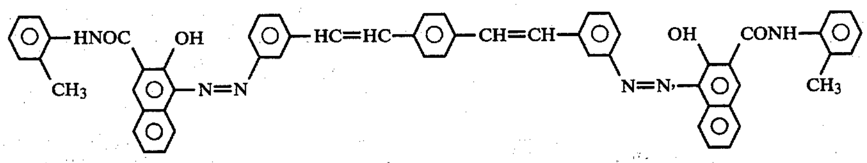 |
| II-3 | 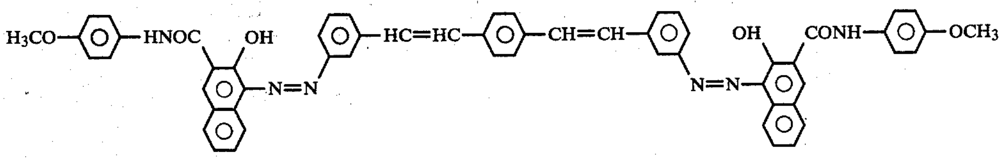 |
| II-4 | 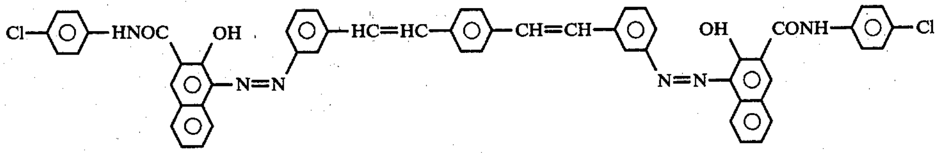 |
| II-5 | 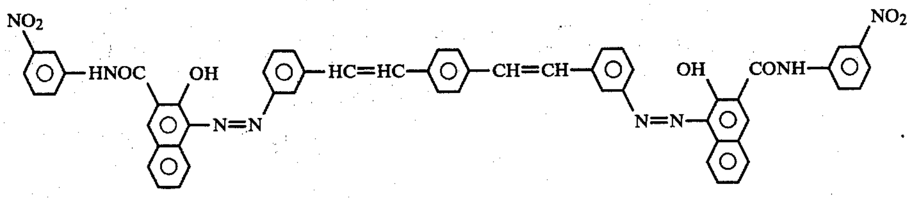 |
| II-6 | 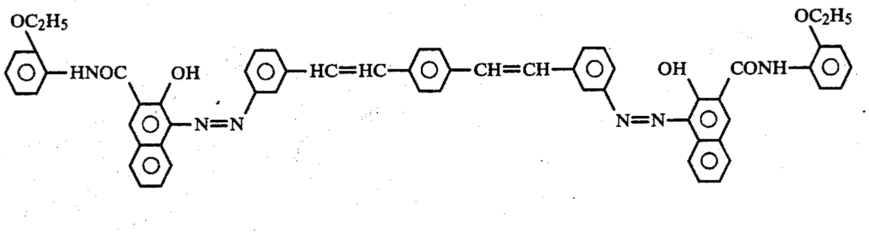 |

-continued
| Pigment No. | Structural formula |
|---|---|
| II-7 | 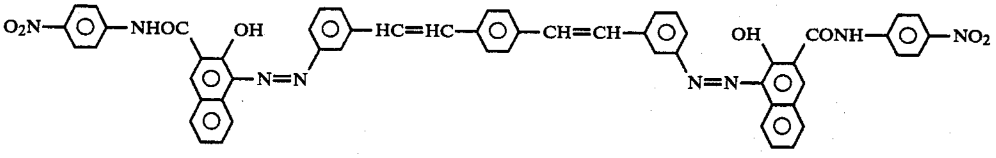 |
| II-8 | 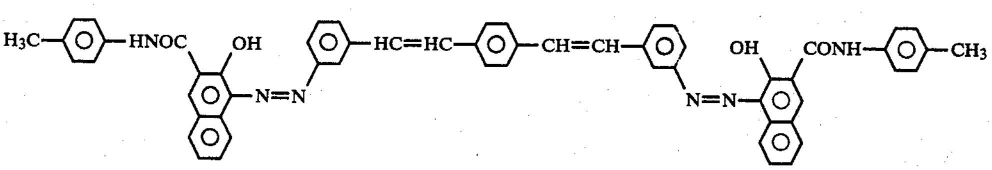 |
| II-9 | 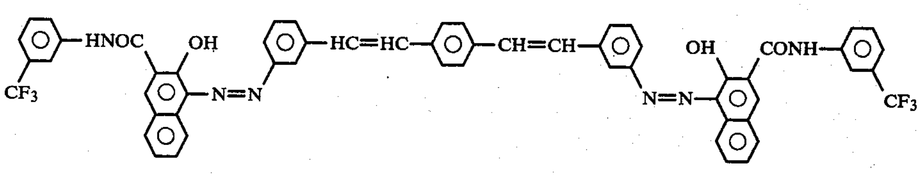 |
| II-10 | 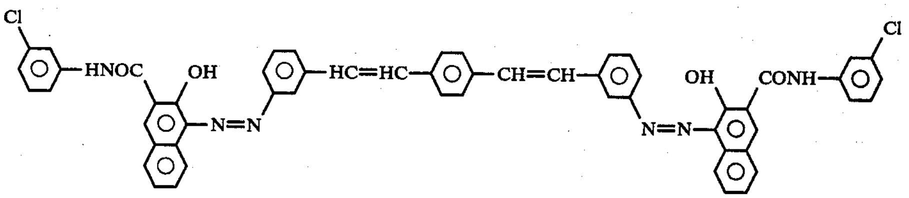 |
| II-11 | 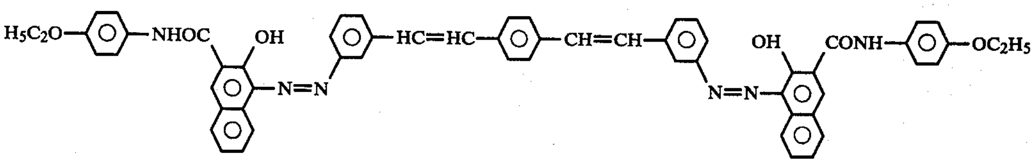 |
| II-12 | 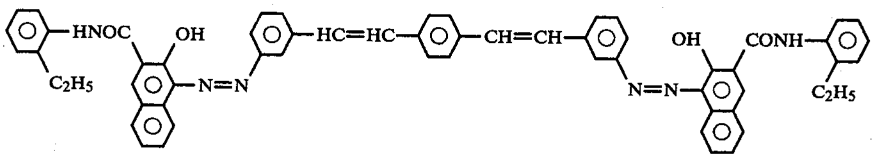 |
| II-13 | 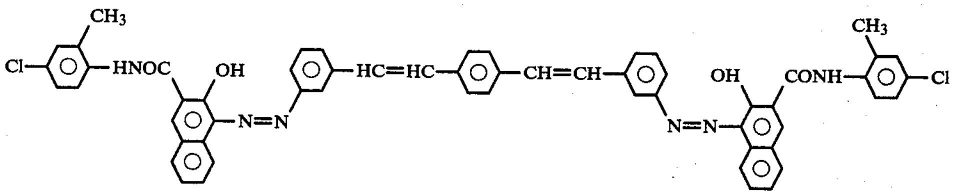 |
| II-14 | 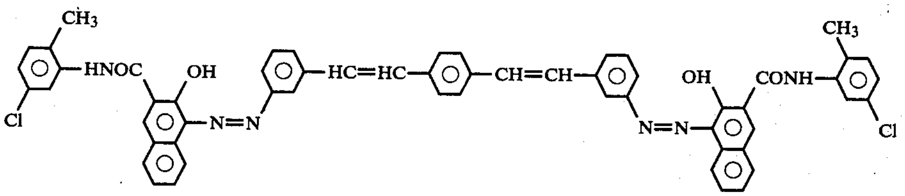 |

-continued
| Pigment No. | Structural formula |
|---|---|
| II-15 | 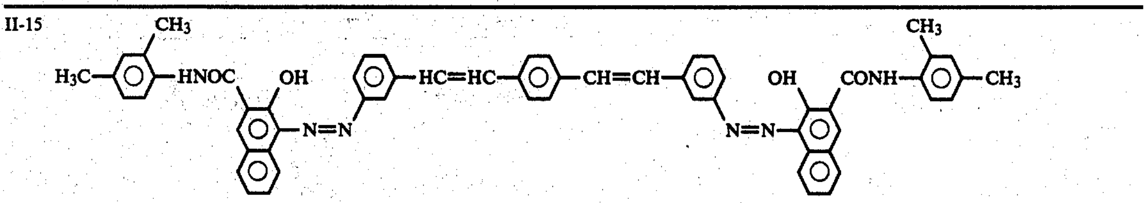 |
| II-16 | 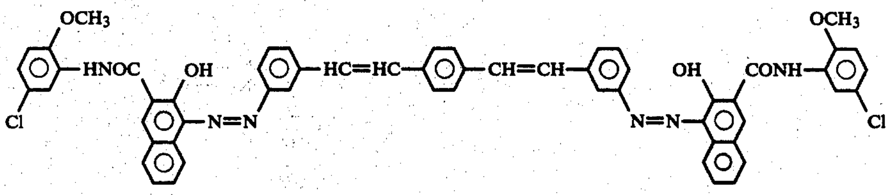 |
| II-17 | 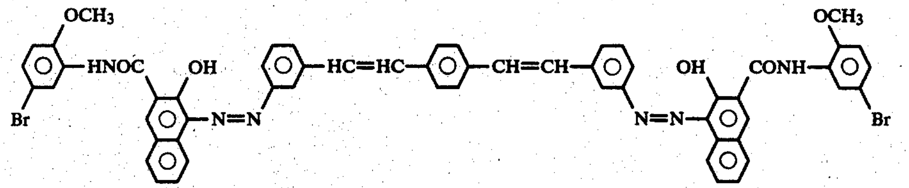 |
| II-18 | 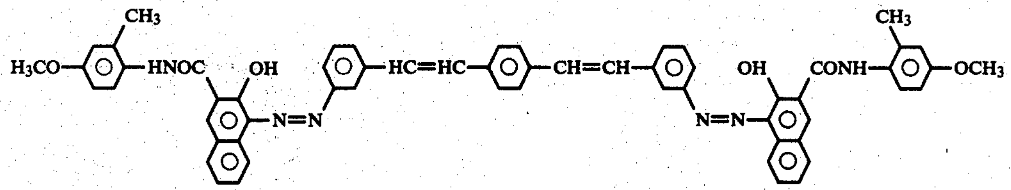 |
| II-19 | 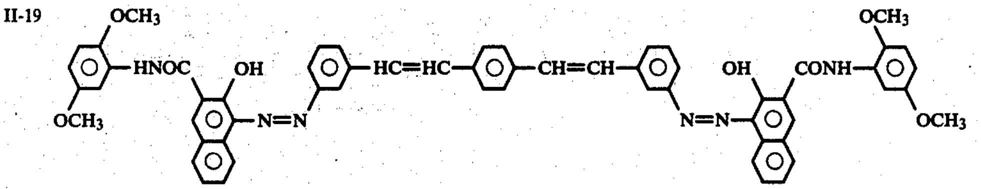 |
| II-20 | 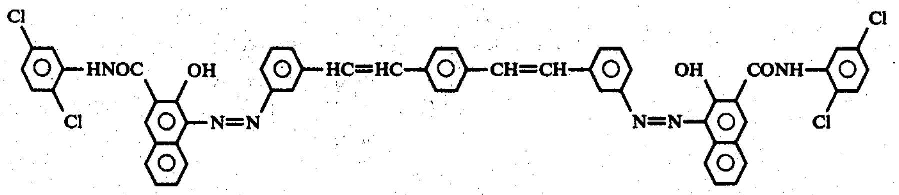 |
| II-21 | 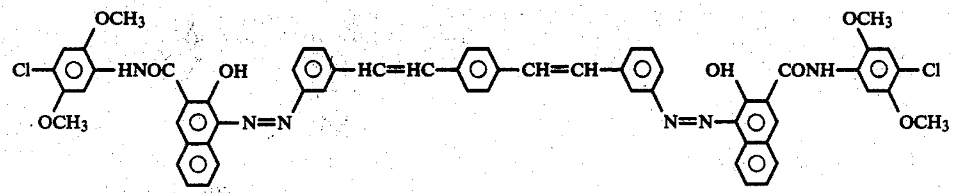 |
| II-22 | 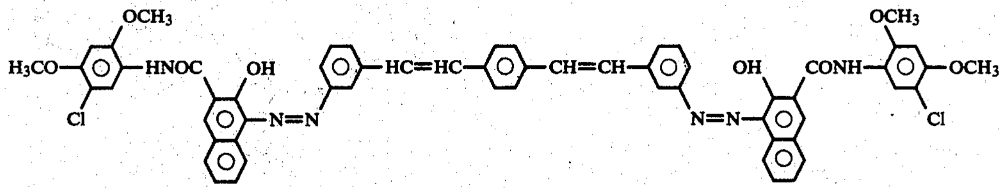 |

-continued
| Pigment No. | Structural formula |
|---|---|
| II-23 | 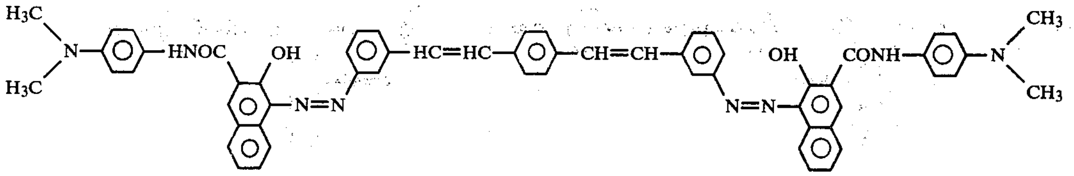 |
| II-24 | 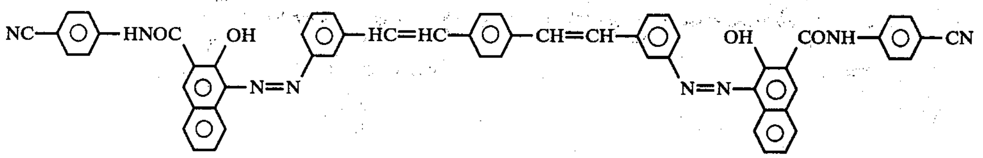 |
| II-25 | 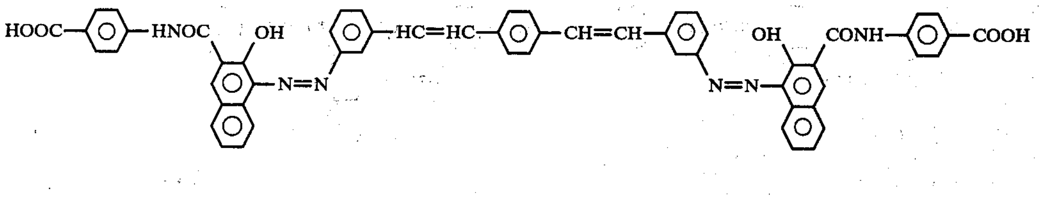 |
| II-26 | 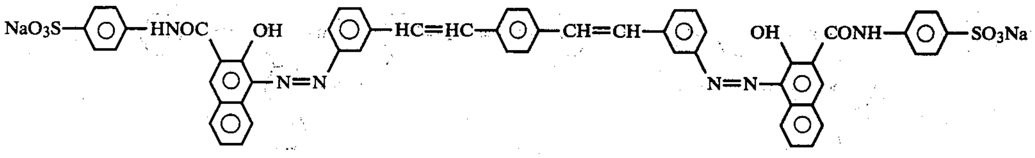 |
| II-27 | 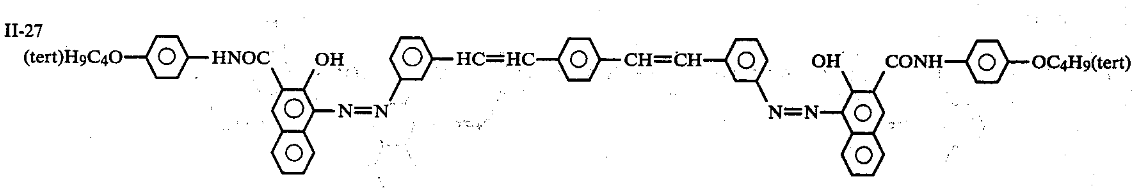 |
| II-28 | 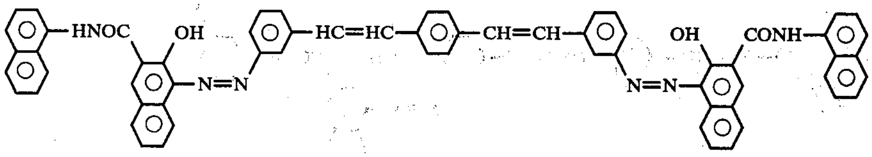 |
| II-29 | 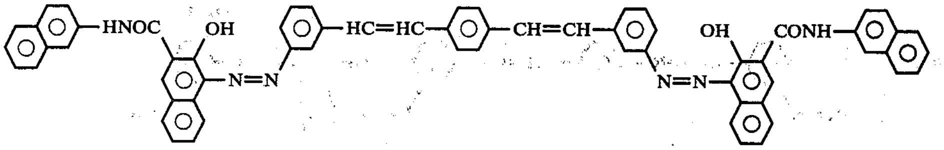 |
| II-30 | 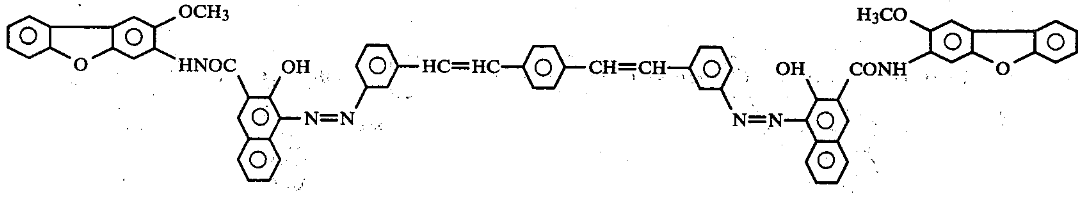 |

-continued
| Pigment No. | Structural formula |
|---|---|
| II-31 | 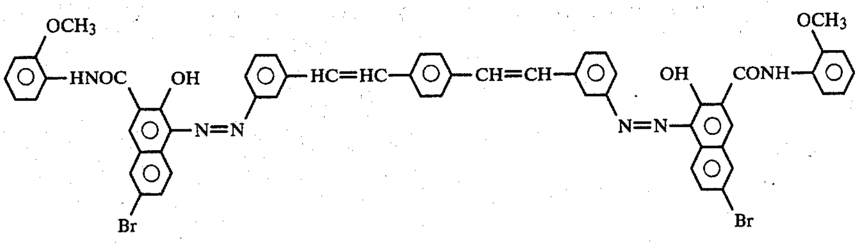 |
| II-32 | 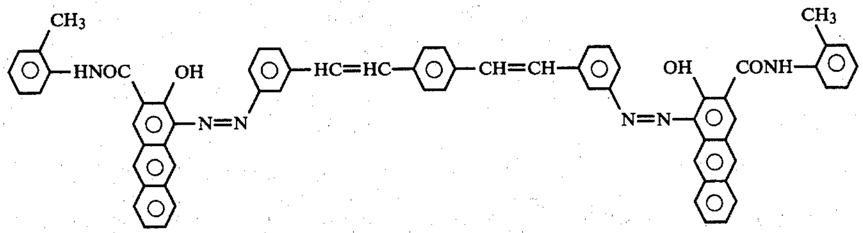 |
| II-33 | 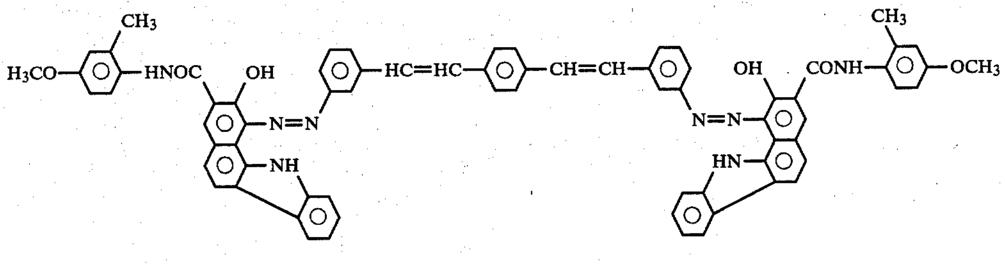 |
| II-34 | 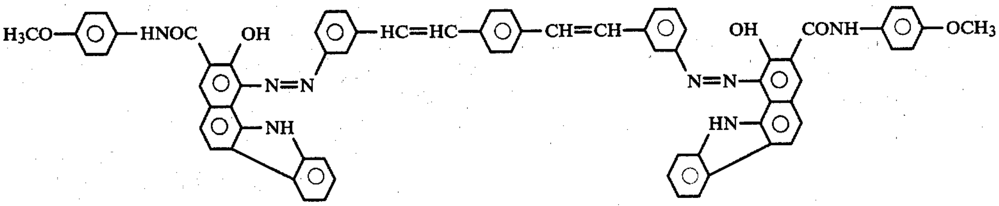 |
| II-35 | 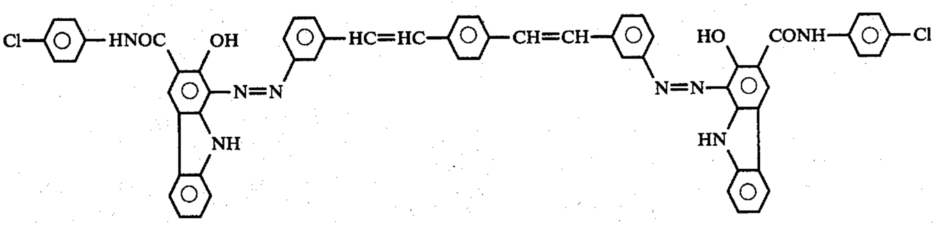 |
| II-36 | 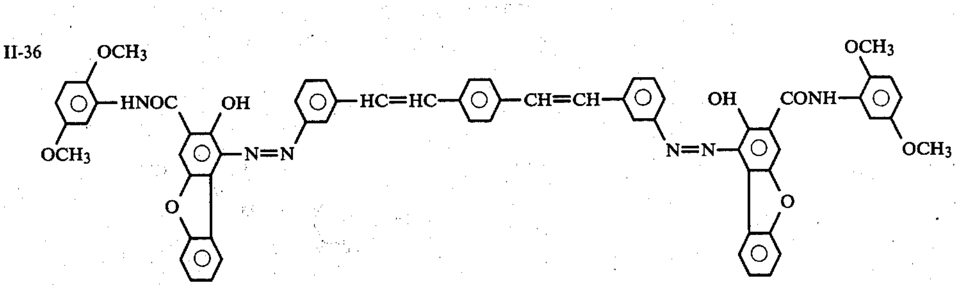 |

-continued
| Pigment No. | Structural formula |
|---|---|
| II-37 | 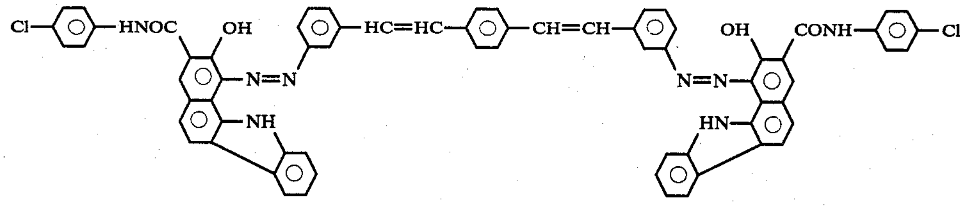 |
| II-38 | 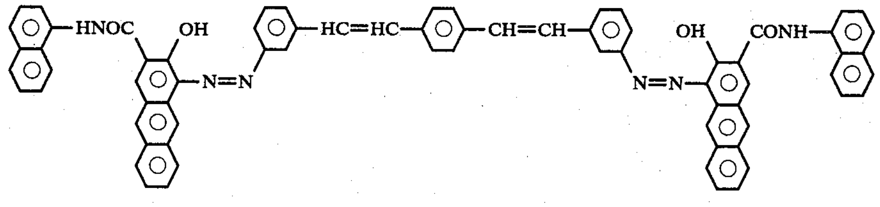 |
| II-39 | 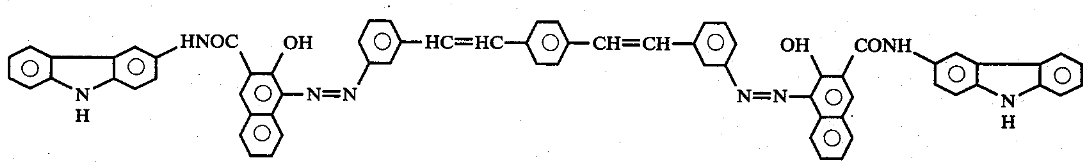 |
| II-40 | 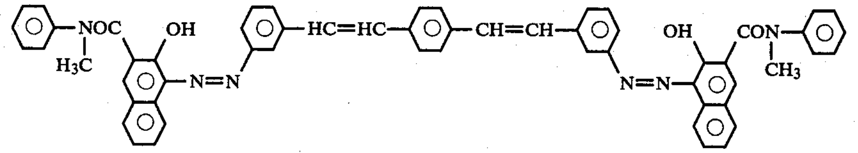 |
| II-41 | 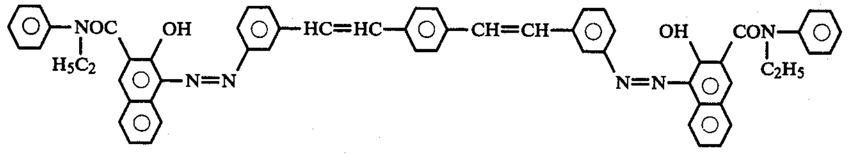 |
| II-42 | 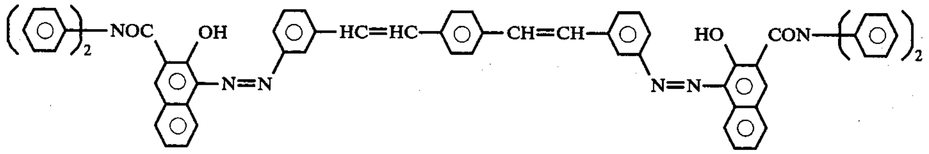 |
| II-43 | 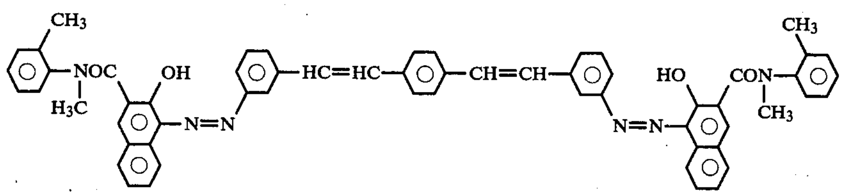 |
| II-44 | 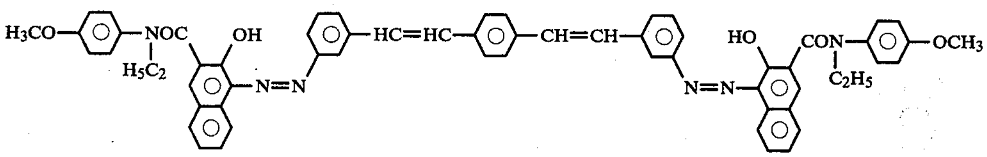 |

-continued
| Pigment No. | Structural formula |
|---|---|
| II-45 | 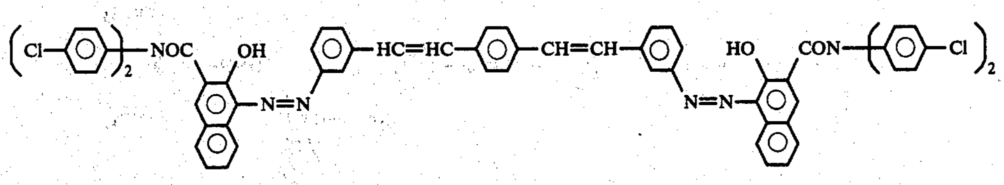 |
| II-46 | 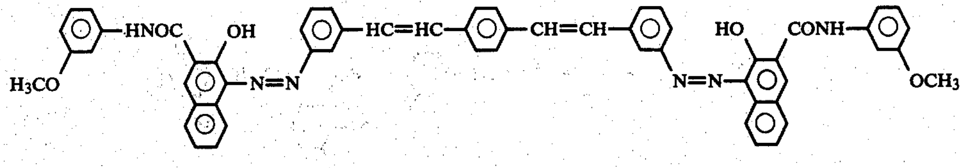 |
| II-47 | 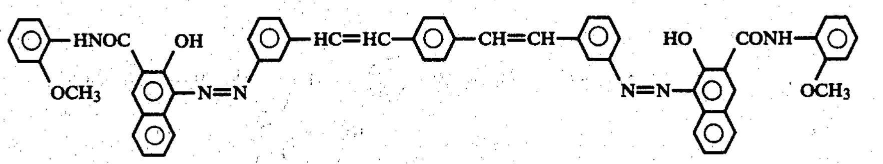 |
| II-48 | 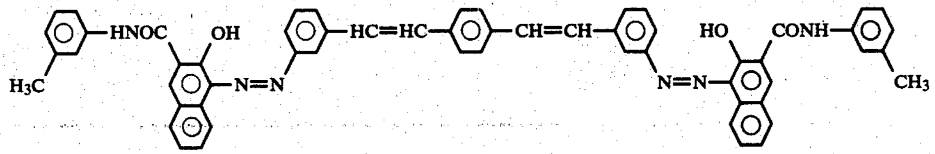 |
| II-49 | 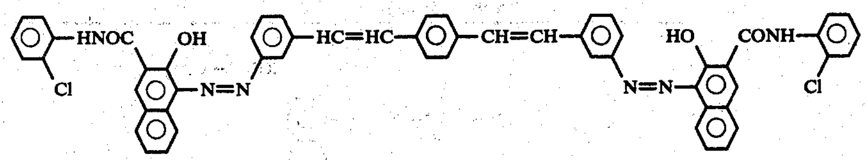 |
| II-50 | 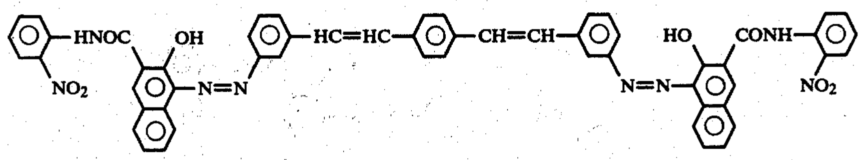 |
| II-51 | 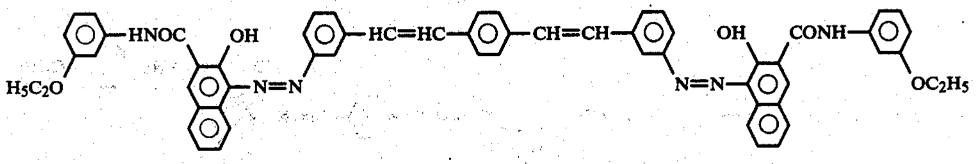 |
| II-52 | 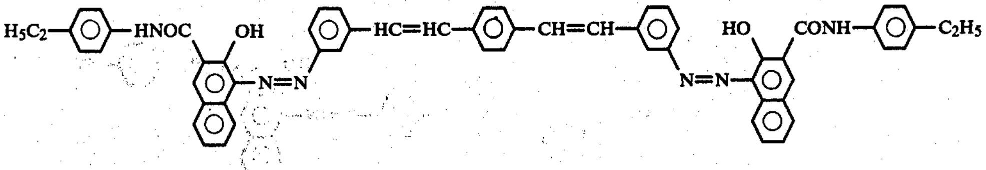 |
| II-53 | 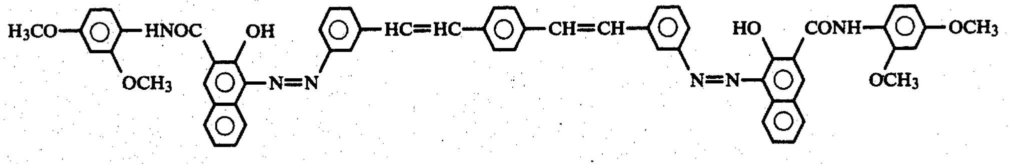 |

-continued
| Pigment No. | Structural formula |
| --- | --- |
| II-54 | 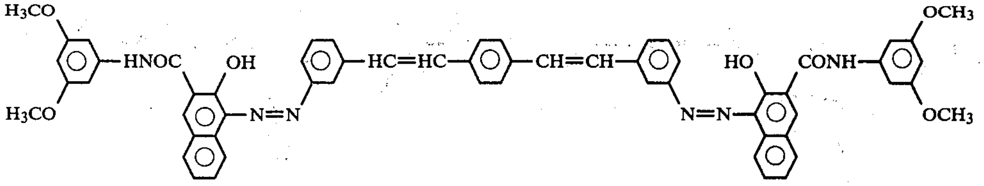 |
| II-55 | 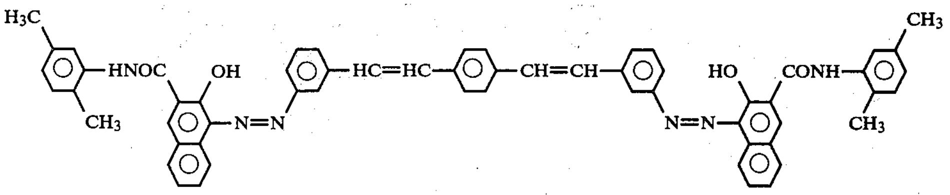 |
| II-56 | 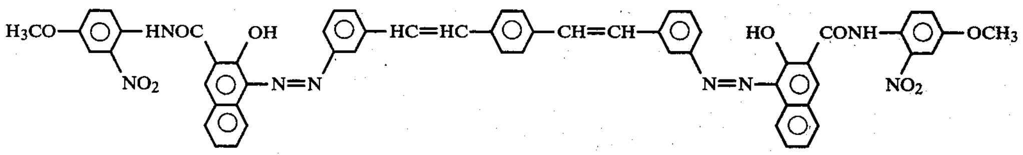 |
(2) Disazo pigments having the general formula (III)
| Pigment No. | Structural formula |
| --- | --- |
| III-1 | 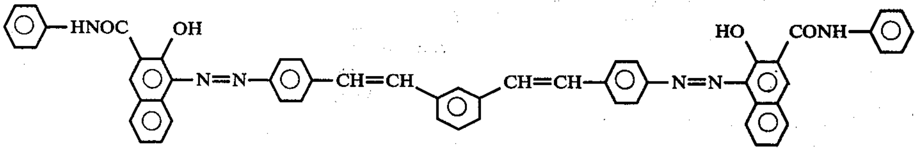 |
| III-2 | 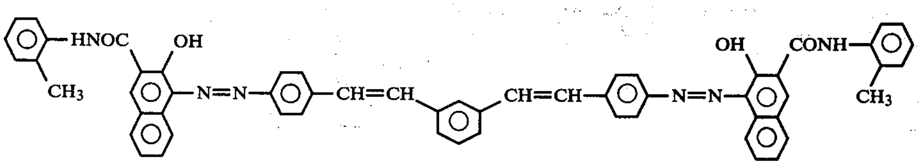 |
| III-3 | 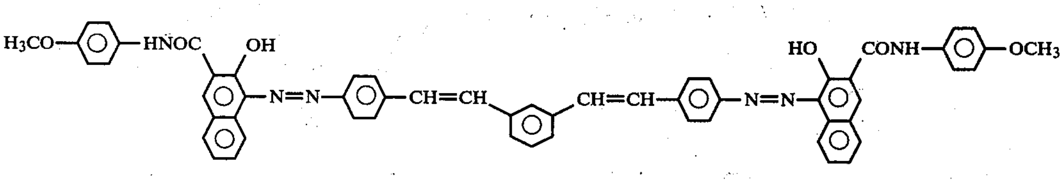 |
| III-4 | 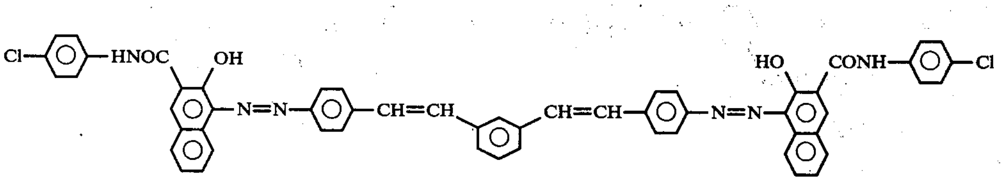 |

-continued
| Pig-ment No. | Structural formula |
|---|---|
| III-5 | 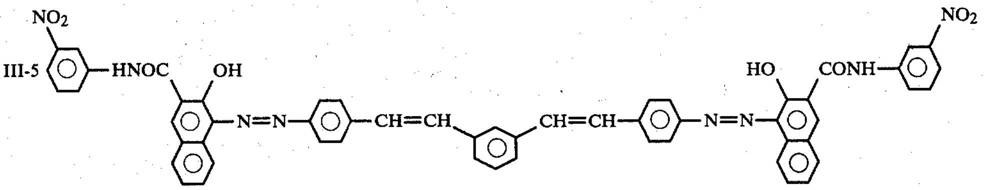 |
| III-6 | 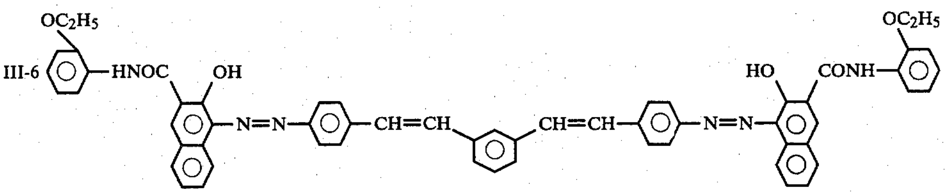 |
| III-7 | 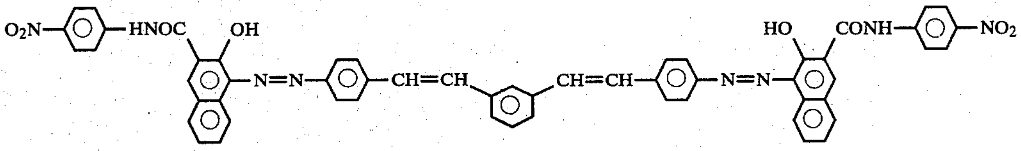 |
| III-8 | 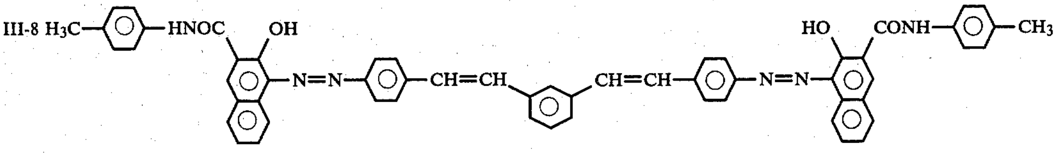 |
| III-9 | 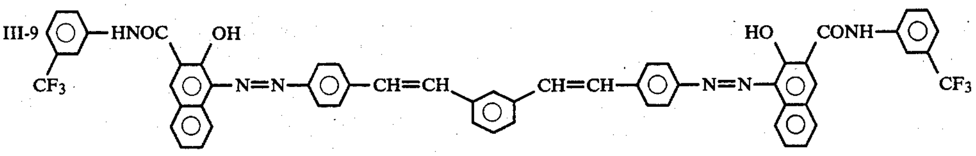 |
| III-10 | 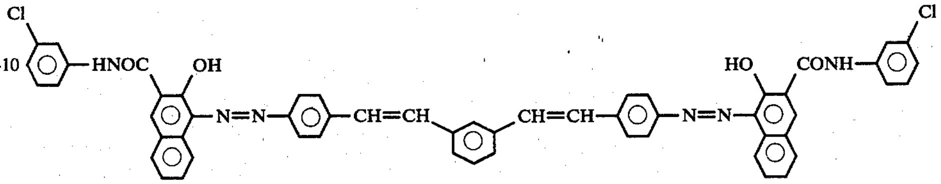 |
| III-11 | 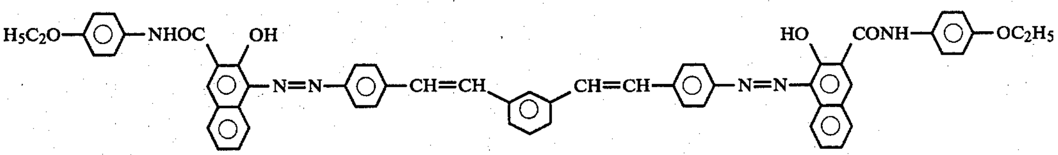 |
| III-12 | 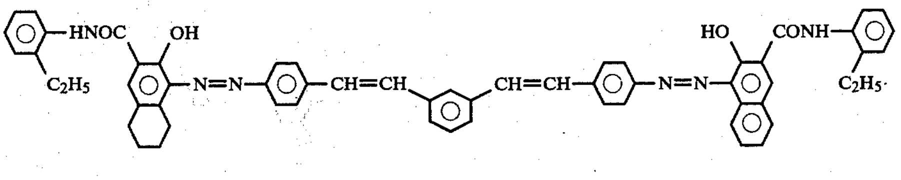 |

-continued
| Pigment No. | Structural formula |
|---|---|
| III-13 | 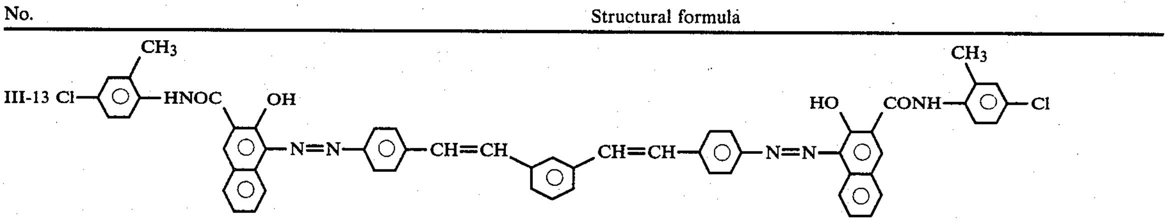 |
| III-14 | 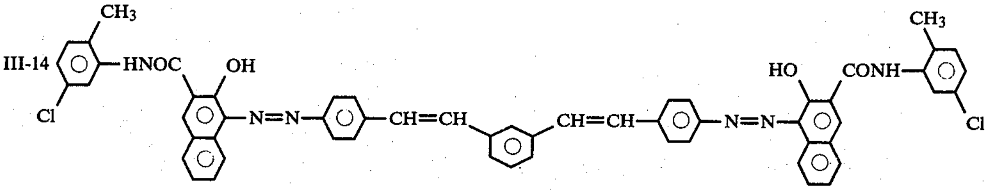 |
| III-15 | 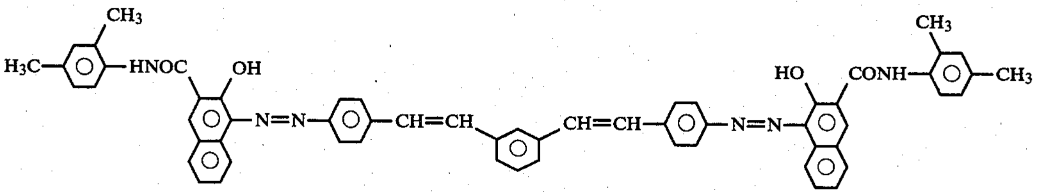 |
| III-16 | 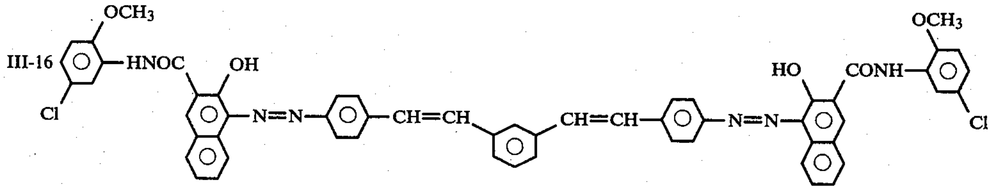 |
| III-17 | 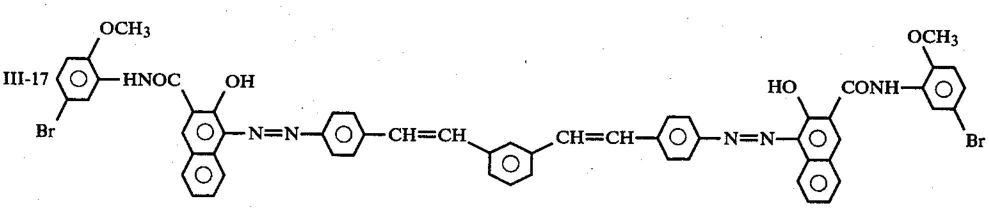 |
| III-18 | 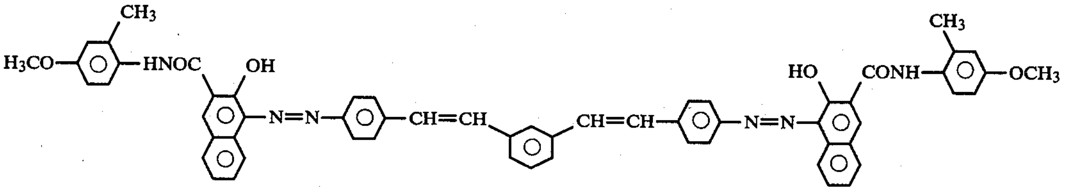 |
| III-19 | 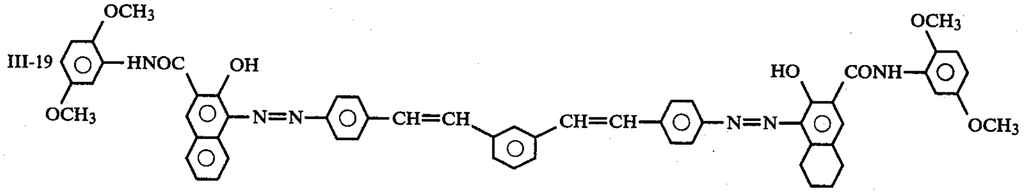 |
| III-20 | 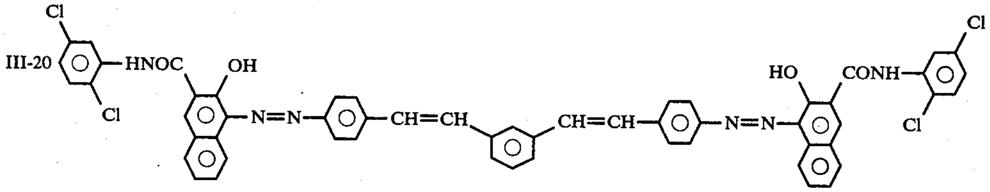 |

-continued
| Pigment No. | Structural formula |
|---|---|
| III-21 | 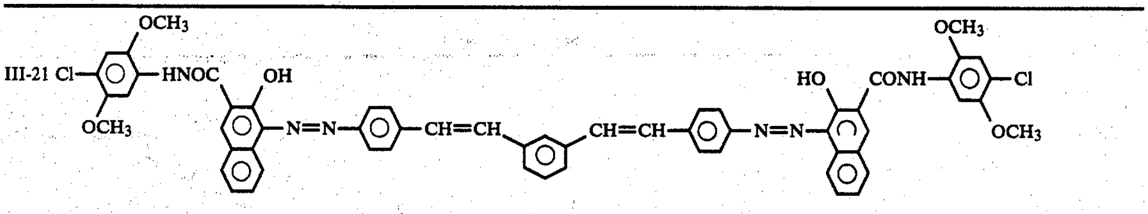 |
| III-22 | 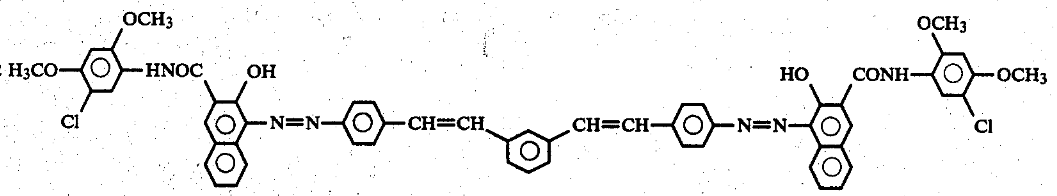 |
| III-23 | 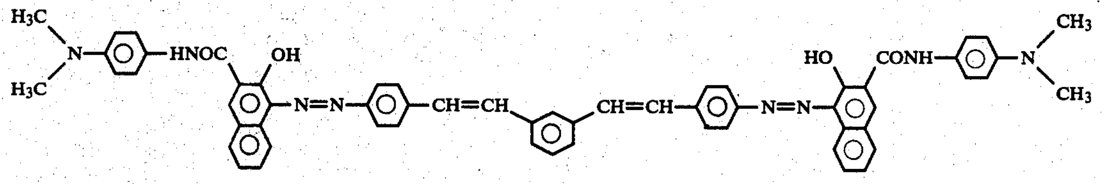 |
| III-24 | 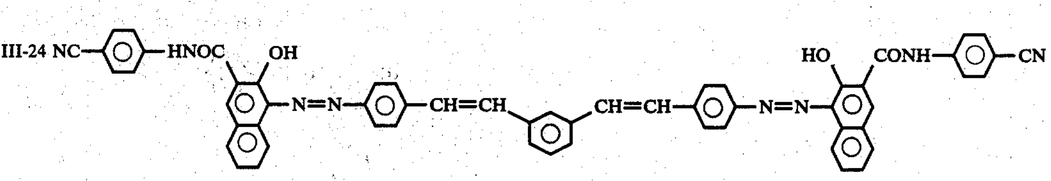 |
| III-25 | 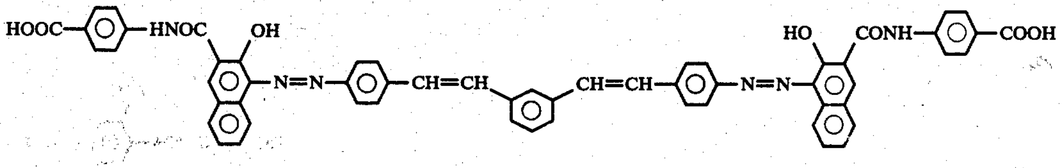 |
| III-26 | 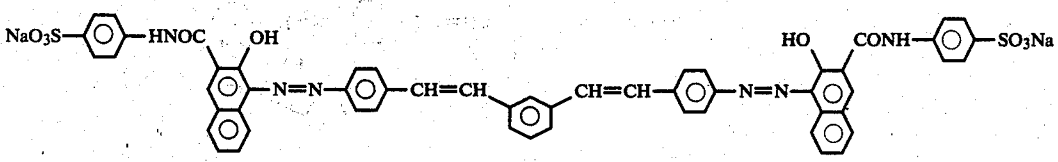 |
| III-27 | 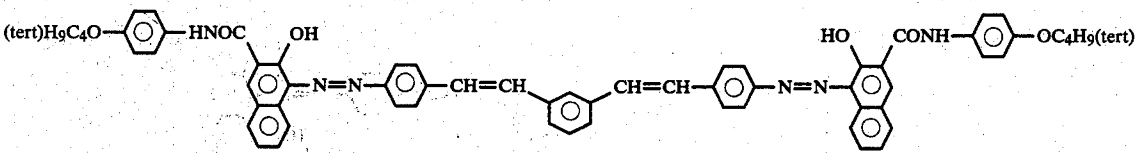 |
| III-28 | 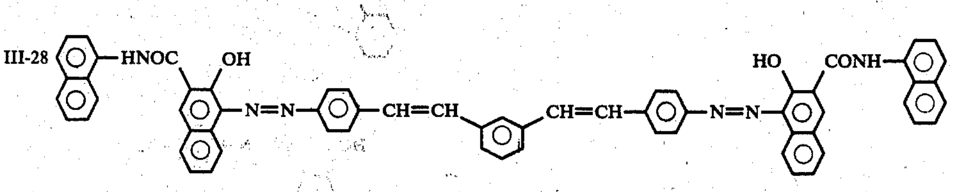 |
| III-29 | 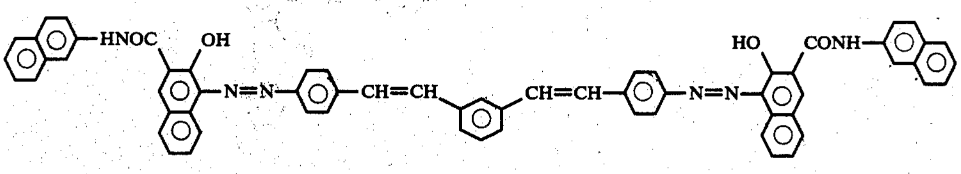 |

-continued
| Pigment No. | Structural formula |
| --- | --- |
| III-30 | 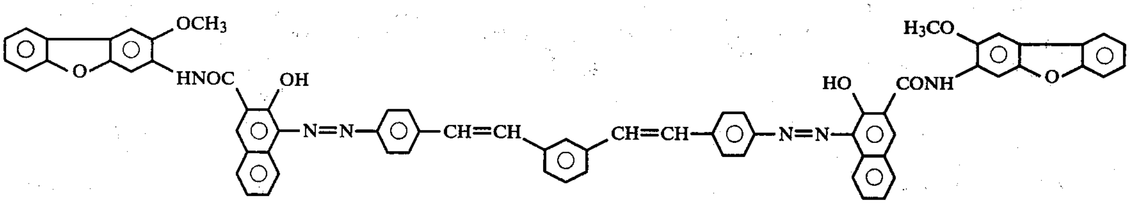 |
| III-31 | 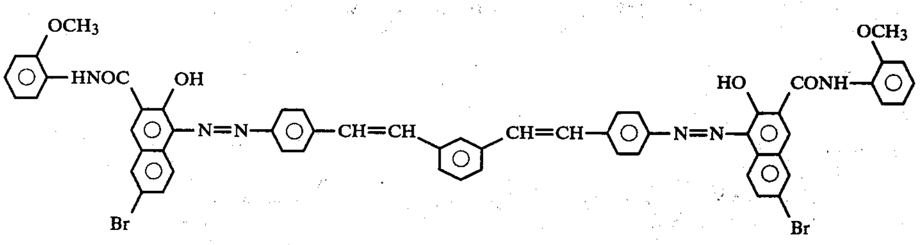 |
| III-32 | 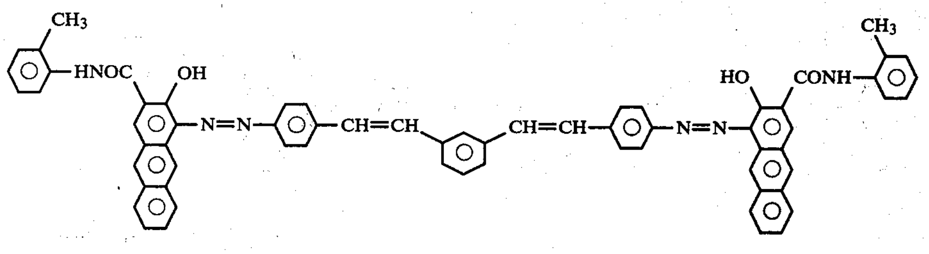 |
| III-33 | 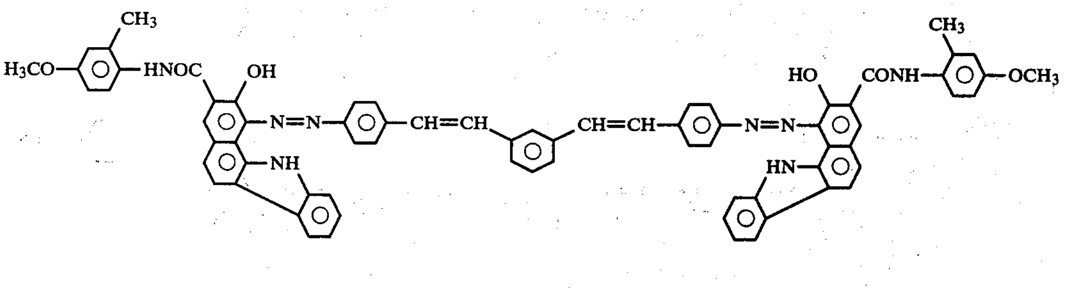 |
| III-34 | 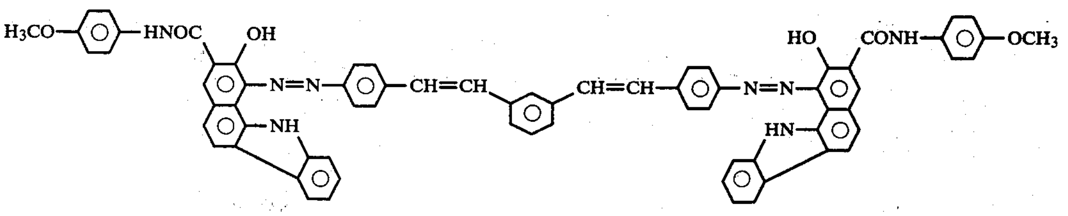 |
| III-35 | 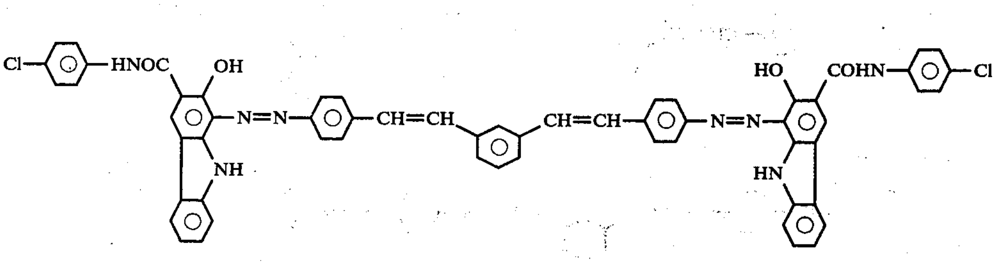 |

-continued
| Pigment No. | Structural formula |
| --- | --- |
| III-36 | 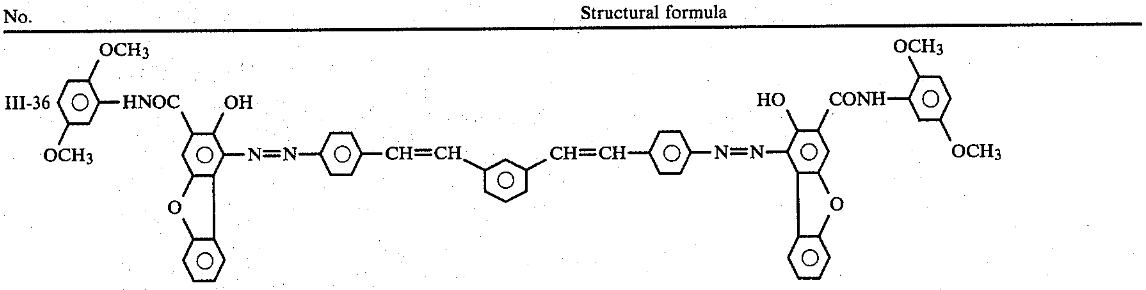 |
| III-37 | 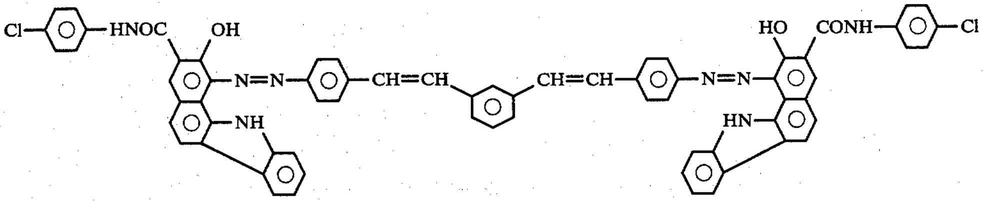 |
| III-38 | 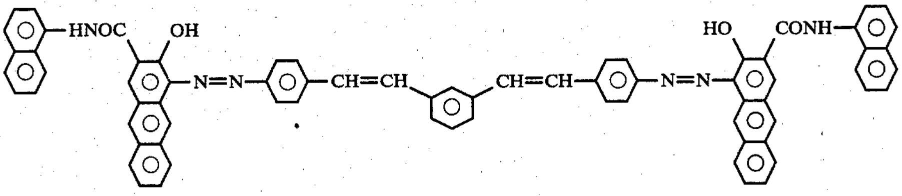 |
| III-39 | 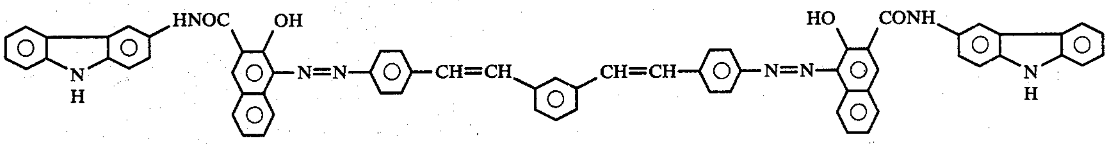 |
| III-40 | 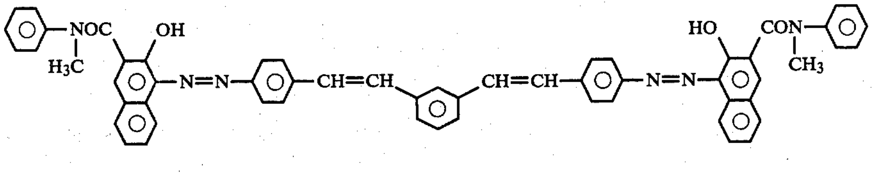 |
| III-41 | 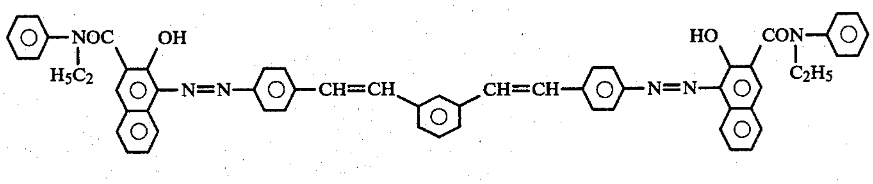 |
| III-42 | 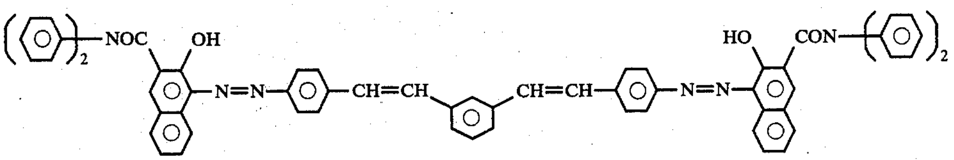 |
| III-43 | 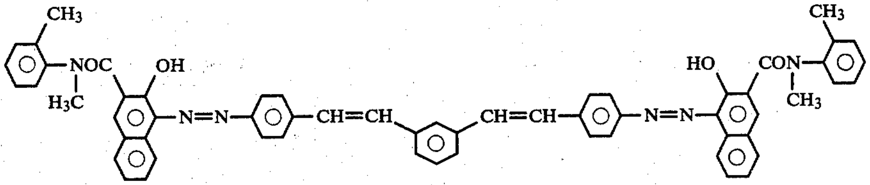 |

-continued
| Pigment No. | Structural formula |
|---|---|
| III-44 | 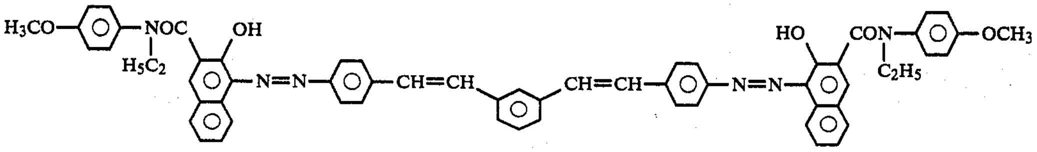 |
| III-45 | 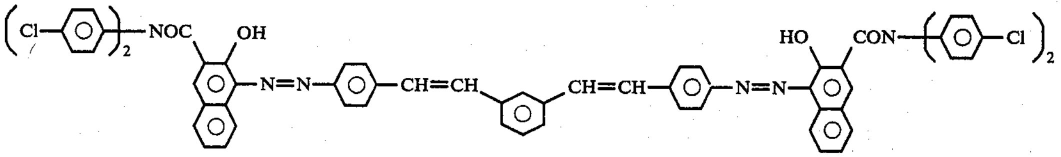 |
| III-46 | 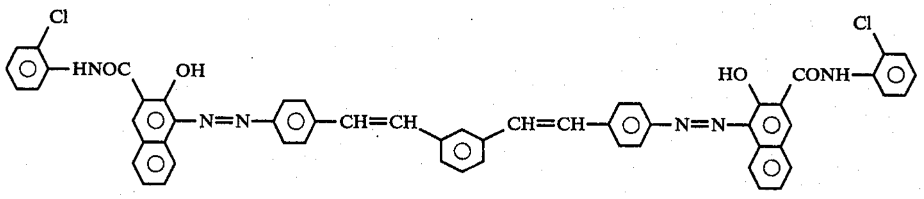 |
| III-47 | 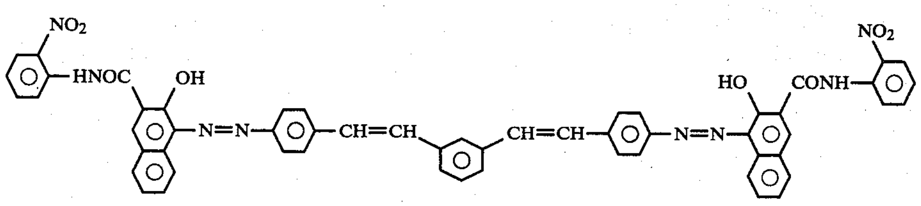 |
| III-48 | 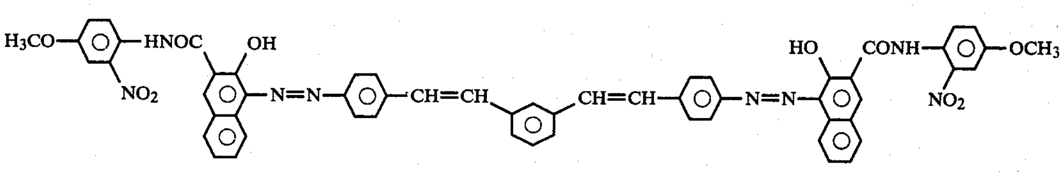 |
(3) Disazo pigments having the general formula (IV)
| Pigment No. | Structural formula |
|---|---|
| IV-1 | 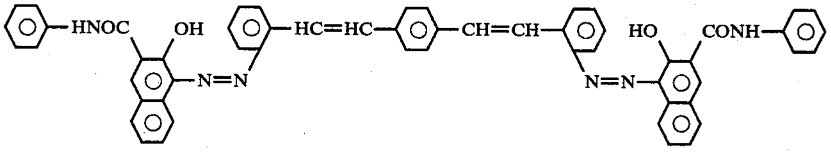 |
| IV-2 | 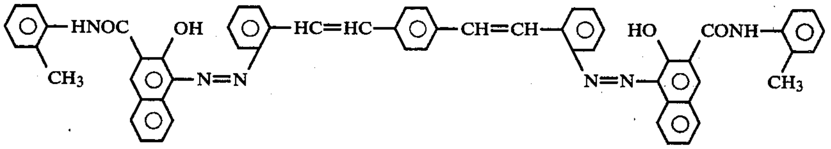 |
| IV-3 | 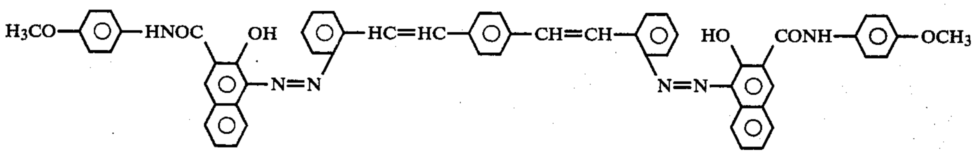 |

-continued
| Pigment No. | Structural formula |
|---|---|
| IV-4 | 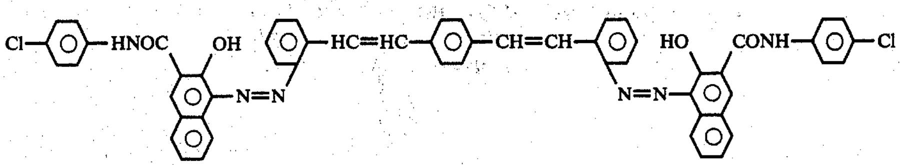 |
| IV-5 | 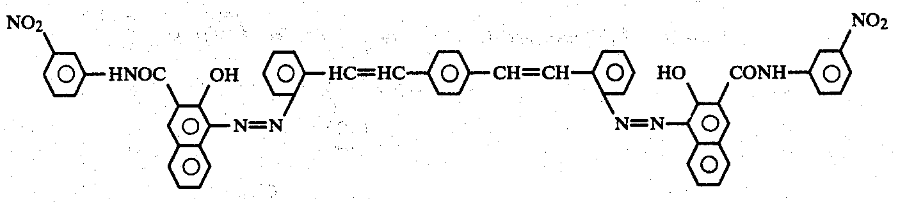 |
| IV-6 | 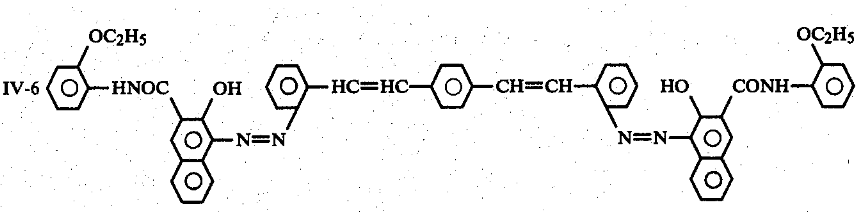 |
| IV-7 | 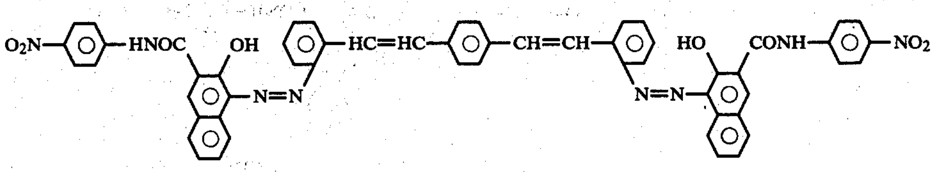 |
| IV-8 | 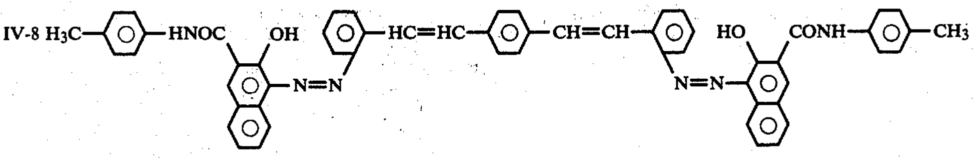 |
| IV-9 | 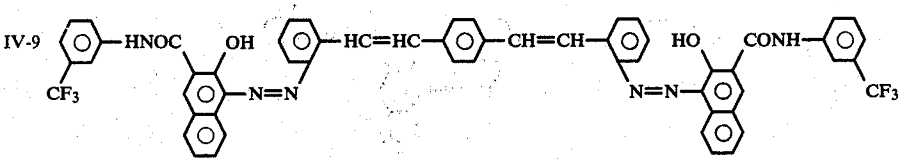 |
| IV-10 | 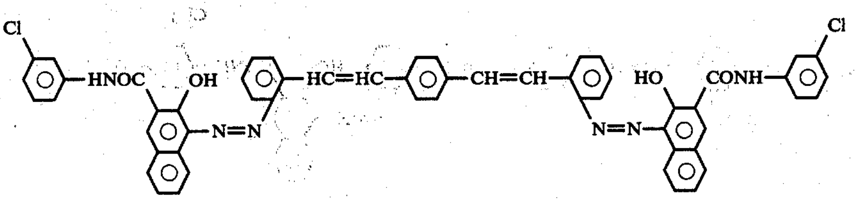 |
| IV-11 | 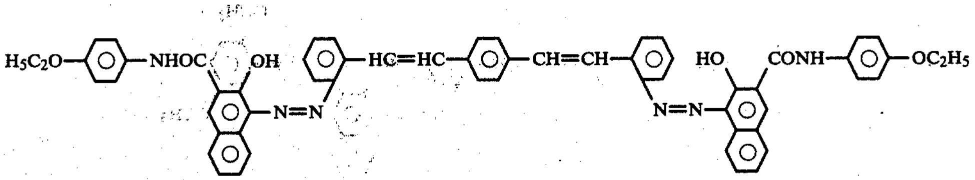 |

-continued
| Pigment No. | Structural formula |
|---|---|
| IV-12 | 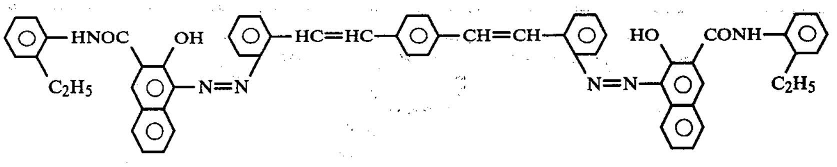 |
| IV-13 | 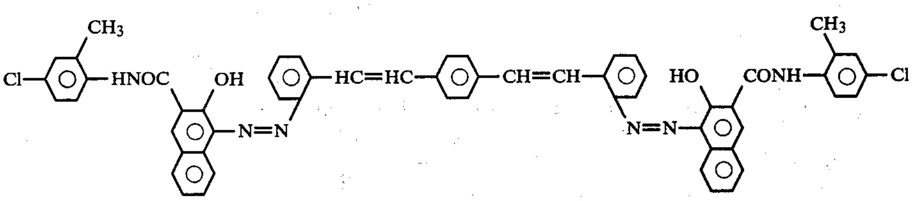 |
| IV-14 | 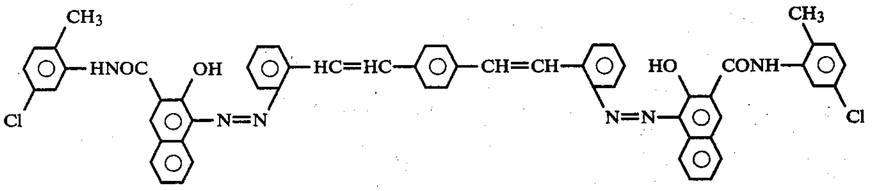 |
| IV-15 | 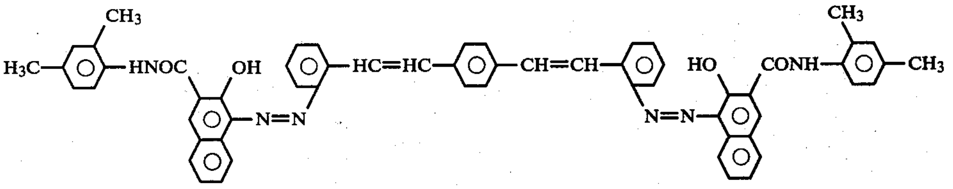 |
| IV-16 | 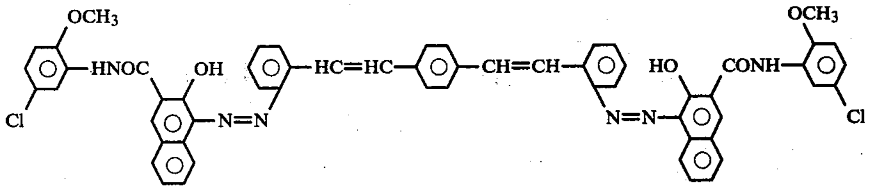 |
| IV-17 | 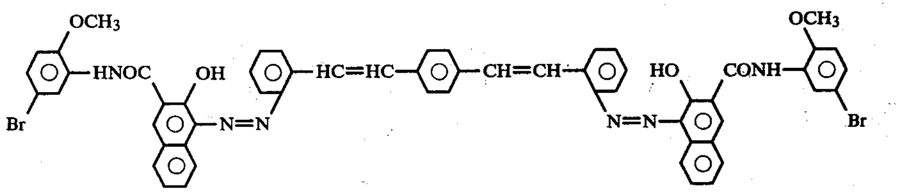 |
| IV-18 | 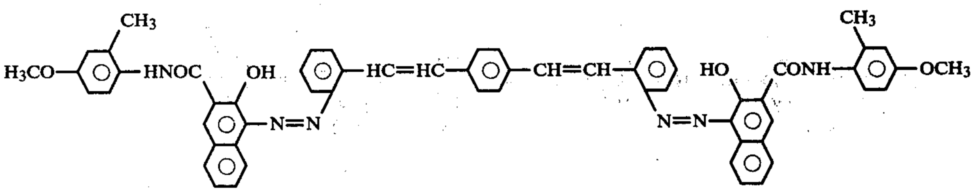 |
| IV-19 | 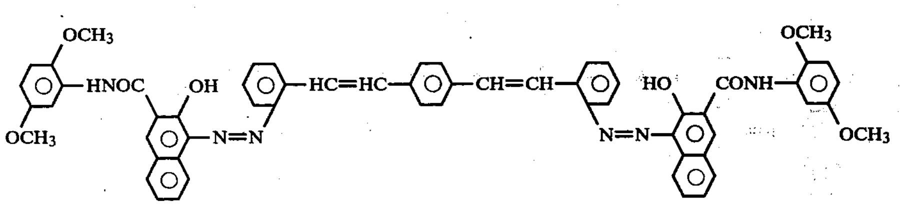 |

-continued
| Pigment No. | Structural formula |
|---|---|
| IV-20 | 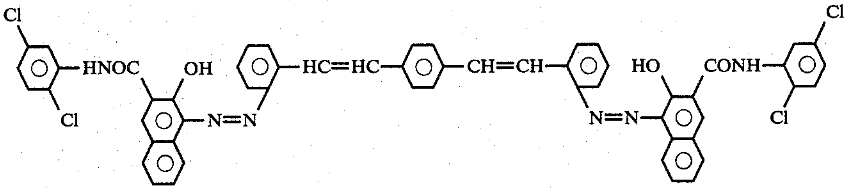 |
| IV-21 | 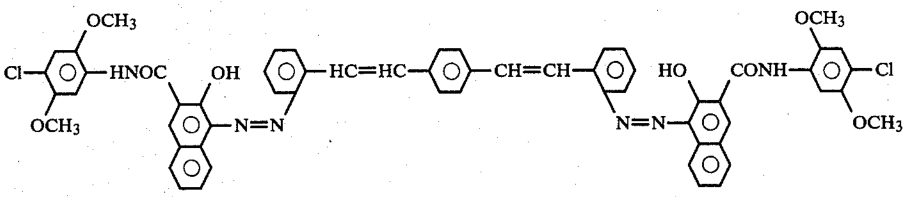 |
| IV-22 | 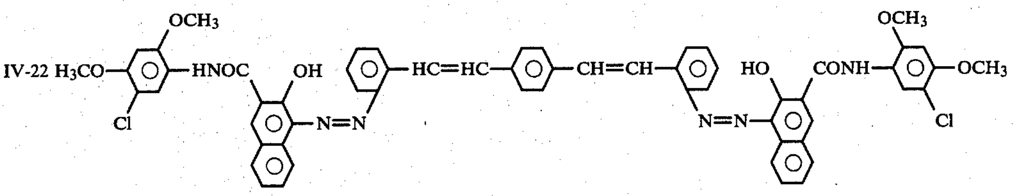 |
| IV-23 | 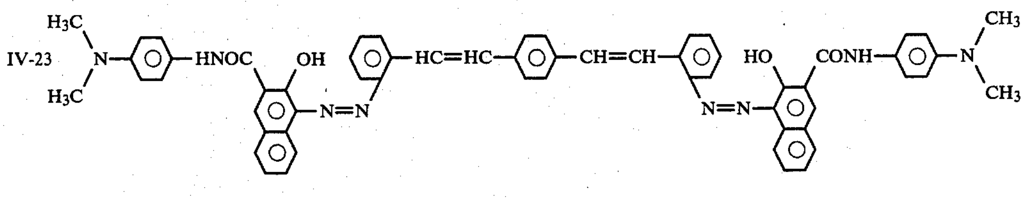 |
| IV-24 | 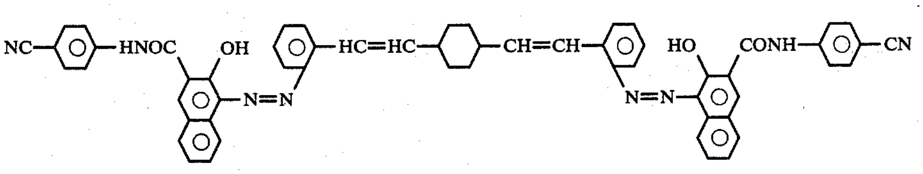 |
| IV-25 | 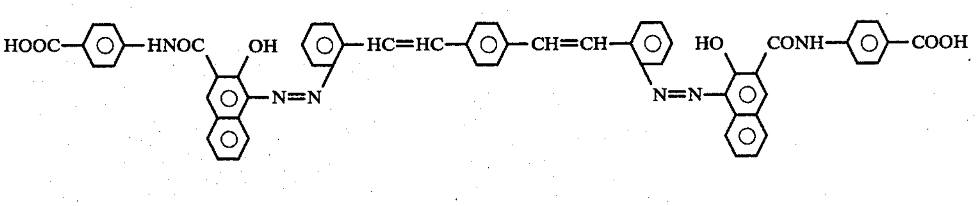 |
| IV-26 | 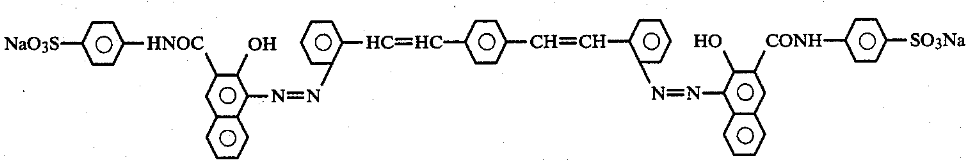 |
| IV-27 | 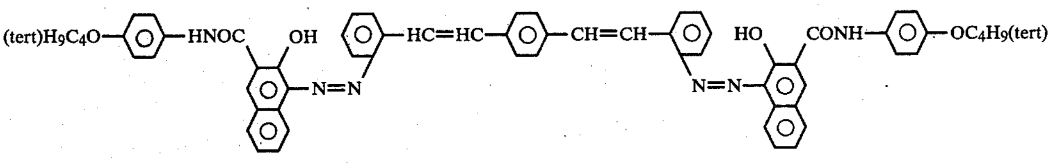 |

-continued
| Pigment No. | Structural formula |
| --- | --- |
| IV-28 | 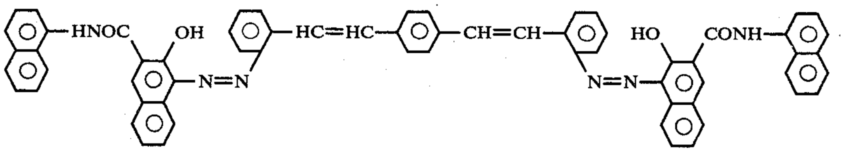 |
| IV-29 | 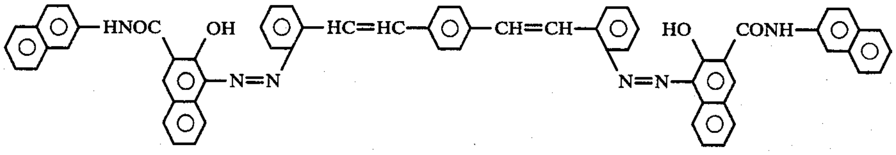 |
| IV-30 | 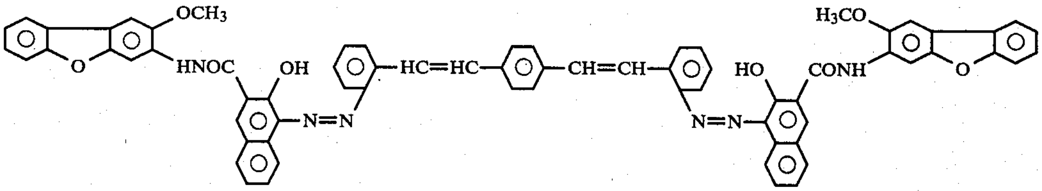 |
| IV-31 | 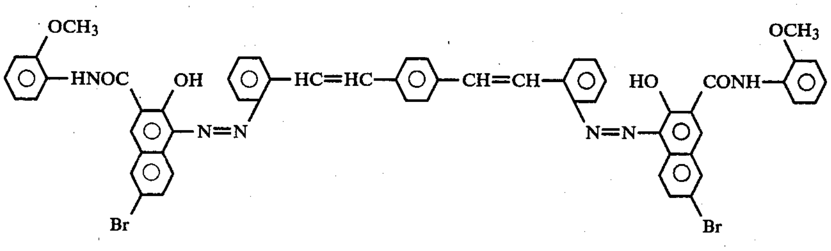 |
| IV-32 | 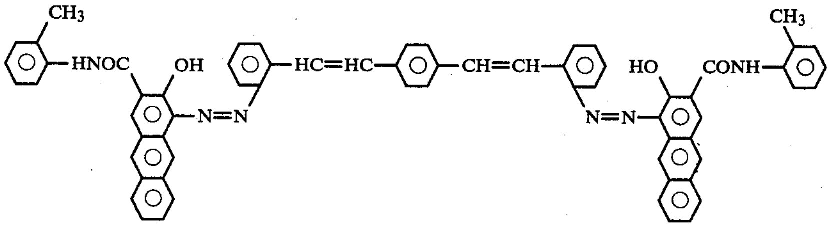 |
| IV-33 | 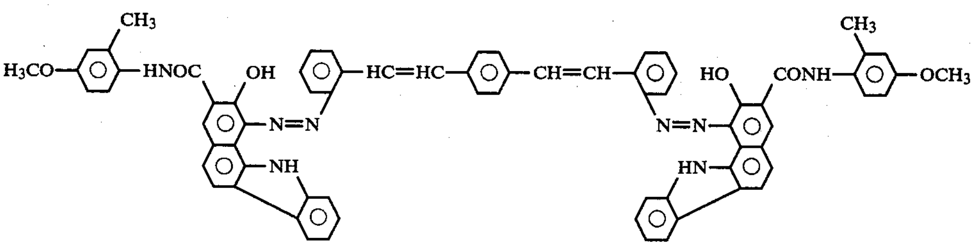 |
| IV-34 | 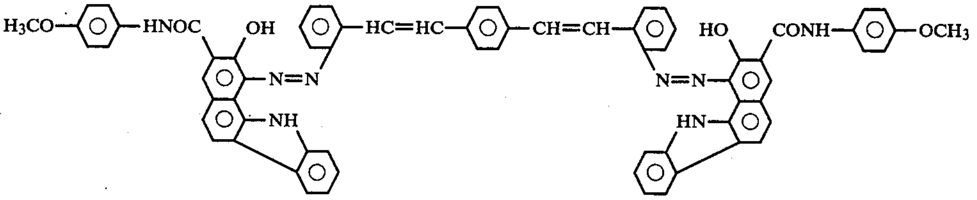 |

-continued
| Pigment No. | Structural formula |
| --- | --- |
| IV-35 | 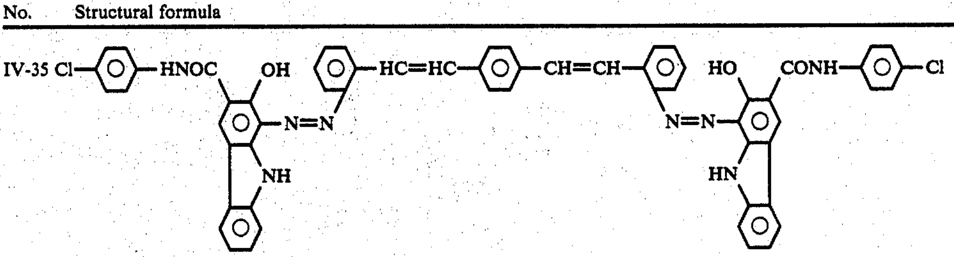 |
| IV-36 | 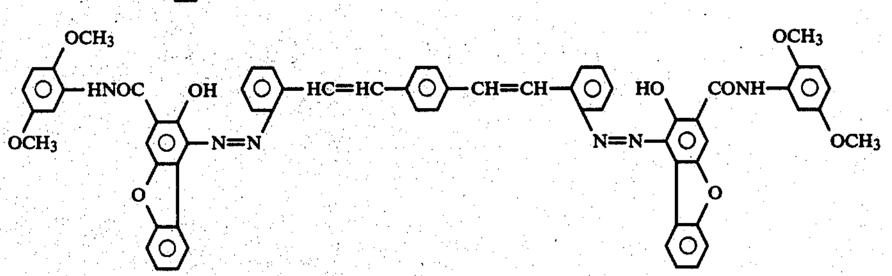 |
| IV-37 | 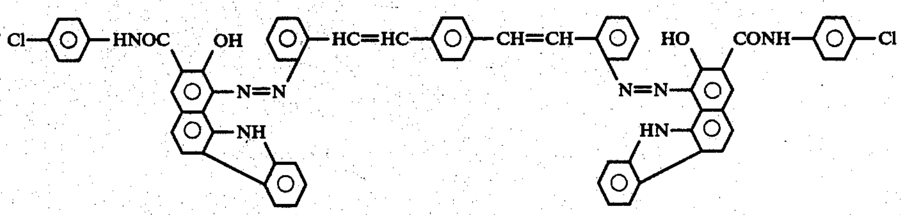 |
| IV-38 | 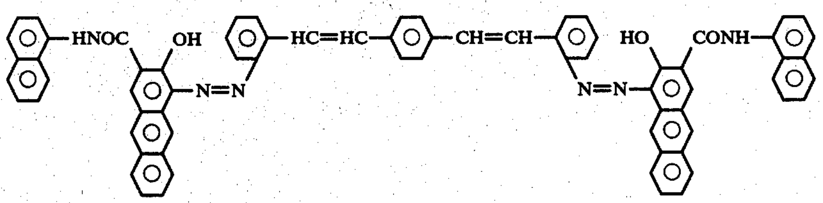 |
| IV-39 | 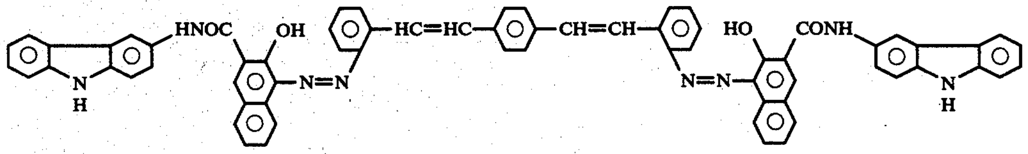 |
| IV-40 | 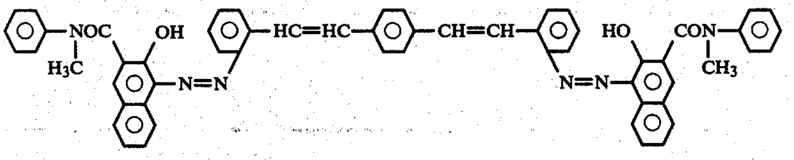 |
| IV-41 | 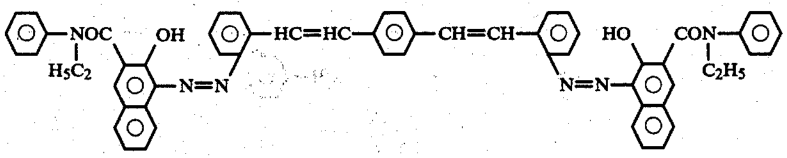 |
| IV-42 | 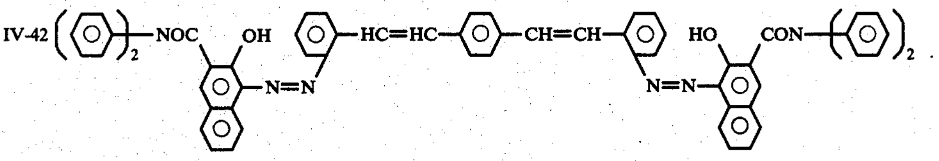 |

-continued
| Pigment No. | Structural formula |
|---|---|
| IV-43 | 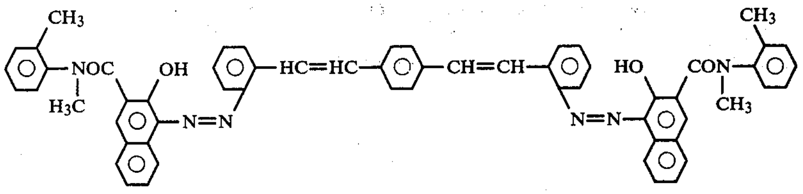 |
| IV-44 | 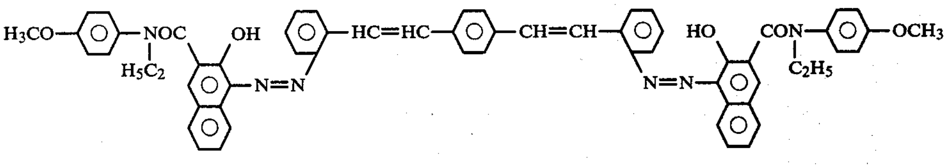 |
| IV-45 | 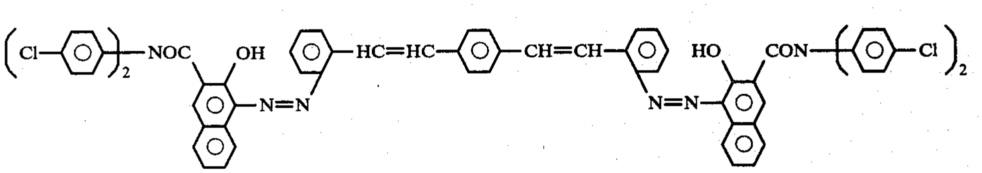 |
| IV-46 | 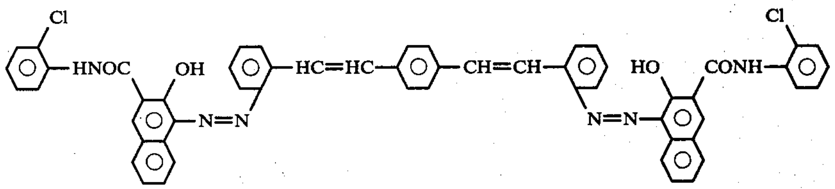 |
| IV-47 | 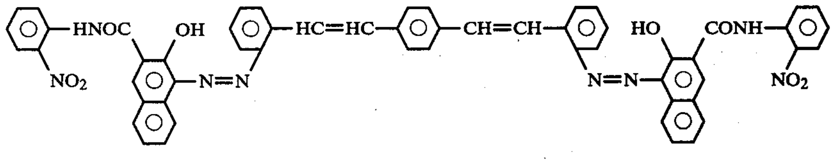 |
| IV-48 | 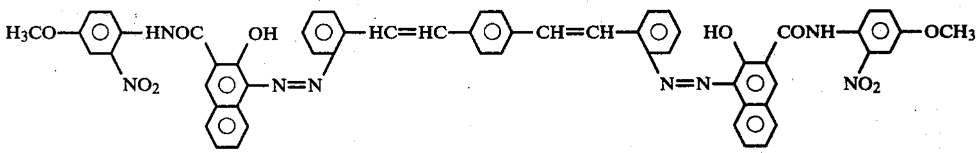 |
(4) Disazo pigments having the general formula (V)
| Pigment No. | Structural formula |
|---|---|
| V-1 | 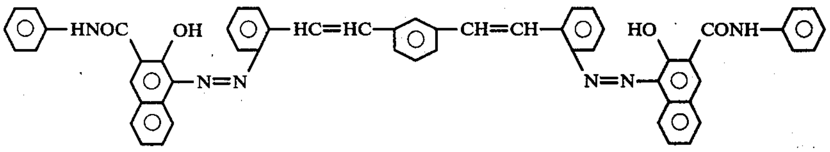 |

-continued
| Pigment No. | Structural formula |
|---|---|
| V-2 | 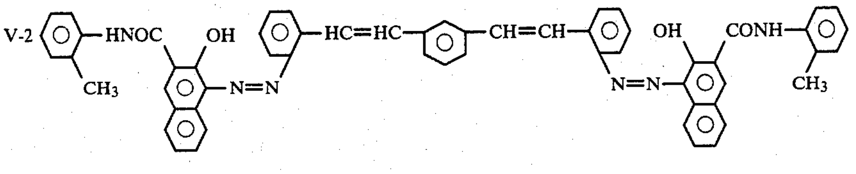 |
| V-3 | 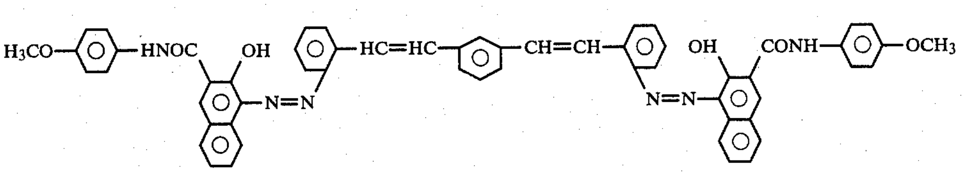 |
| V-4 | 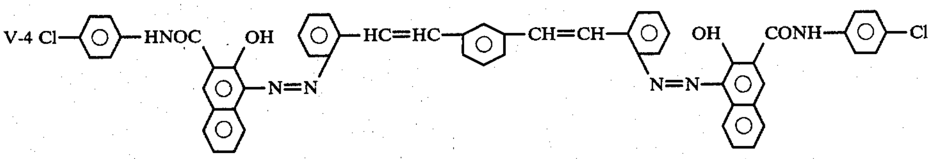 |
| V-5 | 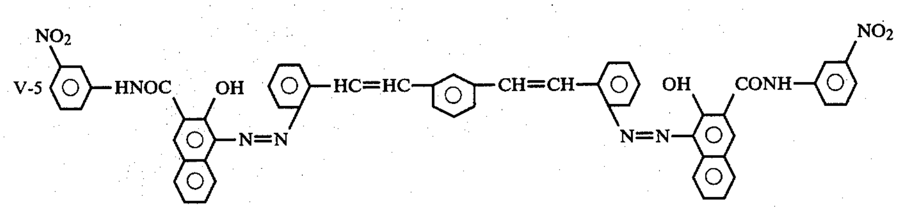 |
| V-6 | 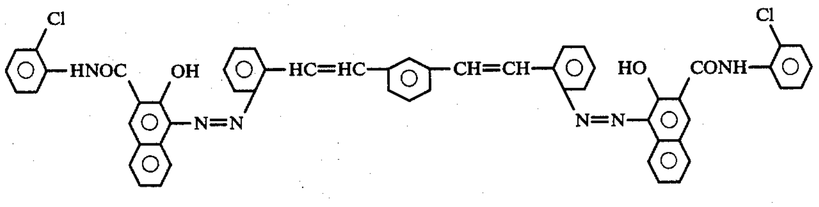 |
| V-7 | 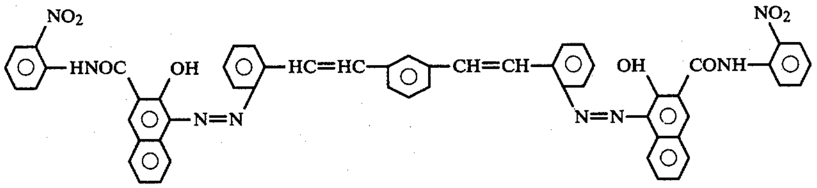 |
| V-8 | 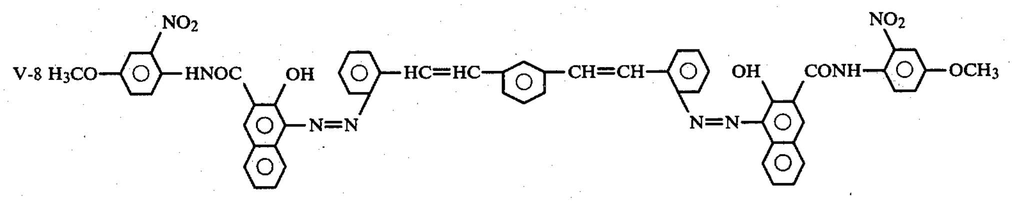 |
| V-9 | 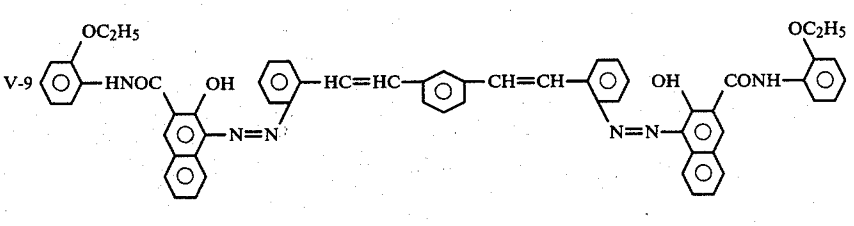 |

-continued
| Pigment No. | Structural formula |
|---|---|
| V-10 | 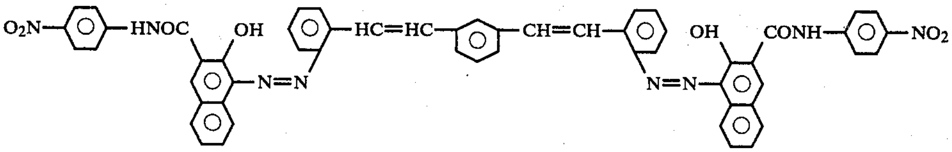 |
| V-11 | 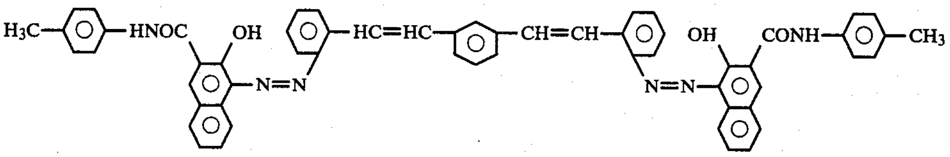 |
| V-12 | 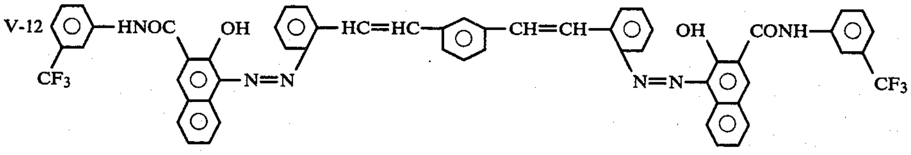 |
| V-13 | 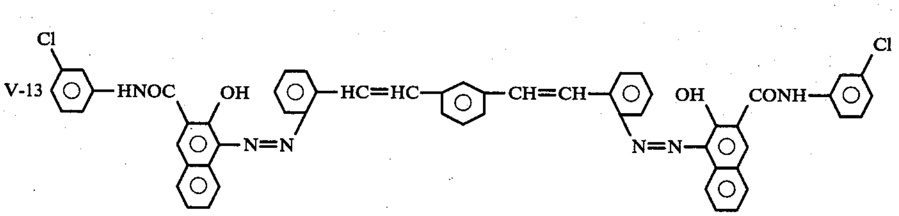 |
| V-14 | 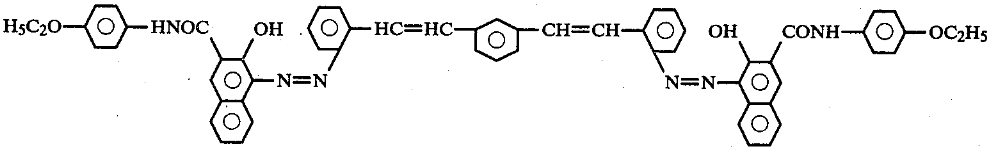 |
| V-15 | 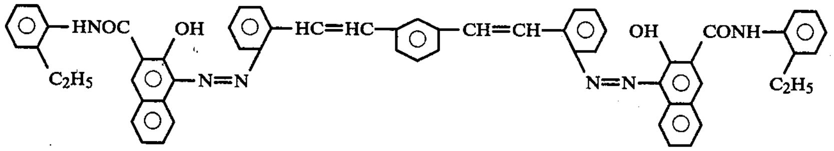 |
| V-16 | 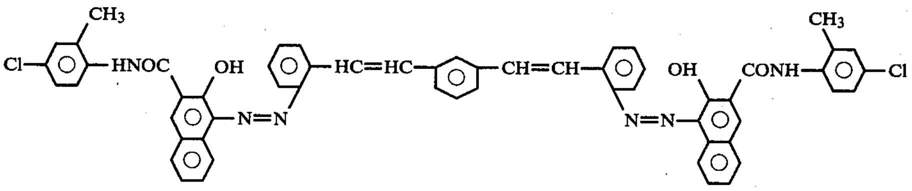 |
| V-17 | 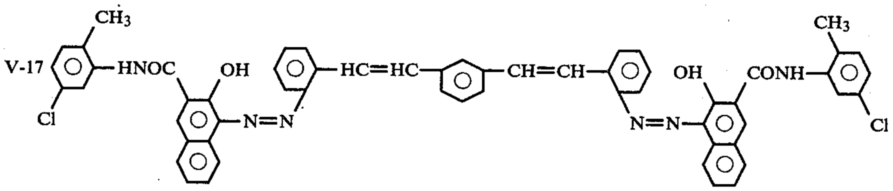 |

-continued
| Pigment No. | Structural formula |
|---|---|
| V-18 | 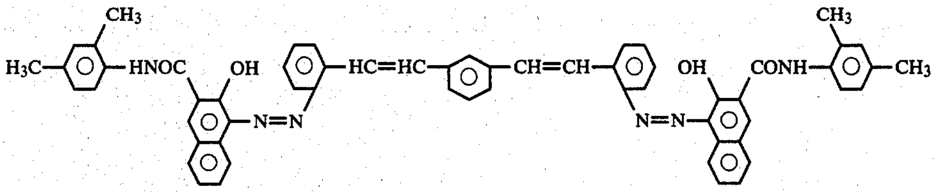 |
| V-19 | 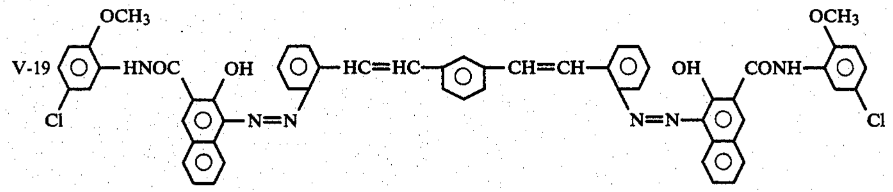 |
| V-20 | 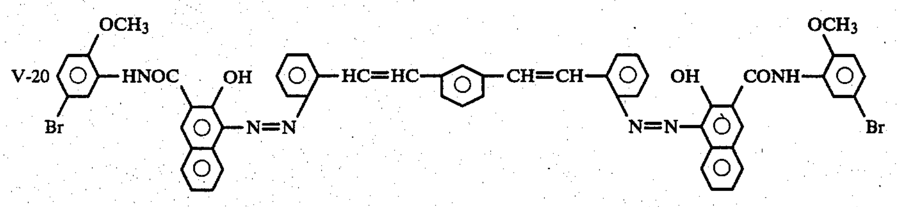 |
| V-21 | 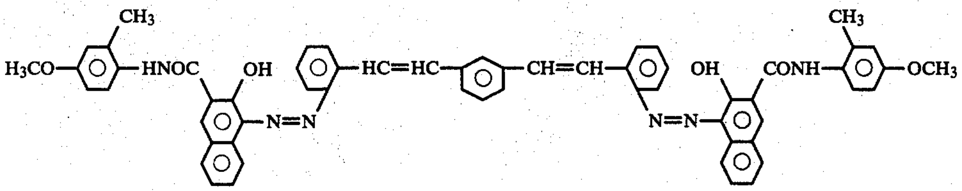 |
| V-22 | 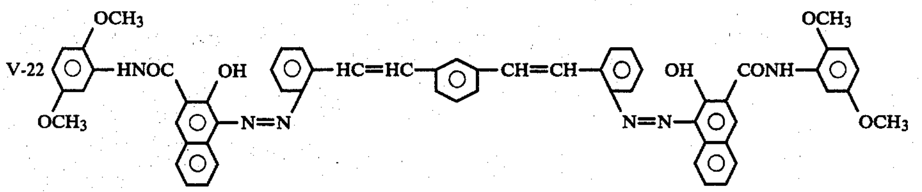 |
| V-23 | 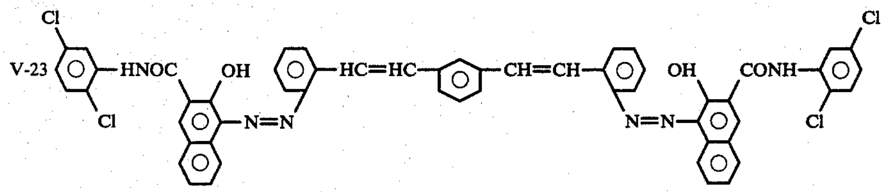 |
| V-24 | 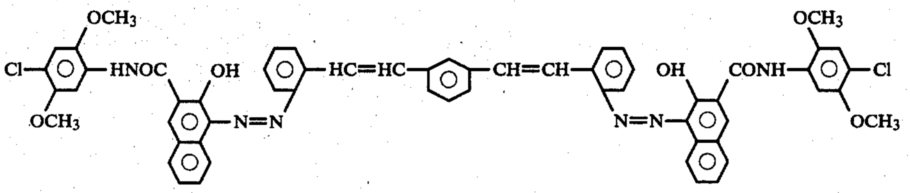 |
| V-25 | 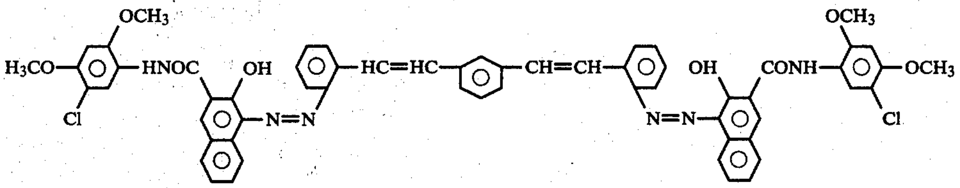 |

-continued
| Pigment No. | Structural formula |
| --- | --- |
| V-26 | 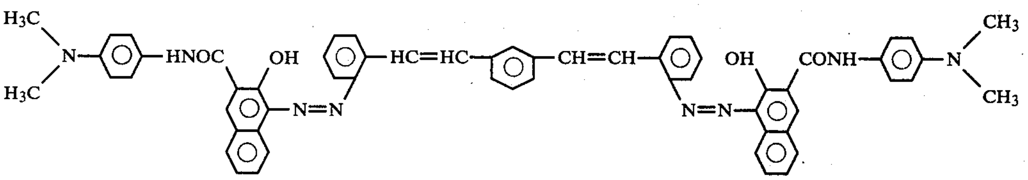 |
| V-27 | 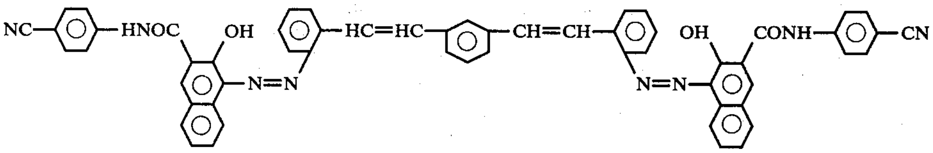 |
| V-28 | 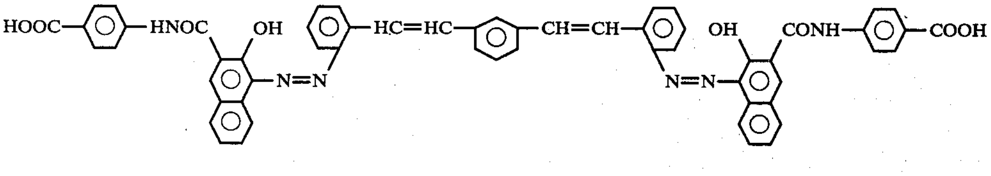 |
| V-29 | 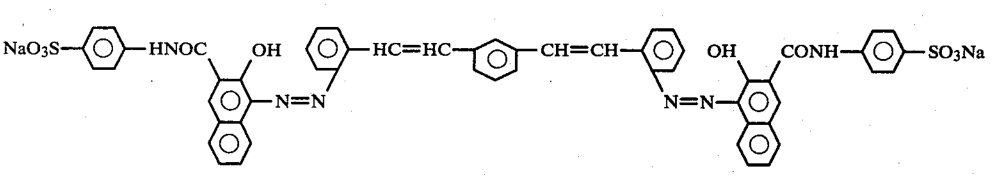 |
| V-30 | 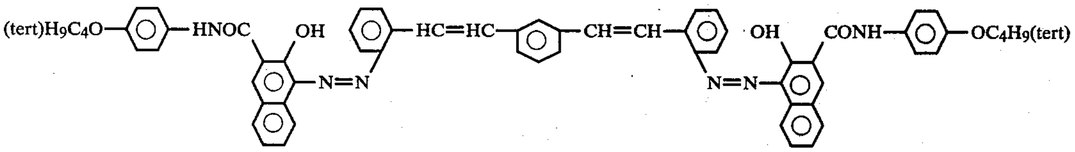 |
| V-31 | 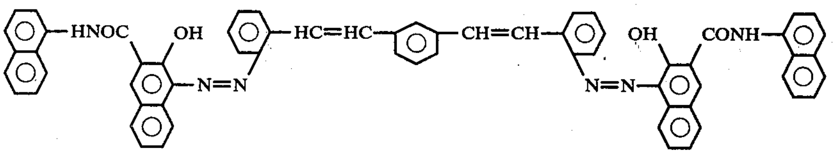 |
| V-32 | 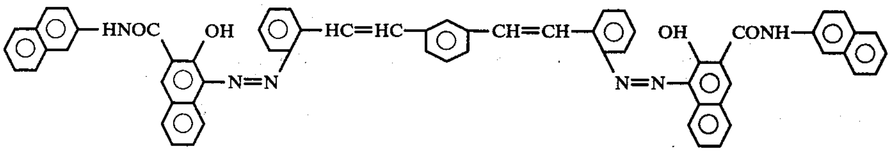 |
| V-33 | 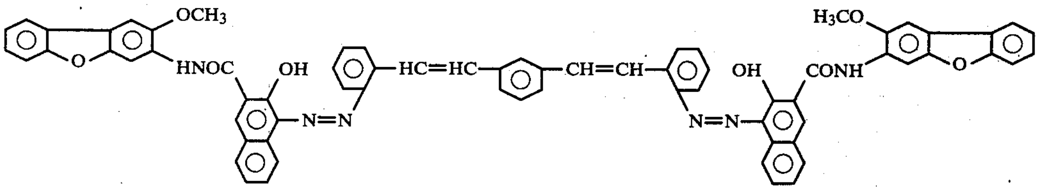 |

-continued
| Pigment No. | Structural formula |
|---|---|
| V-34 | 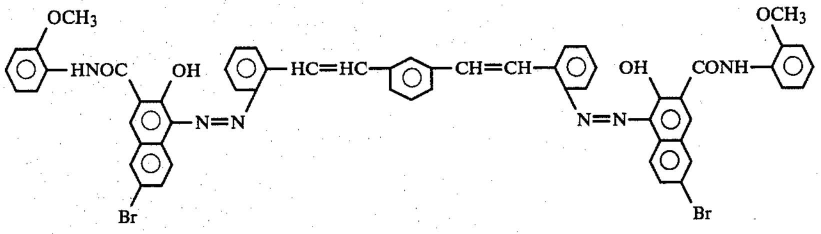 |
| V-35 | 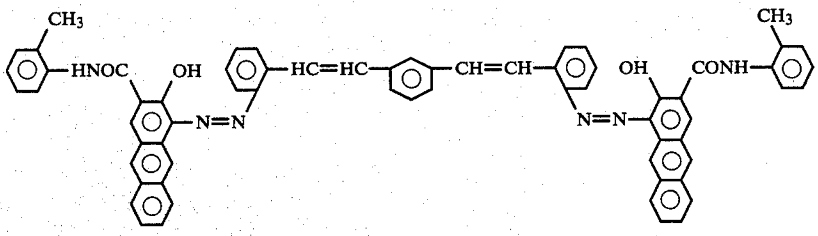 |
| V-36 | 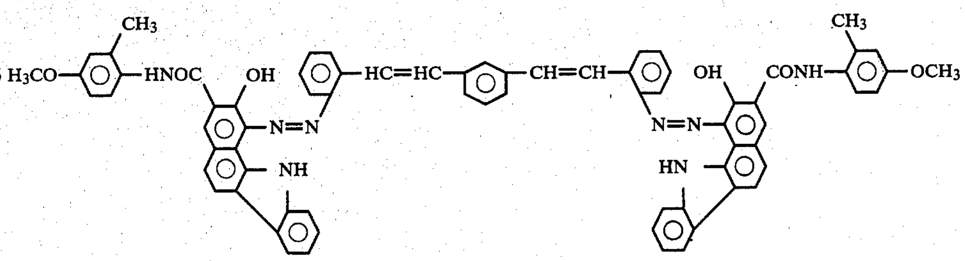 |
| V-37 | 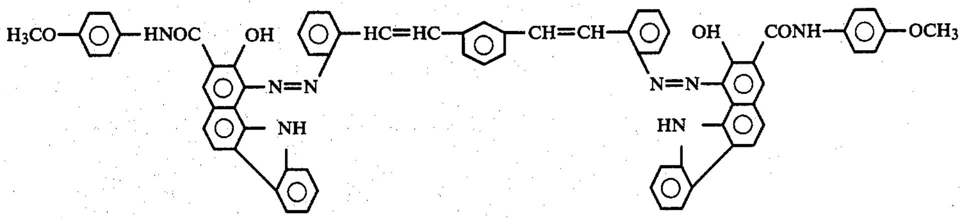 |
| V-38 | 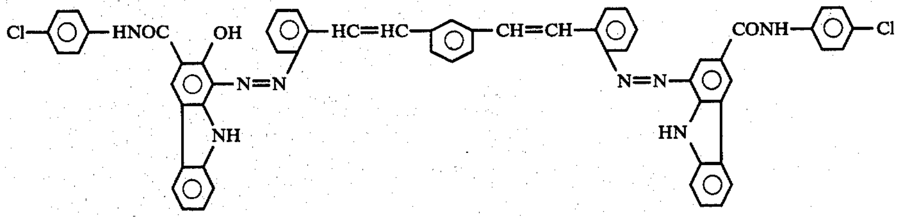 |
| V-39 | 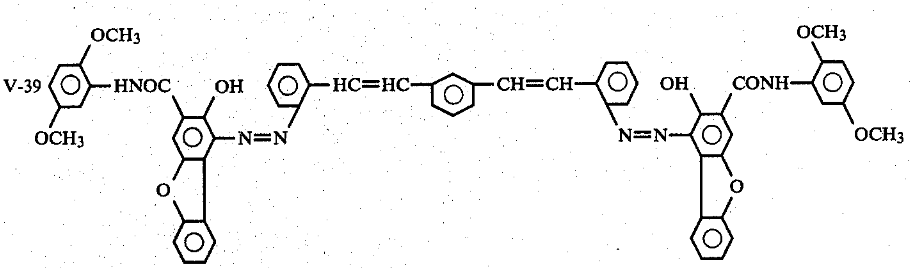 |

-continued
| Pigment No. | Structural formula |
|---|---|
| V-40 | 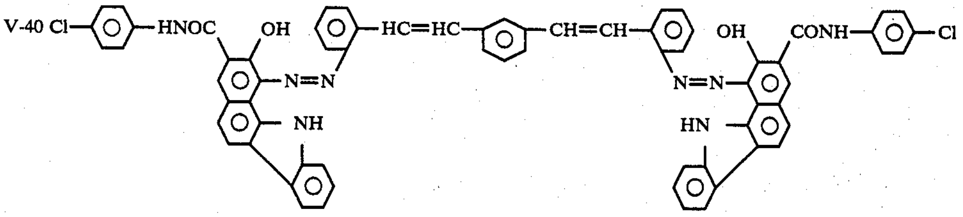 |
| V-41 | 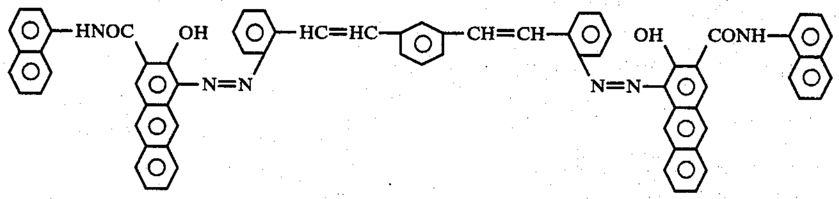 |
| V-42 | 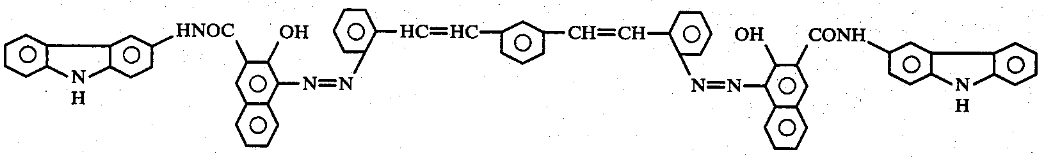 |
| V-43 | 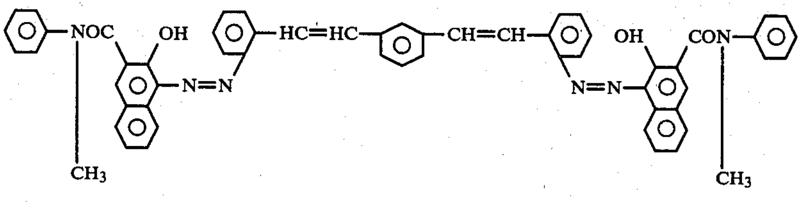 |
| V-44 | 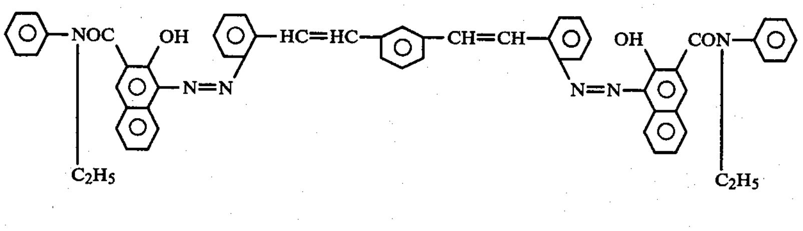 |
| V-45 | 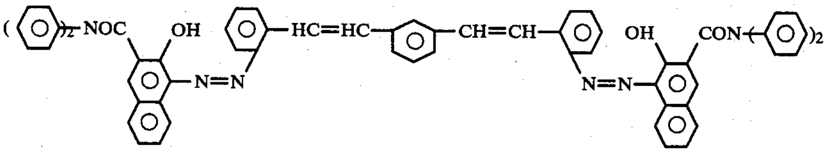 |
| V-46 | 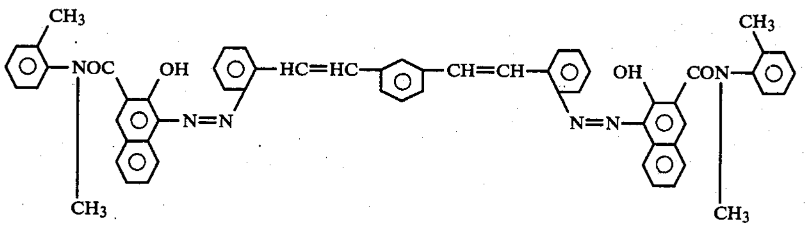 |

-continued
| Pigment No. | Structural formula |
|---|---|
| V-47 | 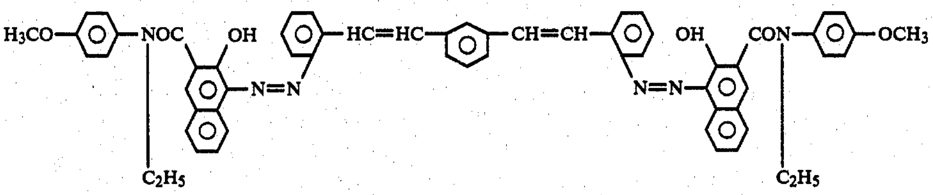 |
| V-48 | 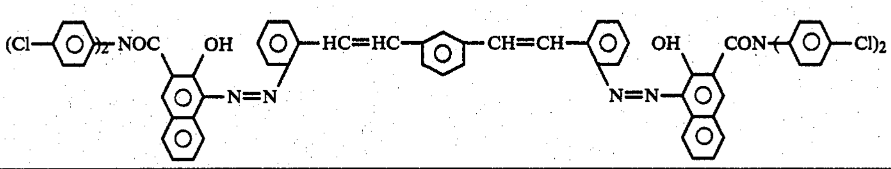 |
(5) Disazo pigments having the general formula (VI)
| Pigment No. | Structural formula |
|---|---|
| VI-1 | 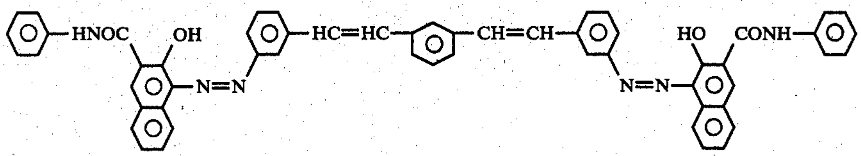 |
| VI-2 | 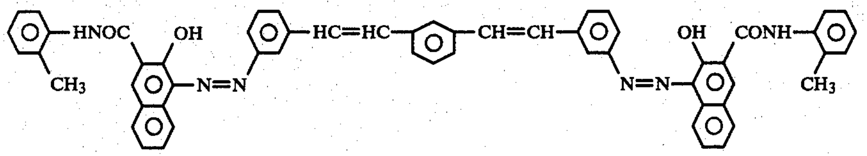 |
| VI-3 | 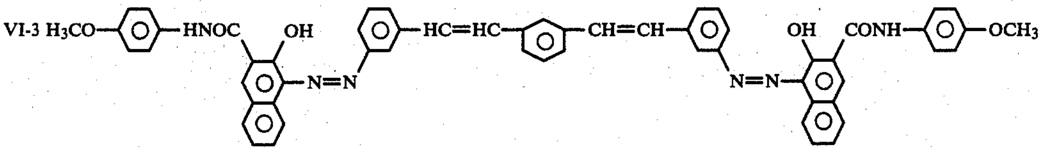 |
| VI-4 | 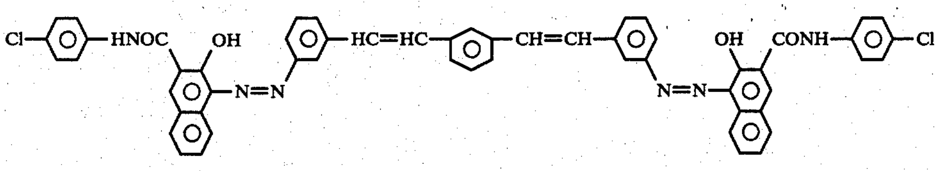 |
| VI-5 | 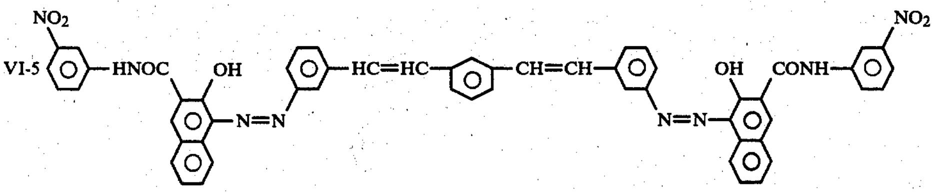 |
| VI-6 | 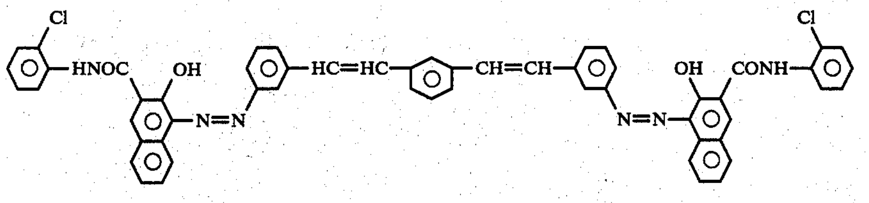 |

-continued
| Pigment No. | Structural formula |
| --- | --- |
| VI-7 | 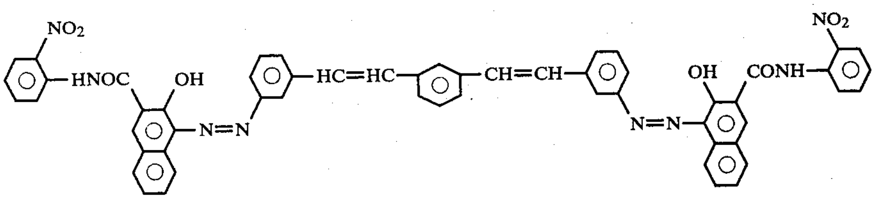 |
| VI-8 | 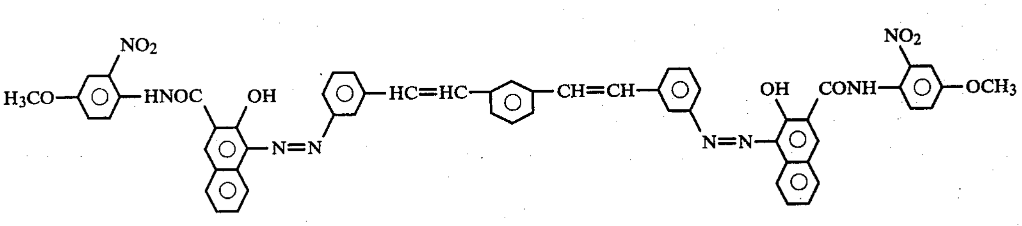 |
| VI-9 | 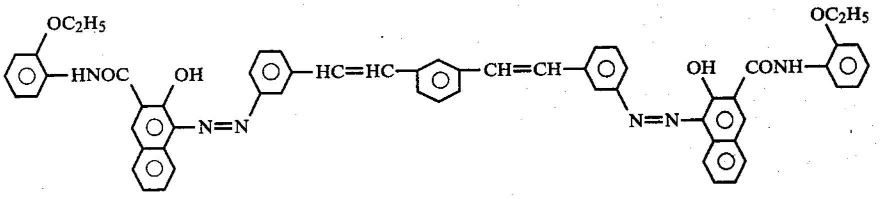 |
| VI-10 | 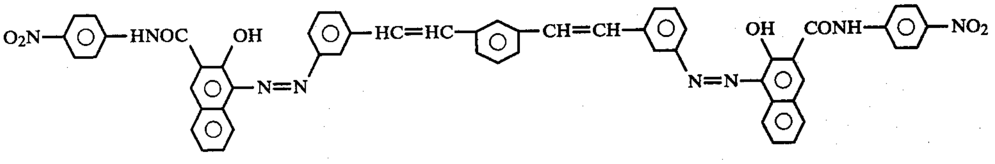 |
| VI-11 | 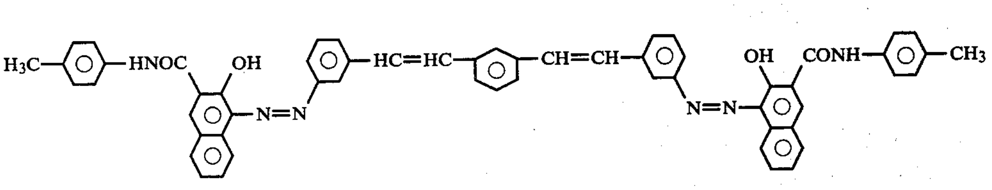 |
| VI-12 | 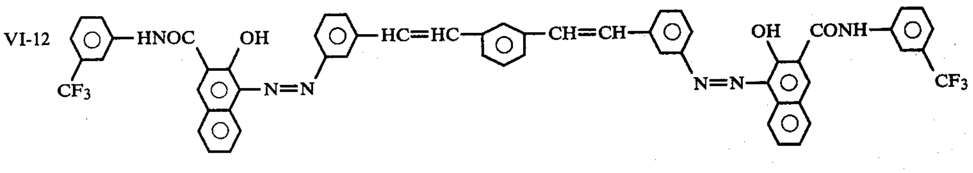 |
| VI-13 | 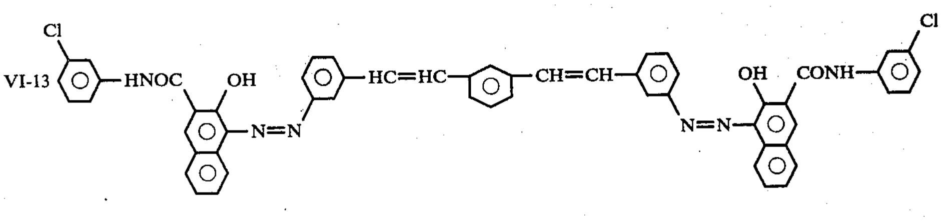 |
| VI-14 | 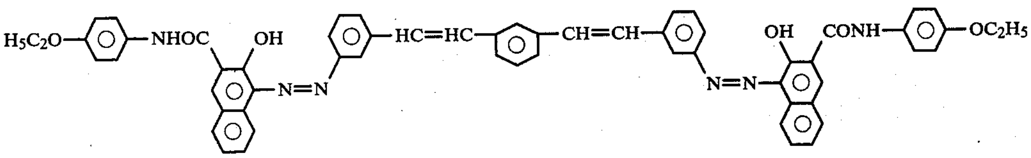 |

-continued
| Pigment No. | Structural formula |
|---|---|
| VI-15 | 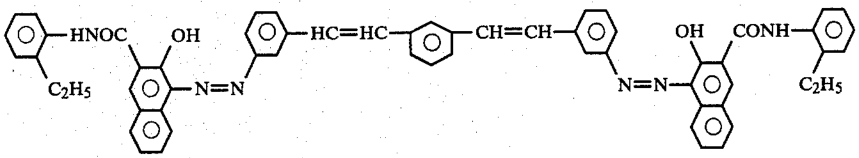 |
| VI-16 | 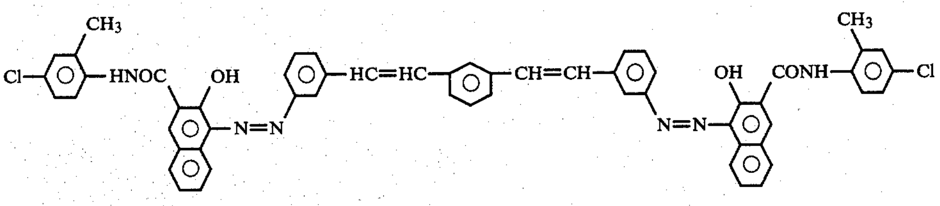 |
| VI-17 | 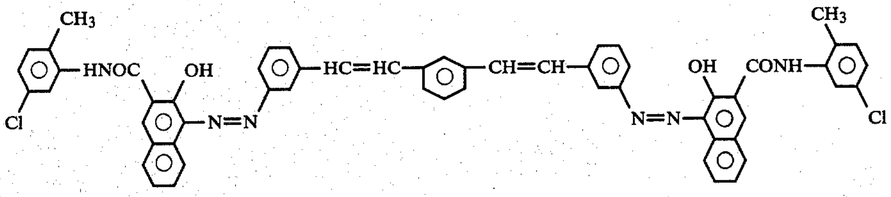 |
| VI-18 | 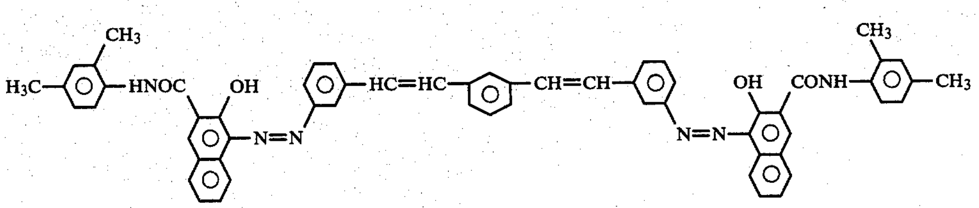 |
| VI-19 | 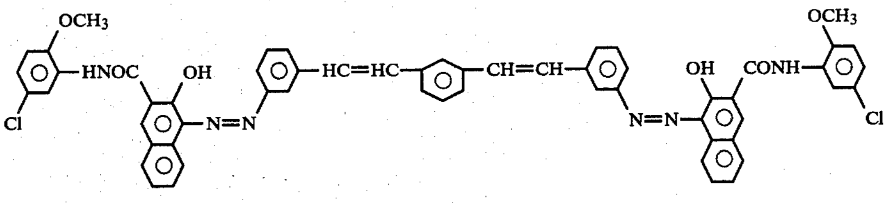 |
| VI-20 | 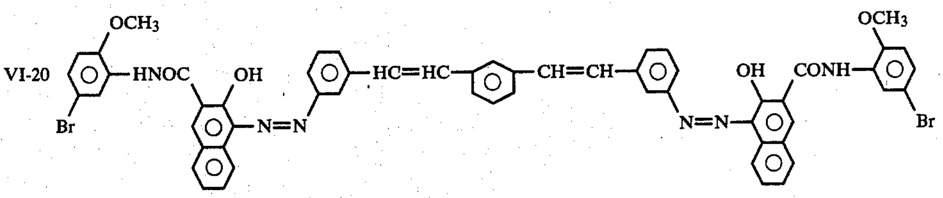 |
| VI-21 | 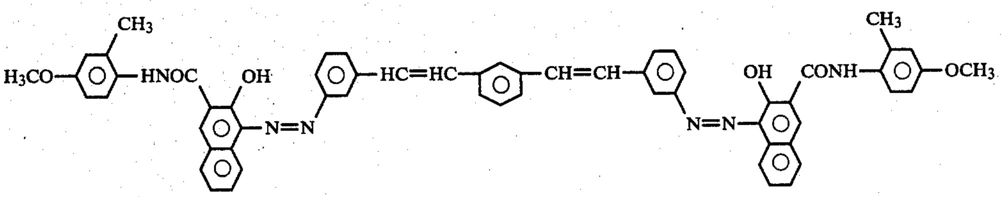 |
| VI-22 | 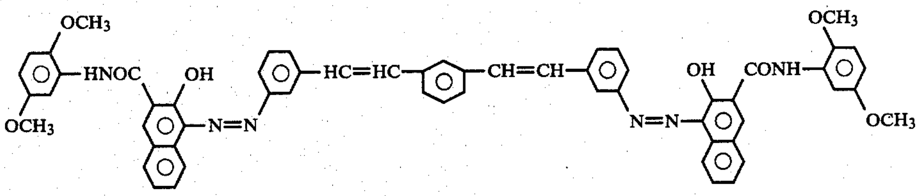 |

-continued
| Pigment No. | Structural formula |
|---|---|
| VI-23 | 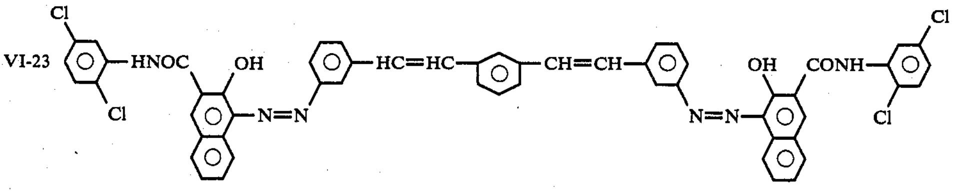 |
| VI-24 | 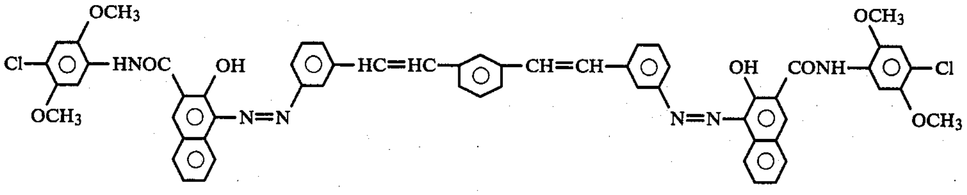 |
| VI-25 | 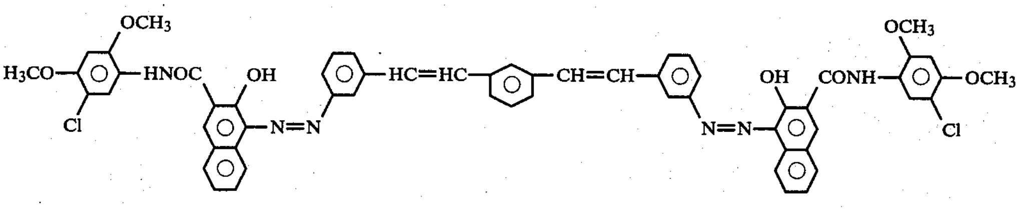 |
| VI-26 | 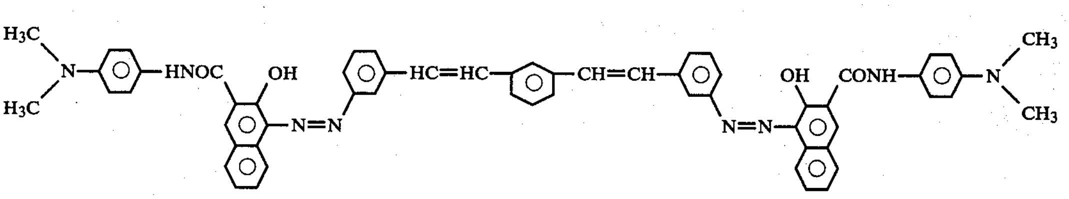 |
| VI-27 | 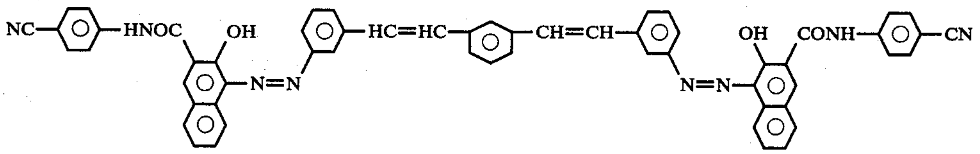 |
| VI-28 | 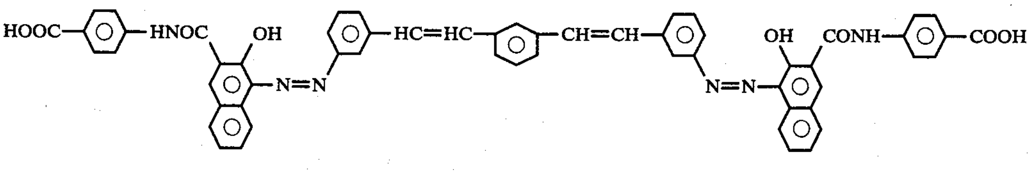 |
| VI-29 | 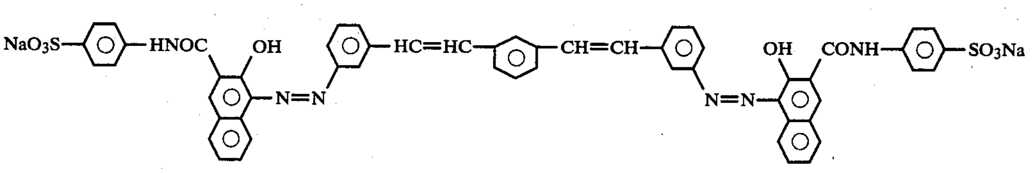 |
| VI-30 | 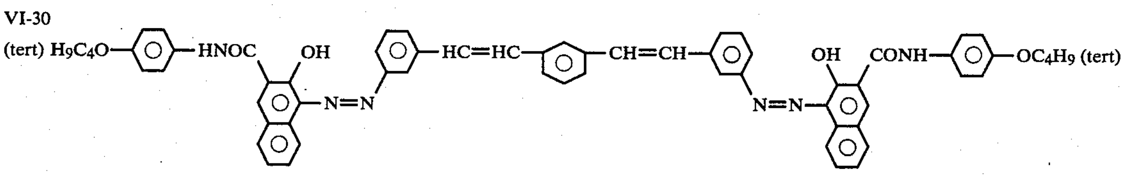 |

-continued
| Pigment No. | Structural formula |
|---|---|
| VI-31 | 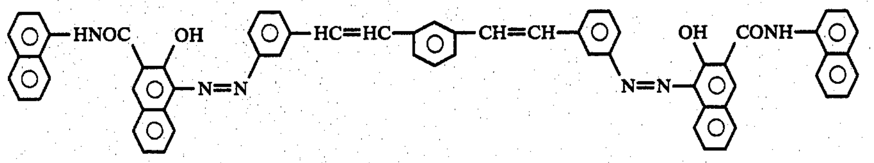 |
| VI-32 | 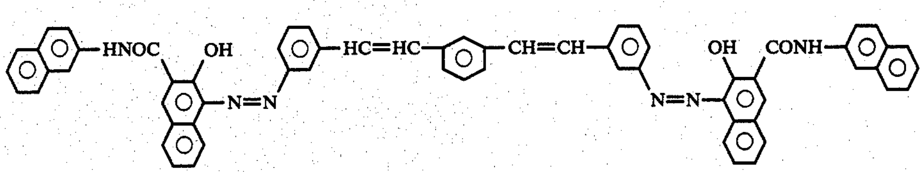 |
| VI-33 | 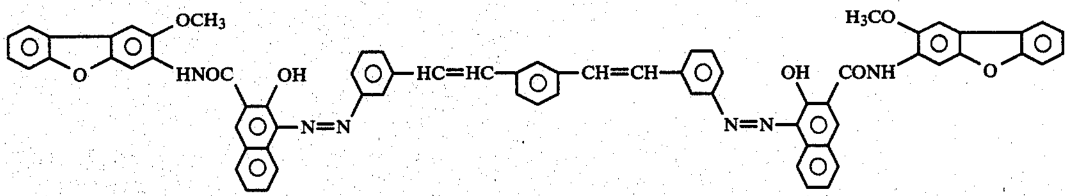 |
| VI-34 | 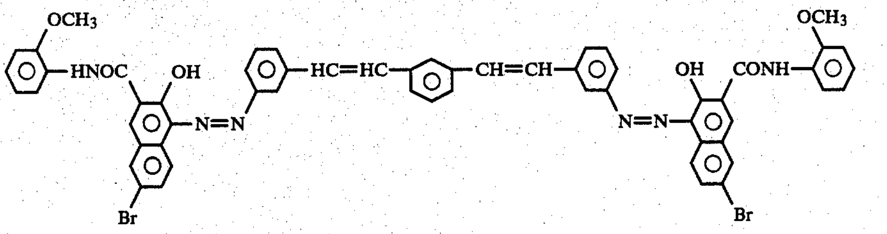 |
| VI-35 | 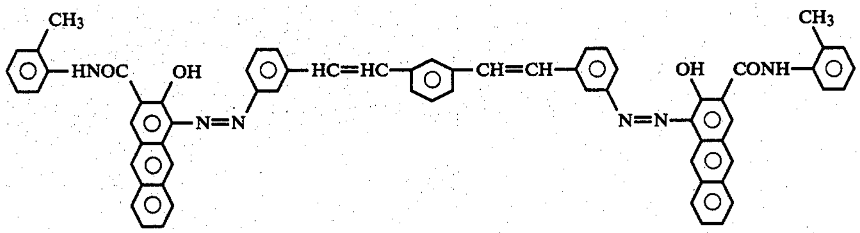 |
| VI-36 | 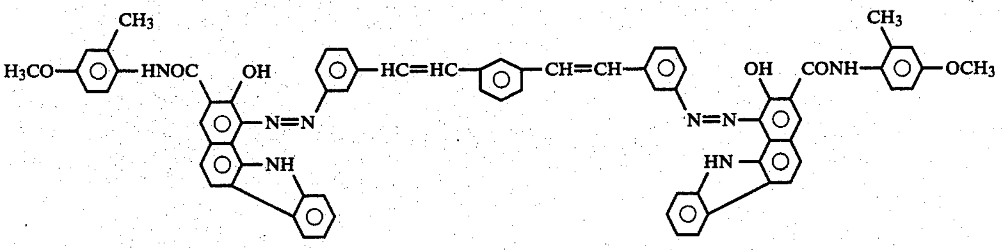 |
| VI-37 | 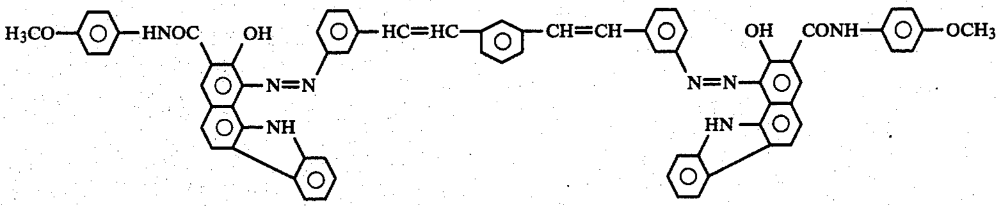 |

-continued
| Pigment No. | Structural formula |
| --- | --- |
| VI-38 | 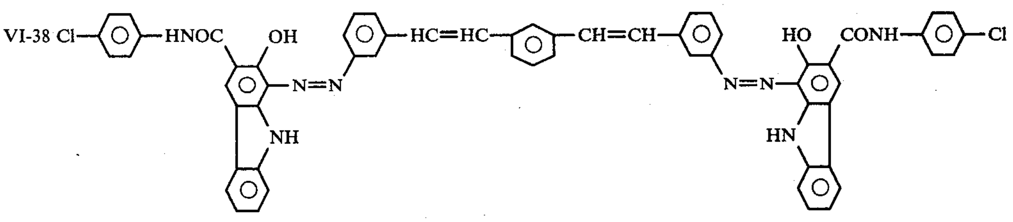 |
| VI-39 | 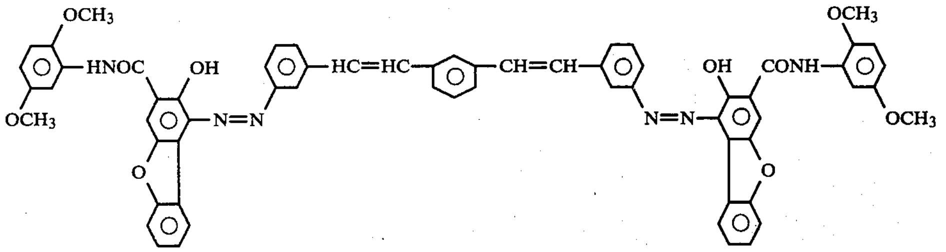 |
| VI-40 | 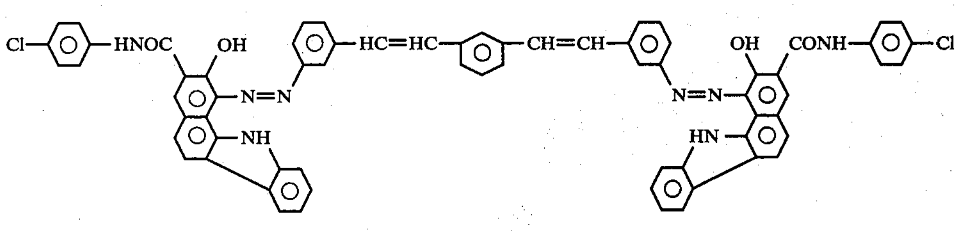 |
| VI-41 | 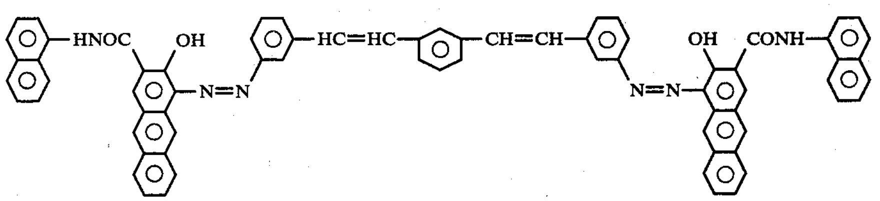 |
| VI-42 | 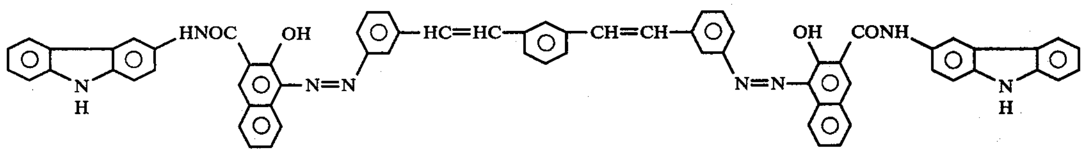 |
| VI-43 | 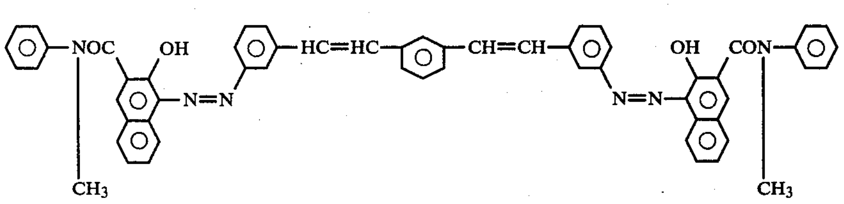 |
| VI-44 | 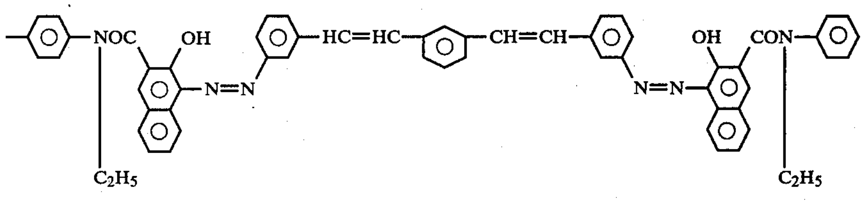 |

-continued
| Pigment No. | Structural formula |
|---|---|
| VI-45 | 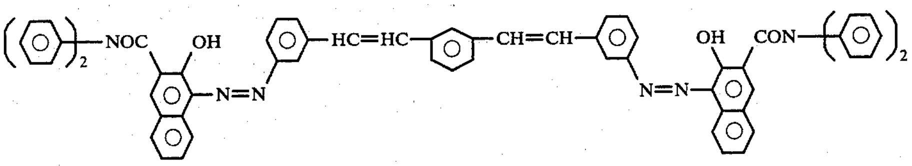 |
| VI-46 | 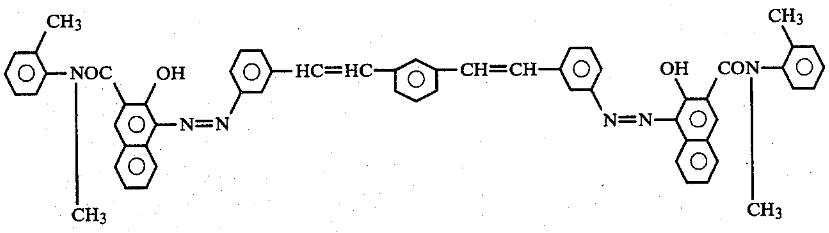 |
| VI-47 | 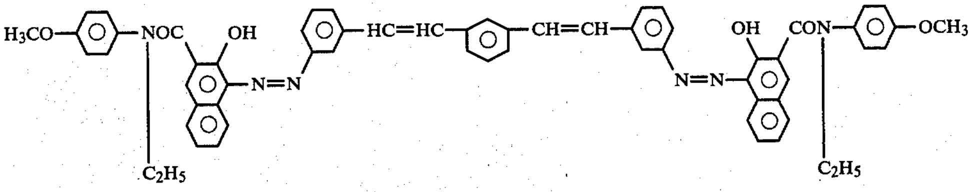 |
| VI-48 | 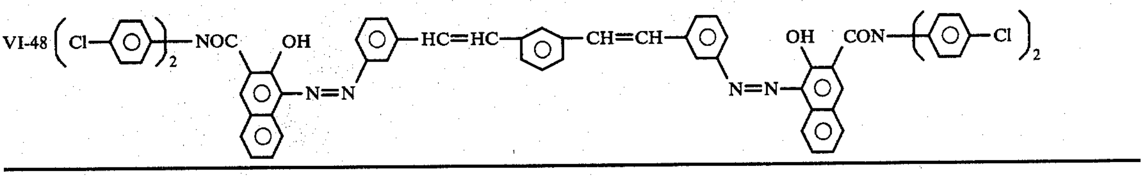 |
(6) Disazo pigments having the general formula (VII)
| Pigment No. | Structural formula |
|---|---|
| VII-1 | 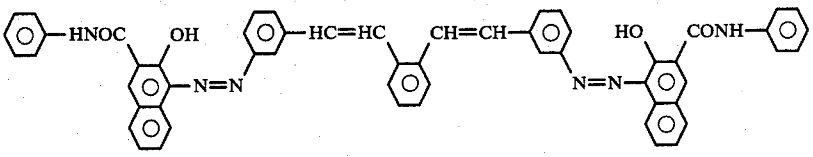 |
| VII-2 | 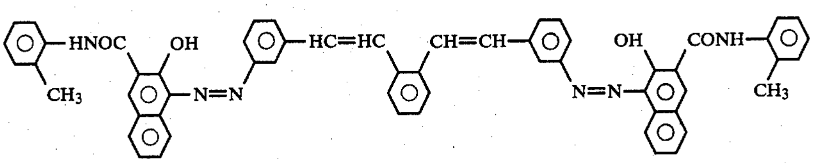 |
| VII-3 | 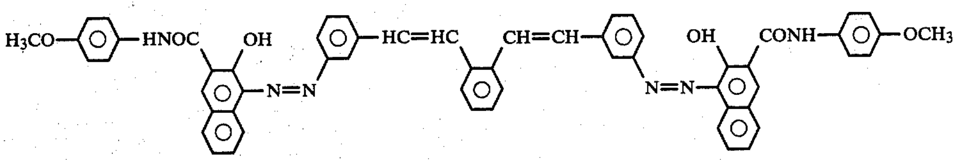 |
| VII-4 | 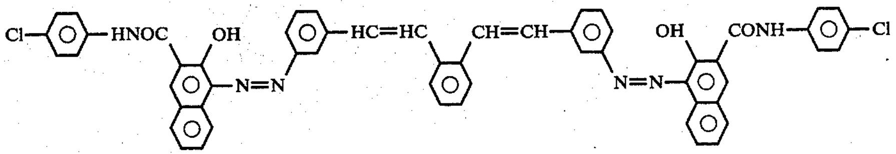 |

-continued
| Pigment No. | Structural formula |
|---|---|
| VII-5 | 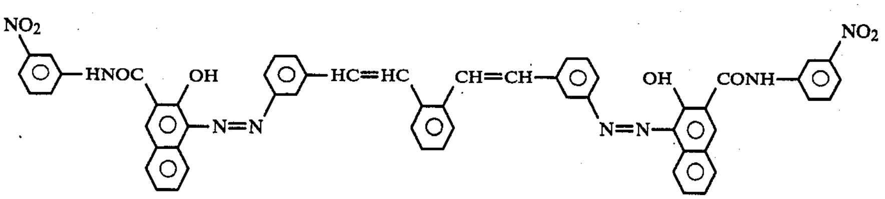 |
| VII-6 | 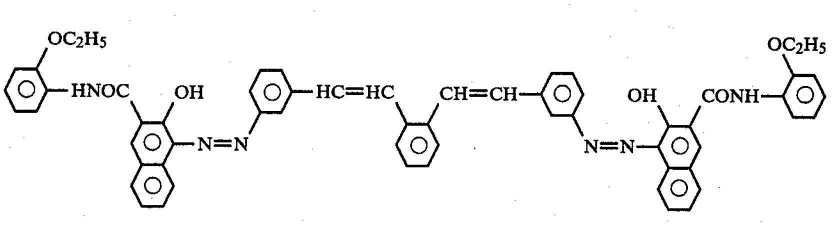 |
| VII-7 | 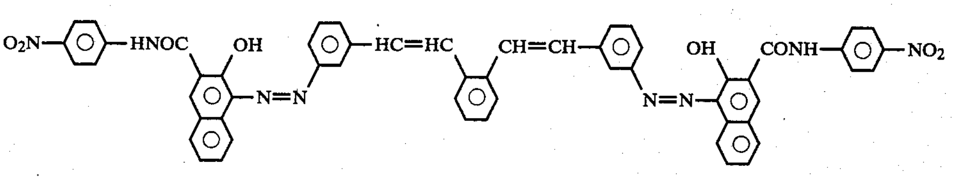 |
| VII-8 | 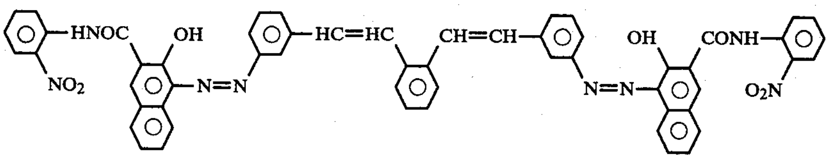 |
| VII-9 | 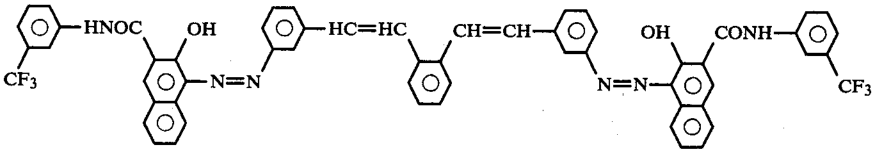 |
| VII-10 | 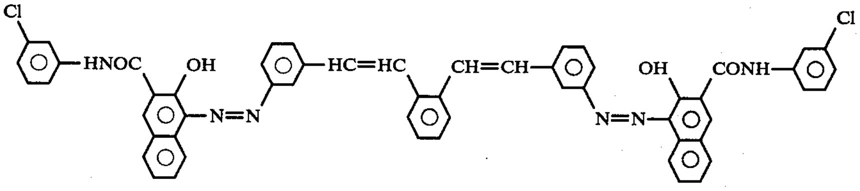 |
| VII-11 | 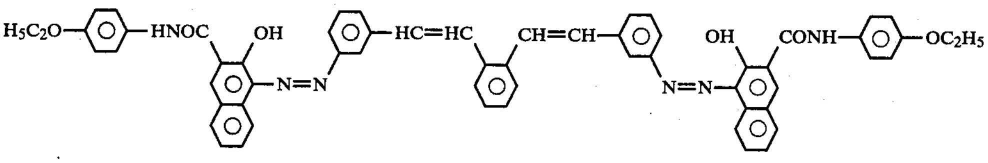 |
| VII-12 | 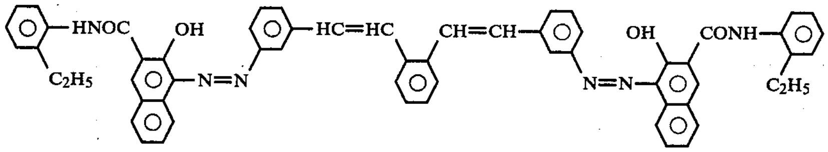 |

-continued
| Pigment No. | Structural formula |
| --- | --- |
| VII-13 | 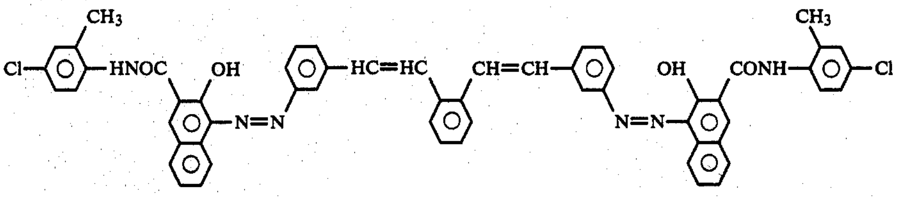 |
| VII-14 | 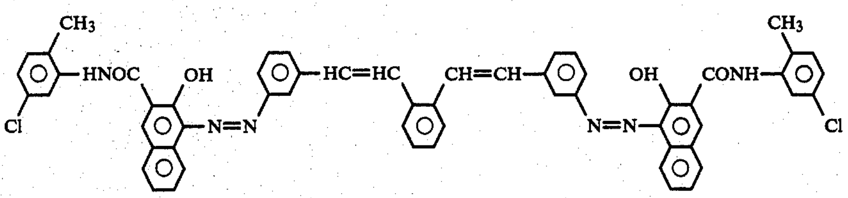 |
| VII-15 | 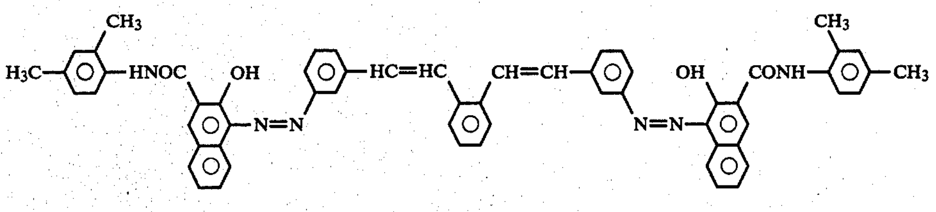 |
| VII-16 | 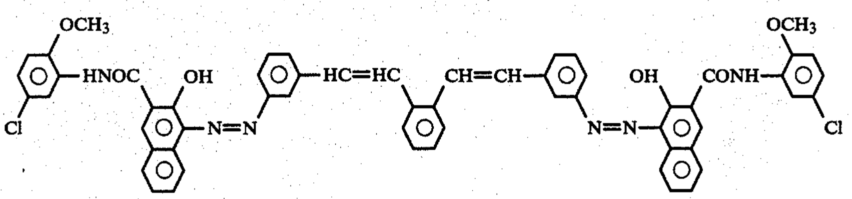 |
| VII-17 | 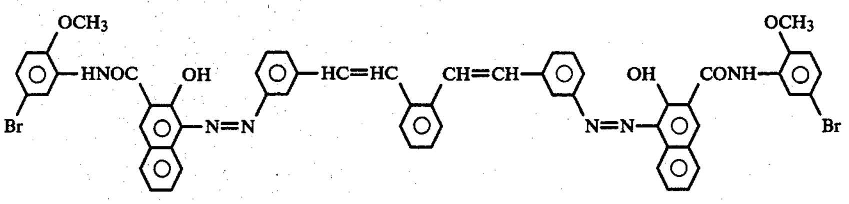 |
| VII-18 | 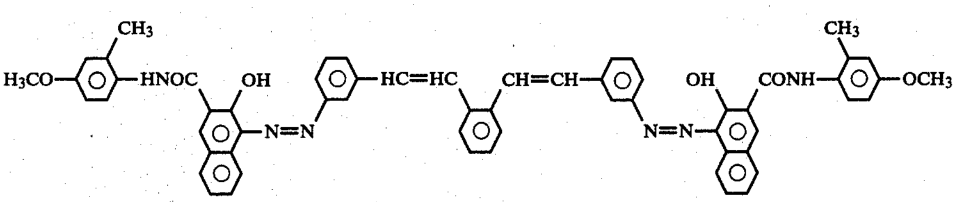 |
| VII-19 | 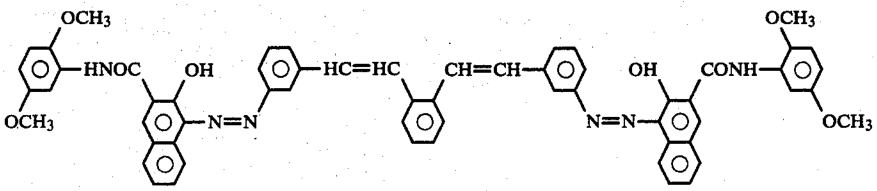 |
| VII-20 | 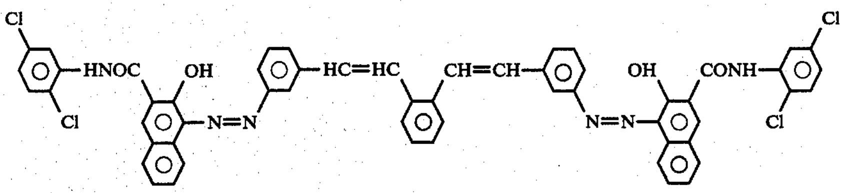 |

-continued
| Pigment No. | Structural formula |
| --- | --- |
| VII-21 | 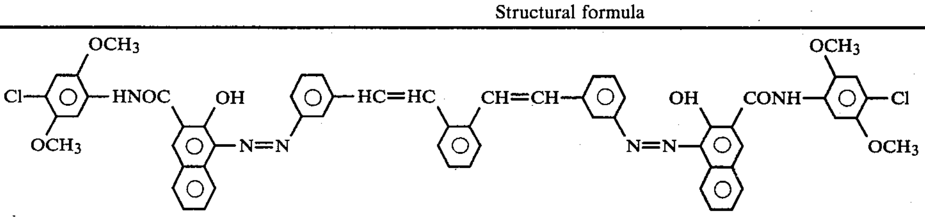 |
| VII-22 | 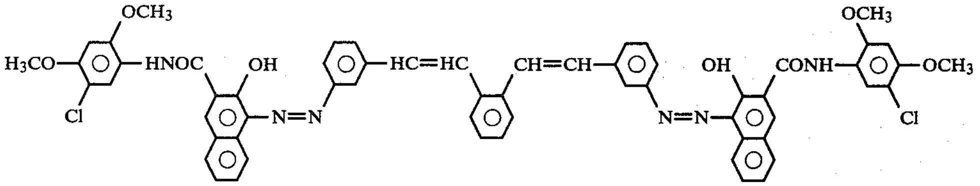 |
| VII-23 | 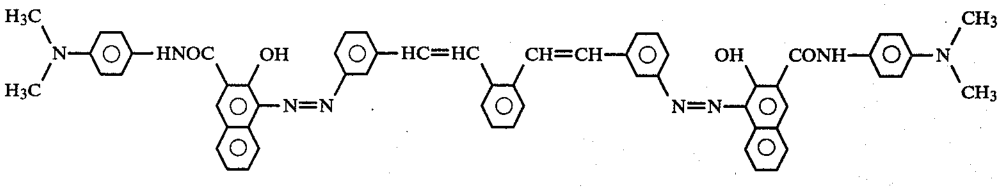 |
| VII-24 | 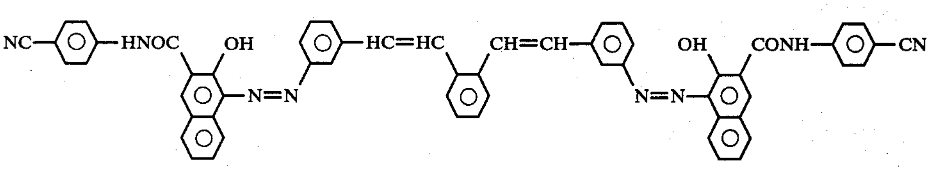 |
| VII-25 | 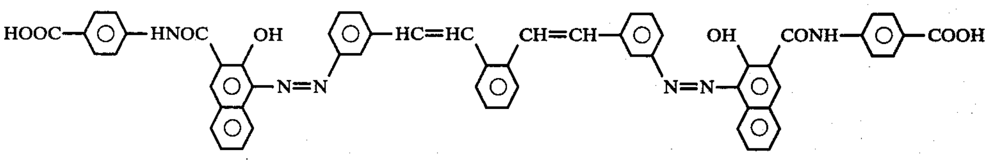 |
| VII-26 | 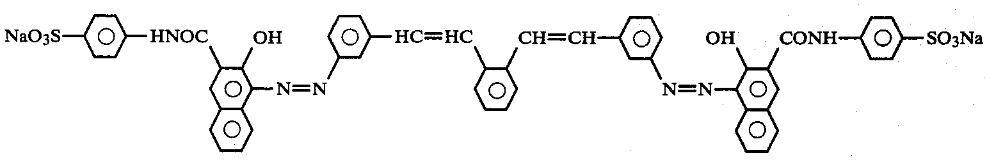 |
| VII-27 | 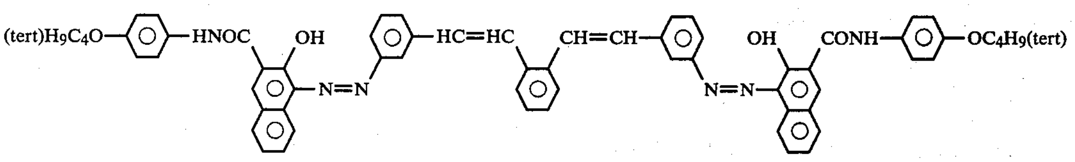 |
| VII-28 | 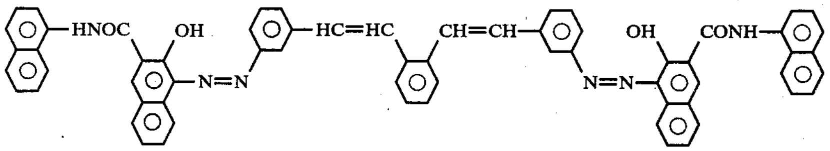 |
| VII-29 | 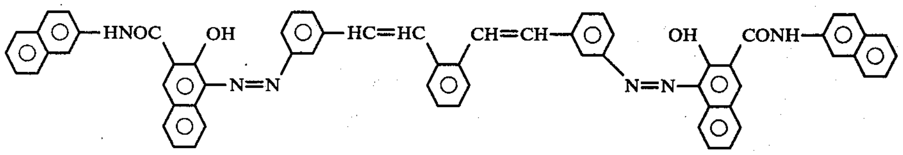 |

-continued
| Pigment No. | Structural formula |
|---|---|
| VII-30 | 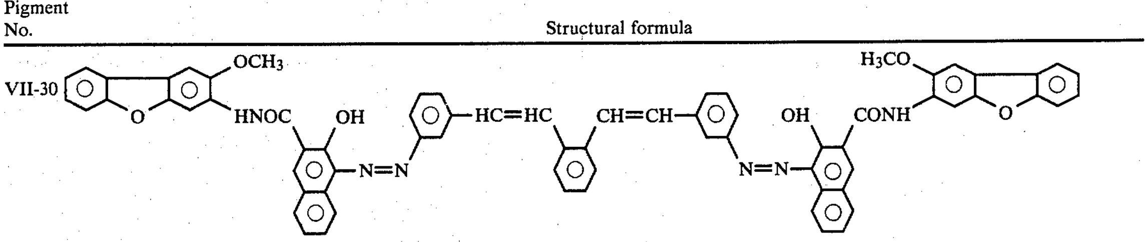 |
| VII-31 | 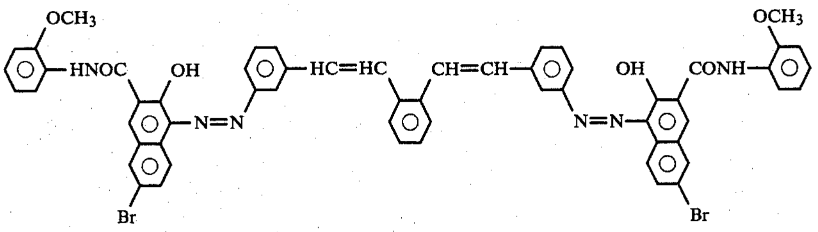 |
| VII-32 | 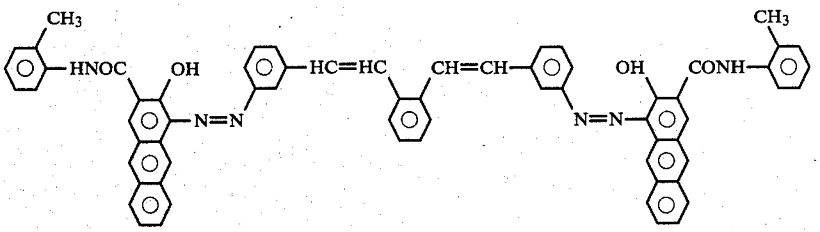 |
| VII-33 | 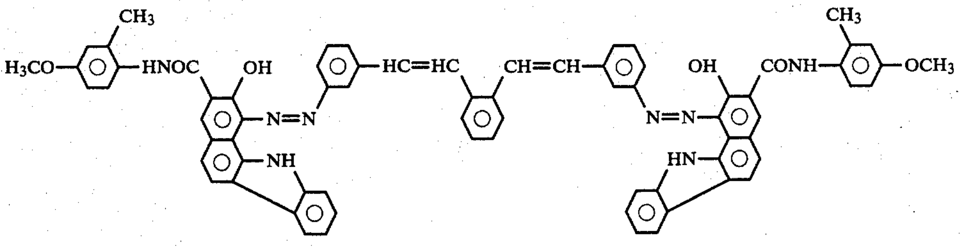 |
| VII-34 | 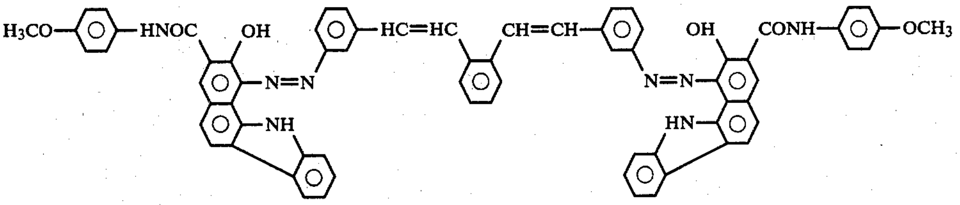 |
| VII-35 | 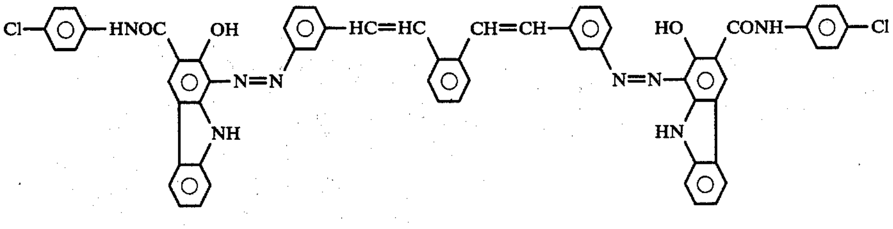 |
| VII-36 | 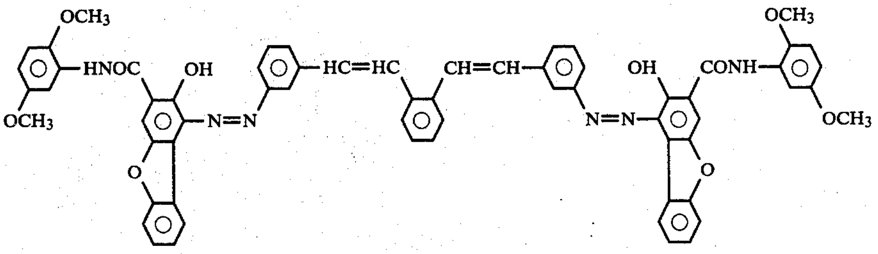 |

-continued
| Pigment No. | Structural formula |
| --- | --- |
| VII-37 | 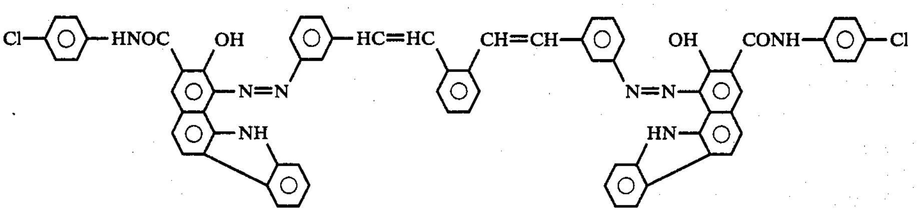 |
| VII-38 | 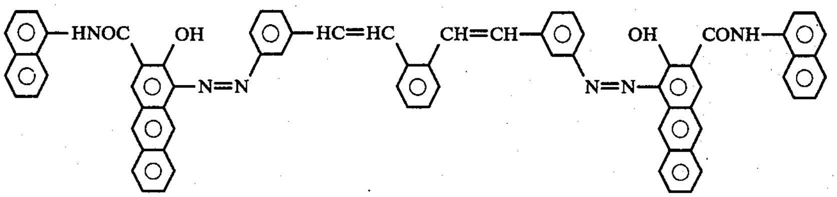 |
| VII-39 | 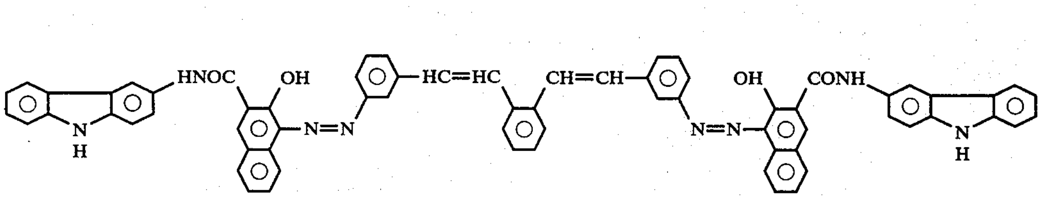 |
| VII-40 | 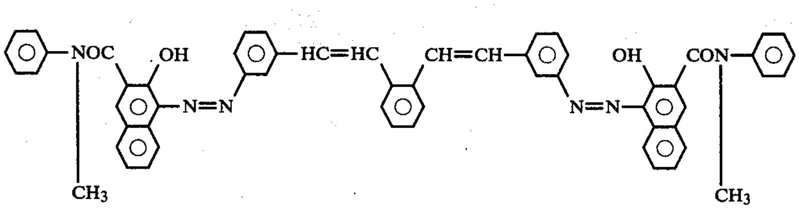 |
| VII-41 | 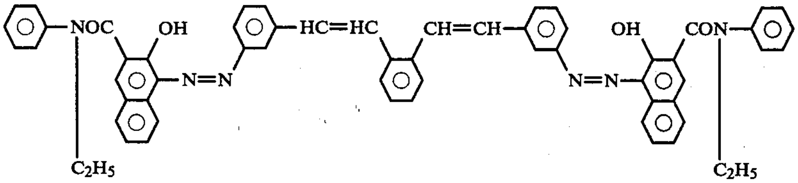 |
| VII-42 | 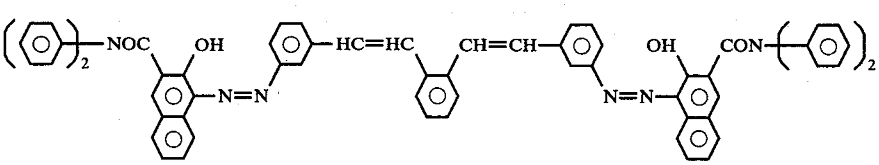 |
| VII-43 | 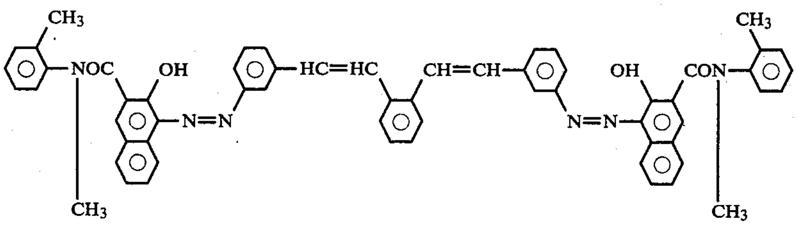 |

-continued

| Pigment No. | Structural formula |
|---|---|
| VII-44 | 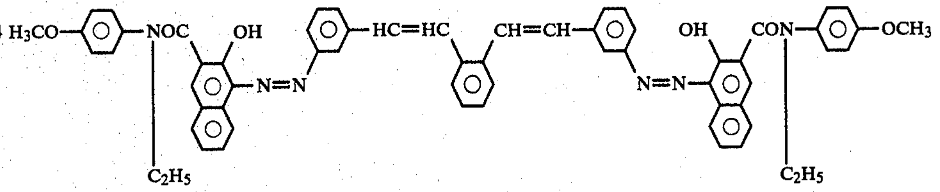 |
| VII-45 | 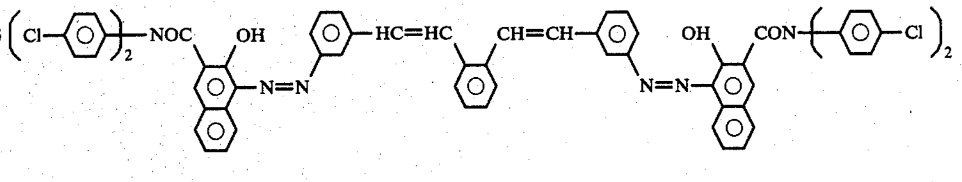 |
| VII-46 | 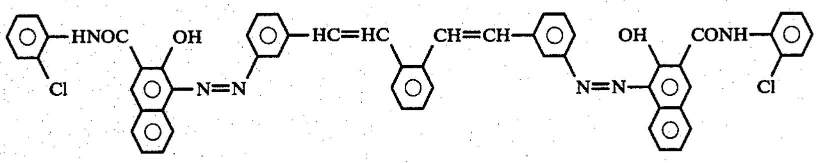 |
| VII-47 | 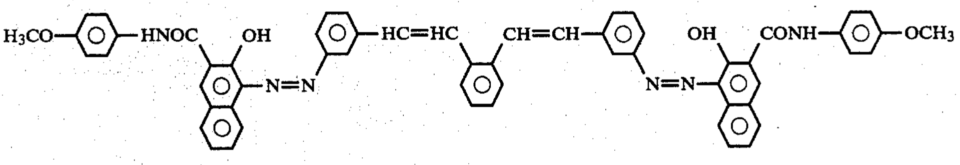 |
| VII-48 | 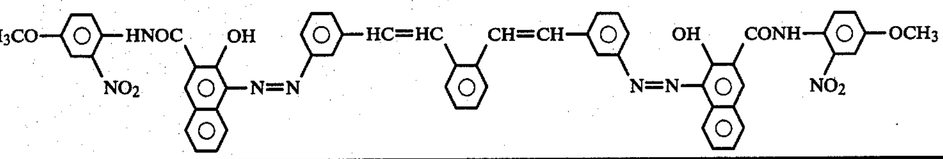 |

The above enumerated disazo pigments can be manufactured readily by diazotizing Diamino distyryl benzene to isolate tetrazonium salt and subjecting it to the coupling reaction in a suitable organic solvent, for instance, such as N,N-dimethyl formamide and in the presence of a coupler corresponding to each of the above enumerated disazo pigments and alkali.

Preparation Example 1 (Tetrazonium difluoroborate)

28.0 g of 1,4-bis(3-aminostyryl)benzene were added to a dilute hydrochloric acid solution consisting of 1200 ml of water and 60 ml of concentrated hydrochloric acid. The resulting mixture was stirred at 60° C. for 30 minutes and then cooled to 0° C. In succession, a solution obtained by dissolving 13.0 g of sodium nitrite in 40 ml of water was dropped therein at a temperature ranging from 0° to 3° C. over 40 minutes. Subsequently, the same was stirred for 30 minutes at the same temperature, and then a very small quantity of insoluble matter was filtered out therefrom. 50 ml of a 42% borofluoric acid were added to this filtrate. The thus separated crystals were filtered out, washed with water and dried to obtain 42.8 g (yield: 91.0%) of tetrazoniumdifluoroborate fulvescent crystals. This crystal was observed to have a decomposition point of 74° C. or more. And, referring to its infrared absorption spectrum taken by KBr tablet method, there were observed the absorption zone caused by $N_2$ at the wave number of 2260 $cm^{-1}$ and that caused by the trans-CH═CH— at the wave number of 965 $cm^{-1}$.

Preparation Example 2-6

The same procedure as Preparation Example 1 was followed with the exception that the diamino compounds as enumerated in the following Table A were employed in place of the 1,4-bis(3-aminostyryl) benzene to thereby obtain tetrazonium difluoroborates. The obtained results are as shown in Table A.

TABLE A

| Preparation Example No. | Diamino compound | Tetrazonium difluoroborate | | | | |
|---|---|---|---|---|---|---|
| | | Appearance | Yield (%) | Decomposition point (°C.) | IR spectrum (KBr) $cm^{-1}$ | |
| | | | | | $\nu N_2$ | δt-CH=CH— |
| 2 | 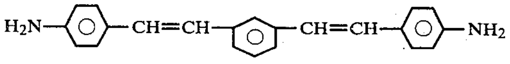 | yellow | 95.0 | 105 | 2240 | 960 |
| 3 | 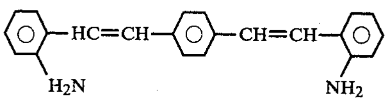 | orange | 92.0 | 83 | 2230 | 960 |
| 4 | 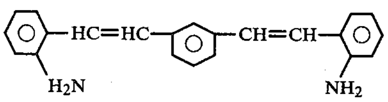 | yellow | 94.0 | 92 | 2240 | 965 |
| 5 | 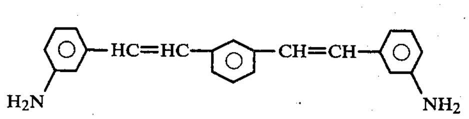 | yellow | 91.8 | 70 | 2250 | 965 |
| 5 | 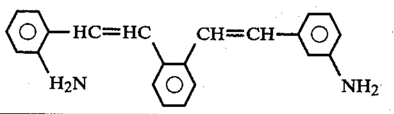 | brownish yellow | 90.2 | 70 | 2260 | 960 |

Preparation Example 7 (Aforesaid No. II-1 disazo pigment)

3.0 g of the tetrazonium salt obtained according to Preparation Example 1 and 3.3 g of 2-hydroxy-3-anilide naphthoate serving as a coupler were dissolved in 390 ml of cooled N,N-dimethylformamide. A solution consisting of 1.9 g of sodium acetate and 20 ml of water was dropped in the former solution at a temperature ranging from 4° to 8° C. for 1 hour, and thereafter the same was stirred at room temperature for about 3 hours. Then, precipitates were filtered out, washed three times with 300 ml of water, and further washed seven times with 300 ml of N,N-dimethylformamide. The thus obtained red crystalline product was dried at 70° C. under a reduced pressure of 2 mmHg, thereby obtaining 4.7 g (yield: 91%) of No. II-1 disazo pigment. This pigment was observed to have a melting point of 250° C. or more.

The obtained elementary analysis results are as shown below.

| | Calculated value (%) | Measured value (%) |
|---|---|---|
| C | 78.11 | 77.95 |
| H | 4.69 | 4.51 |
| N | 9.76 | 9.61 |

With reference to the infrared absorption spectrum taken by KBr tablet method there were observed an absorption zone caused by secondary amide at the wave number of 1680 $cm^{-1}$ and that caused by the trans-CH=CH— at the wave number of 955 $cm^{-1}$.

Preparation Examples 8-12

The same procedure as Preparation Example 7 with the exception that the tetrazonium salts obtained according to Preparation Examples 2-6 were employed in place of the tetrazonium salt employed in Preparation Example 7 was repeated to obtain disazo pigments of this invention. The obtained results are as shown in Table B.

TABLE B

| Preparation Example No. | Disazo pigment No. | Appearance | Yield (%) | Melting point (°C.) | Elementary analysis[a] (%) | | | IR spectrum (KBr) $cm^{-1}$ | |
|---|---|---|---|---|---|---|---|---|---|
| | | | | | Cobtd. | Hobtd. | Nobtd. | νc = 0 | δt-CH=CH— |
| 8 | III-1 | reddish purple | 89.0 | >250 | 77.85 | 4.70 | 9.75 | 1680 | 960 |
| 9 | IV-1 | dark red | 91.0 | >250 | 77.82 | 4.78 | 9.72 | 1675 | 960 |
| 10 | V-1 | dark red | 93.0 | >250 | 77.90 | 4.56 | 9.55 | 1680 | 950 |
| 11 | VI-1 | red | 75.6 | >250 | 77.85 | 4.70 | 9.52 | 1670 | 955 |
| 12 | VII-1 | orange red | 91.0 | 300 (dec.) | 77.88 | 4.61 | 9.51 | 1680 | 960 |

[a]The values calculated with disazo pigments III-1~VII-1 are all the same.
Ccalcd. = 78.11%, Hcalcd. = 4.69%, Ncalcd. = 9.76%

The electrophotographic elements according to the present invention, which contain the above enumerated disazo pigments, make take the forms as illustrated in FIGS. 1 to 3 depending on the application modes of these pigments.

The element illustrated in FIG. 1 comprises, in successive layers; an electrically conductive substrate 1, a charge carrier generating layer 5 consisting essentially of a disazo pigment 3 and a charge transfer layer 6 consisting essentially of a charge transfer material.

In the element illustrated in FIG. 1, said element is exposed to light in an imagewise manner and said light passes through the charge transfer layer and reaches the charge carrier generating layer 5 to thereby permit the disazo pigment 3 at the light struck portions of the element to generate charge carriers. The charges generated in the charge carrier generating layer are injected into the charge transfer layer 6 and are transported therethrough. Accordingly, the element of the present invention may be said to have a mechanism so designed that the generation of charge carriers required for light decay is made by the disazo pigment and the transfer of charges is made by the charge transfer layer. In this regard, it is to be understood that in this instance the relative position of the charge carrier generating layer to the charge transfer layer may be inverted.

The element illustrated in FIG. 2 comprises an electrically conductive substrate 1 and a photosensitive layer 2', superposed thereon, consisting essentially of a disazo pigment 3 and a charge transfer medium 4, said medium consisting of a charge transfer material and an insulating binder. The disazo pigment referred to herein is likewise a charge carrier generating material.

The element illustrated in FIG. 3 comprises an electrically conductive substrate 1 and a photosensitive layer 2'', superposed thereon, consisting essentially of a disazo pigment 3 (which is used herein as a photoconductive material) and an insulating binder.

The element illustrated in FIG. 1 can be prepared by vacuum depositing the disazo pigment onto the electrically conductive substrate in accordance with the vacuum deposition methods disclosed in U.S. Pat. Nos. 3,973,959; 3,996,049; etc., or by coating, if need be, a dispersion, which is obtained by dispersing fine disazo pigment particles in a suitable solvent with a binder dissolved therein, onto the electrically conductive substrate and drying, or by coating a solution containing a charge transfer material and a binder onto the electrically conductive substrate after surface finishing or film-thickness controlling has been completed by buffing as disclosed, for instance, in Japanese Laid-open Patent Application No. 90827/1976 or the like and drying.

The element illustrated in FIG. 2 can be prepared by dispersing fine disazo pigment particles in a solution having dissolved therein a charge transfer material and a binder, coating the resulting dispersion onto an electrically conductive substrate and drying.

The element illustrated in FIG. 3 can be prepared by dispersing fine disazo pigment particles in a binder solution, coating the resulting dispersion onto an electrically conductive substrate and drying.

In this connection, it is to be understood that in each case the disazo pigment to be utilized in the present invention is pulverized by means of a ball mill or the like so that the particle size thereof may be 5μ or less, preferably 2μ or less. The coating is effected by means of the conventional methods, for instance, such as doctor blade coating, dip coating, wire bar coating or the like.

Reference will be made to the thickness of the photosensitive layer. In the case of the element illustrated in FIG. 1, the thickness of the charge carrier generating layer is between 0.01μ to 5μ, preferably between 0.05μ to 2μ. When this thickness is less than 0.01μ the generation of charge carriers is insufficient, while when said thickness is over 5μ the residual potential is too high to be put to practical use. Referring to the thickness of the charge transfer layer, it is between 3μ to 50μ, preferably between 5μ to 20μ. When this thickness is less than 3μ the quantity of electricity charged is insufficient, while when said thickness is more than 50μ the residual potential is too high to be put to practical use. The percentage of the disazo pigment contained in the charge carrier generating layer 5 desirably is 30% by weight or more, preferably 50% by weight or more. The percentage of the charge transfer material contained in the charge transfer layer is between 10 to 95% by weight, preferably between 30 to 90% by weight. When the percentage of the charge transfer material occupying the charge transfer layer is less than 10% by weight the transfer of charges scarcely takes place, and on the other hand when said percentage is more than 95% by weight the element can not be put to practical use because the mechanical strength of the film of the photosensitive layer is extremely deteriorated.

In the element illustrated in FIG. 2, the thickness of the photosensitive layer 2' is between 3 and 50μ, preferably between 5 and 20μ, and the percentage of the disazo pigment 3 contained in the photosensitive layer 2' is less than 50% by weight, preferably 20% by weight or less.

In the element illustrated in FIG. 3, the thickness of the photosensitive layer is between about 3μ to 50μ, preferably between 5 to 20μ, and the percentage of the disazo pigment contained in the photosensitive layer is between 30 to 70% by weight relative to the photosensitive layer, preferably about 50% by weight.

In this regard, it is to be understood that plasticizers may be employed in conjunction with binders in the preparation of each one of elements illustrated in FIGS. 1 to 3.

As the electrically conductive substrates suitably used for the elements of the present invention there can be enumerated metal plates of aluminum, copper, zinc, etc.; plastic sheets or film such as polyester or the having deposited thereon electrically conductive substance like aluminum, $SnO_2$, etc.; or electroconductively treated papers, etc.

As the binders suitably used for the present invention there can be enumerated condensation resins such as polyamide resins, polyurethane resins, polyester resins, epoxy resins, polyketone resins, polycarbonate resins, etc.; vinyl polymers such as polyvinylketone, polystyrene, poly-N-vinylcarbazole, polyacrylamide, etc.; and the like. However, it is to be undersood that any insulating and adhesive resins may be employed in the present invention.

As the plasticizers suitable for the present invention there can be enumerated halogenized paraffin, polychlorobiphenyl, dimethylnaphthalene, dibutyl phthalate, etc. Silicone oil and the like may be added thereto in order to improve the surface smoothness of the element.

As particular preferred charge transfer materials, furthermore, there can be enumerated high molecular ones, namely, vinyl polymers such as poly-N-vinyl carbazole, polyvinyl indoloquinoxaline, polyvinyldibenzothiophene, polyvinyl anthracene, polyvinyl acridine, etc. and condensation resins, such as bromopyrene∼formaldehyde resin, ethylcarbazole∼formaldehyde resin, etc.; and low molecular ones (monomers) such as 2,4,7-trinitro-9-fluoroenone, 2,6,8-trinitro-4H-indeno[1,2-b]thiophene-4-one, 2,8-dinitrodibenzothiophene, 1,3,7-trinitrodibenzothiophene-5,5-dioxide, 1,3,7,9-tetranitrobenzo[c]cinnoline-5-oxide, 2,4,8-trinitrothioxanthone, 1-bromopyrene, N-ethylcarbazole, 2-phenylindole, 2-phenylnaphthalene, 2,5-bis(4-diethylaminophenyl)-1,3,4-oxadiazole, 2,5-bis(4-diethylaminophenyl)-1,3,4-triazole, 1-phenyl-3-(4-diethylaminostyryl)-5-(4-diethylaminophenyl) pyrazoline, 2-phenyl-4-(4-diethylaminophenyl)-5-phenyloxazole, triphenylamine, tris(4-diethylaminophenyl)methane, 3,6-bis(dibenzylamino)-9-ethylcarbazole, 4,4′-bis(dibenzylamino)diphenylmethane, 4,4′-bis(dibenzylamino)diphenylether, 1,1-bis(4-dibenzylaminophenyl)propane, 2-(α-naphthyl)-5-(4-diethylaminophenyl)-1,3,4-oxadiazole, 2-styryl-5-(3-N-ethylcarbazolyl)-1,3,4-oxadiazole, 2-(4-methoxyphenyl)-5-(3-N-ethylcarbazolyl)-1,3,4-oxadiazole, 2-(4-diethylaminophenyl)-5-(3-N-ethylcarbazolyl)-1,3,4-oxadiazole, 9-(4-diethylaminostyryl)anthracene, 9-(4-diethylaminostyryl-)anthracene, α-(9-anthryl)-β-(3-N-ethylcarbazolyl-)ethylene, 5-methyl-2-(4-diethylaminostyryl)benzoxazole, 9-(4-dibenzylaminobenzylidene)fluorene, N-ethyl-3-(9-fluorenylidene)carbazole, 2,6-bis(4-diethylaminostyryl)pyrydine, methylphenylhydrazono-3-methylidene-9-ethylcarbazole, methylphenylhydrazono-4-methylidene-N,N-diethylaniline, etc. These charge transfer materials may be used singly or in combination with two or more members. The most preferable charge transfer material varies depending on the kinds of disazo pigments used. Although the reason is unknown, the most preferable electrophotographic element is in fact manufactured by combining a certain kind of disazo pigment with a certain kind of charge transfer material.

In this context, it is to be noted that in each of the electrophotograhic elements obtained as aforesaid an adhesive layer or a barrier layer may be interposed between the electrically conductive substrate and the photosensitive layer as occasion demands. The preferred materials for this adhesive or barrier layer include polyamide, nitrocellulose, aluminum oxide and the like, and the preferable thickness of said layer is 1μ or less.

The reproduction using the element of the present invention is achieved by electrifying the surface of the photosensitive layer of the element, exposing the same to light, then developing and, if needed, transferring to paper or the like. The element according to this invention, which is rich in flexibility and is highly sensitive to the visible light region, in particular the short wavelength region, can exhibit a superior reproducibility in the visible light region irrespective of various kinds of light sources to be employed in electrophotographic copying machines, and further the element according to this invention, which as a matter of course can dispense with a filter for cutting off the long wavelength light, is advantageous in that it can enhance the sensitivity of the copying system as a whole and so forth.

BRIEF DESCRIPTION OF THE DRAWINGS

1 . . . an electrically conductive substrate
2,2′,2″ . . . a photosensitive layer
3 . . . a disazo pigment 4 . . . a charge transfer medium
5 . . . a charge carrier generating layer
6 . . . a charge transfer layer

DESCRIPTION OF THE PREFERRED EMBODIMENTS

Example 1

Figure 1:
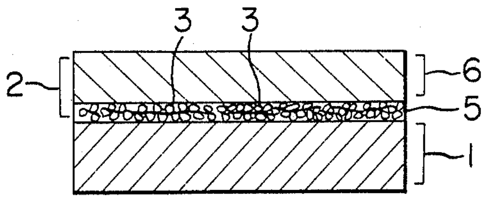
FIGS. 1 to 3 are enlarged cross-sectional views illustrating the constructions of the elements embodying the present invention.

One wt.part of No. II-14 disazo pigment and 66 wt.parts of a 0.5 wt.% tetrahydrofuran solution of polyester resin (vilon 200 available from TOYO BOSEKI K.K.) were pulverized and mixed in a ball mill. The resulting dispersion was coated onto an aluminized polyester film by means of a doctor blade and air-dried to thereby form an about 0.7μ-thick charge carrier generating layer. Then 2 wt.parts of 9-(4-diethylaminostyryl) anthracene (which will be called D-1 hereinafter) and 2 wt.parts of polycarbonate resin (Panlite L available from TEIJIN K.K.) were dissolved in 16 wt.parts of tetrahydrofuran. The resulting solution was coated onto said charge carrier generating layer by means of a doctor blade and the same was dried at 120° C. for 10 minutes, thereby obtaining an about 11μ-thick charge transfer layer. The multilayer type electrophotograhic element illustrated in FIG. 1 was thus prepared.

Next, the surface of the photosensitive layer of this element was subjected to −6 KV corona discharge for 20 seconds by means of a commercially available electrostatic copying paper analyzer tester and charged negatively. Thereafter, the same was let stand in the dark for 20 seconds to thereby measure the surface potential Vpo(volt) at that time. Successively, the photosensitive layer was exposed to radiation of light from a tungsten lamp so that the surface intensity became 20 lux. Then, the time (seconds) required until the surface potential was reduced to ½ of said Vpo was measured and named the half decay exposure time $T\frac{1}{2}$ (second). The results thus obtained showed that Vpo was 950 volts and $T\frac{1}{2}$ was 1.00 seconds.

Furthermore, the surface of the photosensitive layer was likewise charged negatively and let stand in the dark to thereby measure V′po(volt). Successively, the photosensitive layer was exposed to irradiation of light transmitted through a filter which was designed to cut off the passage of 620 nm or more of light, and the time (seconds) required until the surface potential was reduced to ½ of the V′po was measured and named the half decay exposure time $T'\frac{1}{2}$ (second). The results thus obtained showed that V′po was 950 volts and $T'\frac{1}{2}$ was 1.10 seconds.

It is seen from the fact that $T'\frac{1}{2}/T\frac{1}{2}=1.10$ that this element has a superior sensitivity to the short wave length side.

Still further, copying was carried out with this element by means of a commercially available copying machine (P-500 produced by RICOH K.K.) and the image densities of the black image area (Kodak.Gray scale 1.6) and the red image area (Kodak.Color Control Patches, primary red) were measured by means of a Macbeth densitometer:

| | |
|---|---|
| Black image area | 1.0 |
| Red image area | 0.8 |

exhibit an excellent reproducibility in the red image area, too.

Comparative Example 2

A multilayer type electrophotographic element was prepared by repeating the same procedure as Example 1 with the exception that the No. II-14 disazo pigment employed in Example 1 was replaced by the 4',4''-bis[2-hydroxy-3-(2,4-dimethylphenyl)-carbamoyl-1-naphthylazo[-1,4-distyrylbenzene disclosed in Japanese Laid-open patent application No. 37543/1972 and having the following formula:

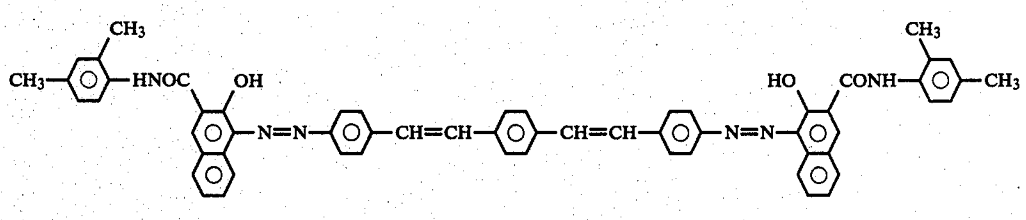

Comparative Example 1

A multilayer type electrophotographic element was prepared by repeating the exactly same procedure as Example 1 with the exception that the No. II-14 disazo pigment employed in Example 1 was replaced by the chlorodiane Blue having the following formula disclosed in Japanese Laid-open patent application No. 37543/1972:

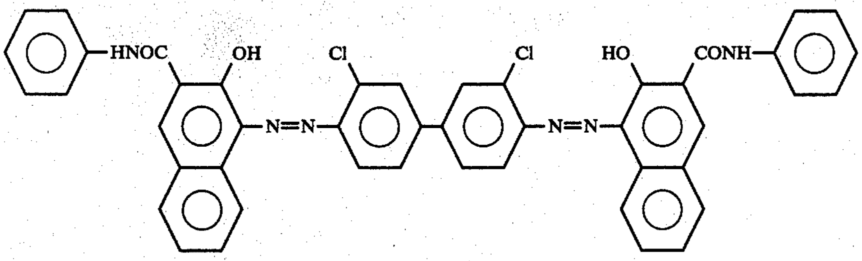

Then, this element was subjected to the same measurement as in Example 1, thereby obtaining the following results:

$V_{po}$ = 1100 volts
$T_{\frac{1}{2}}$ = 1.74 seconds $V_{po}'$ = 1100 volts
$T_{\frac{1}{2}}'$ = 3.20 seconds $T'_{\frac{1}{2}}/T_{\frac{1}{2}}$ = 1.83

The image densities were measured according to the same procedure as Example 1 with the following results:

| | |
|---|---|
| Black image area | 1.1 |
| Red image area | 0.4 |

It can be understood from this fact that the electrophotographic element using the charge carrier generating material according to the present invention can Then, this element was subjected to the same measurement as in Example 1, thereby obtaining the following results:

$V_{po}$ = 1150 volts
$T_{\frac{1}{2}}$ = 0.62 seconds $V_{po}'$ = 1150 volts
$T_{\frac{1}{2}}'$ = 1.16 seconds $T'_{\frac{1}{2}}/T'_{\frac{1}{2}}$ = 1.87

And, the image densities were measured according to the same procedure as Example 1 with the following results:

| | |
|---|---|
| Black image area | 1.2 |
| Red image area | 0.4 |

It can be understood from this fact that the electrophotographic element using the charge carrier generating material according to the present invention can exhibit an excellent reproducibility in the red image area.

Examples 2 to 4

An element was prepared by repeating the same procedure as Example 1 with the exception that the charge transfer material D-1 employed in Example 1 was replaced respectively by 1-Phenyl-3-(4-diethylaminostyryl)-5-(4-diethylaminophenyl) pyrazoline (which will be called D-2 hereinafter), methylphenylhydrazono-3-methylidene-9-ethylcarbazole (which will be called D-3 hereinafter), or 1,1-bis(4-dibenzylaminophenyl)propane (which will be called D-4 hereinafter). The thus obtained element was measured according to the same procedure as Example 1, thereby obtaining the results as shown in Table 1.

TABLE 1

| Example No. | Charge transfer material | Vpo (volt) | T½ (second) | T'½/T½ |
|---|---|---|---|---|
| 2 | D-2 | 420 | 1.41 | 1.05 |
| 3 | D-3 | 510 | 1.13 | 1.10 |
| 4 | D-4 | 980 | 1.72 | 1.10 |

Examples 5 to 192

Elements were prepared by repeating the same procedure as Example 1 with the exception that No. II-14 disazo pigment employed in Example 1 was replaced by the disazo pigments shown in the following Table 2 respectively and D-1, D-2, D-3 or D-4 was used as the charge transfer material. These elements were measured according to the same procedure as Example 1, thereby obtaining the results as shown in Table 2.

TABLE 2

| Example No. | Disazo pigment | Charge transfer material | Vpo (volt) | T½ (second) | T'½/T½ |
|---|---|---|---|---|---|
| 5 | II-1 | D-1 | 960 | 3.10 | 1.07 |
| 6 | | D-2 | 730 | 1.60 | 1.08 |
| 7 | | D-3 | 1110 | 1.91 | 1.07 |
| 8 | | D-4 | 1020 | 4.10 | 1.08 |
| 9 | II-4 | D-1 | 630 | 1.87 | 1.09 |
| 10 | | D-2 | 110 | 2.75 | 1.10 |
| 11 | | D-3 | 580 | 0.82 | 1.07 |
| 12 | | D-4 | 1025 | 2.14 | 1.10 |
| 13 | II-5 | D-1 | 470 | 2.58 | 1.12 |
| 14 | | D-2 | 95 | 1.70 | 1.11 |
| 15 | | D-3 | 450 | 1.47 | 1.10 |
| 16 | | D-4 | 780 | 3.55 | 1.11 |
| 17 | II-7 | D-1 | 720 | 2.14 | 1.09 |
| 18 | | D-2 | 690 | 0.65 | 1.08 |
| 19 | | D-3 | 1140 | 1.45 | 1.08 |
| 20 | | D-4 | 950 | 2.29 | 1.09 |
| 21 | II-8 | D-1 | 1010 | 1.80 | 1.06 |
| 22 | | D-2 | 250 | 1.85 | 1.06 |
| 23 | | D-3 | 950 | 4.75 | 1.05 |
| 24 | | D-4 | 770 | 14.70 | 1.06 |
| 25 | II-10 | D-1 | 950 | 4.03 | 1.10 |
| 26 | | D-2 | 580 | 1.34 | 1.10 |
| 27 | | D-3 | 1200 | 2.54 | 1.09 |
| 28 | | D-4 | 1180 | 5.40 | 1.10 |
| 29 | II-13 | D-1 | 1030 | 2.42 | 1.07 |
| 30 | | D-2 | 150 | 0.92 | 1.05 |
| 31 | | D-3 | 910 | 1.64 | 1.09 |
| 32 | | D-4 | 570 | 4.39 | 1.20 |
| 33 | II-20 | D-1 | 1150 | 1.64 | 1.08 |
| 34 | | D-2 | 90 | 1.55 | 1.08 |
| 35 | | D-3 | 720 | 0.97 | 1.09 |
| 36 | | D-4 | 1290 | 2.29 | 1.10 |
| 37 | II-32 | D-1 | 1110 | 1.25 | 1.39 |
| 38 | | D-2 | 820 | 4.20 | 1.30 |
| 39 | | D-3 | 1210 | 1.01 | 1.31 |
| 40 | | D-4 | 1320 | 5.20 | 1.34 |
| 41 | II-49 | D-1 | 1200 | 3.23 | 1.06 |
| 42 | | D-2 | 450 | 0.97 | 1.07 |
| 43 | | D-3 | 1100 | 2.06 | 1.06 |
| 44 | | D-4 | 1600 | 5.67 | 1.06 |
| 45 | II-50 | D-1 | 920 | 2.69 | 1.12 |
| 46 | | D-2 | 890 | 1.11 | 1.11 |
| 47 | | D-3 | 1210 | 2.50 | 1.12 |
| 48 | | D-4 | 1300 | 5.40 | 1.14 |
| 49 | II-56 | D-1 | 1200 | 7.35 | 1.12 |
| 50 | | D-2 | 910 | 2.31 | 1.10 |
| 51 | | D-3 | 1150 | 5.67 | 1.14 |

TABLE 2-continued

| Example No. | Disazo pigment | Charge transfer material | Vpo (volt) | T½ (second) | T'½/T½ |
|---|---|---|---|---|---|
| 52 | | D-4 | 1150 | 14.70 | 1.13 |
| 53 | III-1 | D-1 | 970 | 1.20 | 1.12 |
| 54 | | D-2 | 250 | 0.71 | 1.13 |
| 55 | | D-3 | 810 | 0.80 | 1.14 |
| 56 | | D-4 | 1210 | 0.88 | 1.12 |
| 57 | III-3 | D-1 | 1010 | 1.91 | 1.10 |
| 58 | | D-2 | 870 | 1.21 | 1.09 |
| 59 | | D-3 | 1150 | 1.41 | 1.11 |
| 60 | | D-4 | 1310 | 4.20 | 1.10 |
| 61 | III-5 | D-1 | 1100 | 1.45 | 1.21 |
| 62 | | D-2 | 720 | 2.01 | 1.20 |
| 63 | | D-3 | 1250 | 1.10 | 1.19 |
| 64 | | D-4 | 1310 | 5.02 | 1.20 |
| 65 | III-8 | D-1 | 1100 | 1.10 | 1.18 |
| 66 | | D-2 | 610 | 0.91 | 1.19 |
| 67 | | D-3 | 920 | 1.41 | 1.18 |
| 68 | | D-4 | 1210 | 4.31 | 1.18 |
| 69 | III-13 | D-1 | 820 | 3.51 | 1.05 |
| 70 | | D-2 | 210 | 1.21 | 1.05 |
| 71 | | D-3 | 1210 | 0.91 | 1.07 |
| 72 | | D-4 | 1100 | 8.50 | 1.05 |
| 73 | III-15 | D-1 | 1250 | 1.31 | 1.09 |
| 74 | | D-2 | 710 | 2.10 | 1.10 |
| 75 | | D-3 | 1120 | 0.91 | 1.09 |
| 76 | | D-4 | 1010 | 11.00 | 1.11 |
| 77 | III-32 | D-1 | 920 | 1.31 | 1.47 |
| 78 | | D-2 | 310 | 3.01 | 1.47 |
| 79 | | D-3 | 980 | 4.21 | 1.50 |
| 80 | | D-4 | 1210 | 9.03 | 1.49 |
| 81 | III-34 | D-1 | 1250 | 1.07 | 1.41 |
| 82 | | D-2 | 900 | 5.30 | 1.40 |
| 83 | | D-3 | 1000 | 1.21 | 1.41 |
| 84 | | D-4 | 1410 | 11.50 | 1.43 |
| 85 | III-46 | D-1 | 1200 | 2.31 | 1.20 |
| 86 | | D-2 | 420 | 4.10 | 1.18 |
| 87 | | D-3 | 580 | 0.81 | 1.21 |
| 88 | | D-4 | 980 | 5.20 | 1.21 |
| 89 | IV-1 | D-1 | 1300 | 4.20 | 1.10 |
| 90 | | D-2 | 870 | 1.58 | 1.09 |
| 91 | | D-3 | 1290 | 2.52 | 1.09 |
| 92 | | D-4 | 1460 | 12.60 | 1.09 |
| 93 | IV-3 | D-1 | 1210 | 2.10 | 1.06 |
| 94 | | D-2 | 1100 | 9.10 | 1.07 |
| 95 | | D-3 | 1300 | 1.72 | 1.06 |
| 96 | | D-4 | 1250 | 21.50 | 1.07 |
| 97 | IV-8 | D-1 | 980 | 3.20 | 1.16 |
| 98 | | D-2 | 230 | 1.20 | 1.15 |
| 99 | | D-3 | 1210 | 2.01 | 1.13 |
| 100 | | D-4 | 900 | 7.10 | 1.15 |
| 101 | IV-15 | D-1 | 1250 | 3.21 | 1.11 |
| 102 | | D-2 | 790 | 8.50 | 1.09 |
| 103 | | D-3 | 1000 | 4.30 | 1.10 |
| 104 | | D-4 | 1190 | 19.01 | 1.10 |
| 1.05 | IV-32 | D-1 | 1000 | 1.21 | 1.51 |
| 106 | | D-2 | 710 | 3.20 | 1.52 |
| 107 | | D-3 | 1040 | 1.02 | 1.52 |
| 108 | | D-4 | 1240 | 4.20 | 1.61 |
| 109 | IV-34 | D-1 | 1150 | 3.21 | 1.30 |
| 110 | | D-2 | 120 | 5.30 | 1.29 |
| 111 | | D-3 | 990 | 1.01 | 1.29 |
| 112 | | D-4 | 1210 | 21.01 | 1.29 |
| 113 | IV-46 | D-1 | 1120 | 1.35 | 1.12 |
| 114 | | D-2 | 420 | 4.20 | 1.13 |
| 115 | | D-3 | 720 | 0.98 | 1.12 |
| 116 | | D-4 | 1210 | 21.01 | 1.12 |
| 117 | V-1 | D-1 | 1040 | 5.04 | 1.06 |
| 118 | | D-2 | 400 | 1.93 | 1.07 |
| 119 | | D-3 | 920 | 3.05 | 1.06 |
| 120 | | D-4 | 1200 | 9.45 | 1.06 |
| 121 | V-4 | D-1 | 980 | 1.75 | 1.11 |
| 122 | | D-2 | 110 | 0.98 | 1.10 |
| 123 | | D-3 | 1100 | 8.51 | 1.12 |
| 124 | | D-4 | 1210 | 21.30 | 1.11 |
| 125 | V-5 | D-1 | 1120 | 1.80 | 1.06 |
| 126 | | D-2 | 120 | 3.21 | 1.07 |
| 127 | | D-3 | 1320 | 4.50 | 1.06 |
| 128 | | D-4 | 1100 | 13.20 | 1.07 |
| 129 | V-7 | D-1 | 980 | 1.75 | 1.10 |
| 130 | | D-2 | 210 | 4.21 | 1.11 |

TABLE 2-continued

| Example No. | Disazo pigment | Charge transfer material | Vpo (volt) | $T\frac{1}{2}$ (second) | $T'\frac{1}{2}/T\frac{1}{2}$ |
|---|---|---|---|---|---|
| 131 | | D-3 | 970 | 2.10 | 1.09 |
| 132 | | D-4 | 1050 | 31.00 | 1.10 |
| 133 | V-15 | D-1 | 1290 | 7.20 | 1.06 |
| 134 | | D-2 | 820 | 11.00 | 1.07 |
| 135 | | D-3 | 1020 | 6.52 | 1.08 |
| 136 | | D-4 | 1510 | 10.91 | 1.08 |
| 137 | V-35 | D-1 | 930 | 1.81 | 1.17 |
| 138 | | D-2 | 325 | 3.20 | 1.15 |
| 139 | | D-3 | 1080 | 2.02 | 1.17 |
| 140 | | D-4 | 990 | 9.50 | 1.16 |
| 141 | VI-1 | D-1 | 1000 | 7.77 | 1.02 |
| 142 | | D-2 | 590 | 2.52 | 1.02 |
| 143 | | D-3 | 1010 | 5.25 | 1.02 |
| 144 | | D-4 | 1270 | 13.44 | 1.03 |
| 145 | VI-5 | D-1 | 1090 | 1.60 | 1.06 |
| 146 | | D-2 | 110 | 2.31 | 1.08 |
| 147 | | D-3 | 1110 | 1.91 | 1.07 |
| 148 | | D-4 | 1310 | 9.20 | 1.06 |
| 149 | VI-6 | D-1 | 780 | 1.42 | 1.08 |
| 150 | | D-2 | 430 | 5.10 | 1.08 |
| 151 | | D-3 | 970 | 1.87 | 1.09 |
| 152 | | D-4 | 1150 | 12.01 | 1.08 |
| 153 | VI-7 | D-1 | 990 | 2.31 | 1.08 |
| 154 | | D-2 | 120 | 1.01 | 1.08 |
| 155 | | D-3 | 1020 | 1.92 | 1.10 |
| 156 | | D-4 | 1180 | 7.53 | 1.09 |
| 157 | VI-17 | D-1 | 980 | 4.21 | 1.05 |
| 158 | | D-2 | 580 | 7.20 | 1.04 |
| 159 | | D-3 | 900 | 3.10 | 1.05 |
| 160 | | D-4 | 1210 | 23.01 | 1.05 |
| 161 | VI-19 | D-1 | 1150 | 3.62 | 1.18 |
| 162 | | D-2 | 620 | 6.81 | 1.20 |
| 163 | | D-3 | 970 | 7.50 | 1.17 |
| 164 | | D-4 | 1180 | 9.30 | 1.17 |
| 165 | VII-1 | D-1 | 1230 | 12.60 | 1.07 |
| 166 | | D-2 | 1280 | 6.30 | 1.07 |
| 167 | | D-3 | 1150 | 7.98 | 1.08 |
| 168 | | D-4 | 1210 | 16.80 | 1.07 |
| 169 | VII-4 | D-1 | 1120 | 5.71 | 1.12 |
| 170 | | D-2 | 920 | 2.31 | 1.09 |
| 171 | | D-3 | 990 | 1.90 | 1.10 |
| 172 | | D-4 | 1320 | 12.00 | 1.12 |
| 173 | VII-5 | D-1 | 1250 | 2.50 | 1.09 |
| 174 | | D-2 | 530 | 3.50 | 1.10 |
| 175 | | D-3 | 970 | 7.31 | 1.09 |
| 176 | | D-4 | 1280 | 11.10 | 1.10 |
| 177 | VII-7 | D-1 | 1130 | 4.31 | 1.09 |
| 178 | | D-2 | 750 | 1.98 | 1.10 |
| 179 | | D-3 | 1200 | 5.31 | 1.07 |
| 180 | | D-4 | 1200 | 21.00 | 1.09 |
| 181 | VII-8 | D-1 | 1250 | 1.90 | 1.05 |
| 182 | | D-2 | 1120 | 11.20 | 1.07 |
| 183 | | D-3 | 1100 | 2.80 | 1.09 |
| 184 | | D-4 | 1480 | 5.11 | 1.05 |
| 185 | VII-13 | D-1 | 1350 | 9.20 | 1.07 |
| 186 | | D-2 | 730 | 2.81 | 1.04 |
| 187 | | D-3 | 970 | 2.51 | 1.04 |
| 188 | | D-4 | 1320 | 21.02 | 1.06 |
| 189 | VII-34 | D-1 | 1000 | 2.80 | 1.22 |
| 190 | | D-2 | 1080 | 17.50 | 1.20 |
| 191 | | D-3 | 730 | 3.01 | 1.19 |
| 192 | | D-4 | 1410 | 24.10 | 1.20 |

Example 193

10 wt. parts of polyester resin (the same one as employed in Example 1), 10 wt. parts of 2,5-Bis(4-diethylaminophenyl)-1,3,4-oxadiazole, 2 wt. parts of No. III-3 disazo pigment and 108 wt. parts of tetrahydrofuran were pulverized and mixed in a ball mill. The thus obtained dispersion was coated onto an aluminized polyester film by means of a doctor blade, and the same was dried at 120° C. for 10 minutes, thereby forming a 21μ-thick photosensitive layer. An element of the type illustrated in FIG. 2 was thus prepared. The thus obtained element was measured according to the same procedure as Example 1 with the exception that said element was subjected to +6 KV corona discharge, thereby obtaining the following values.

Vpo=1100 volts
$T\frac{1}{2}$=3.15 seconds
$T'\frac{1}{2}/T\frac{1}{2}$=1.07

Examples 194 to 205

Figure 2:
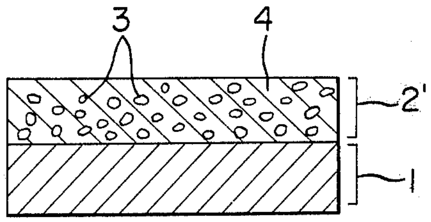

Elements of the type illustrated in FIG. 2 were prepared in accordance with the same procedure as Example 193 with the exception that No. III-3 disazo pigment was replaced by disazo pigments numbered as shown in the following Table 3. Each element was measured in respect of Vpo, $T\frac{1}{2}$ and $T'\frac{1}{2}/T\frac{1}{2}$ according to the same procedure as described previously, thereby obtaining the results as shown in Table 3.

TABLE 3

| Example No. | Disazo pigment No. | Vpo (volt) | $T\frac{1}{2}$ (second) | $T'\frac{1}{2}/T\frac{1}{2}$ |
|---|---|---|---|---|
| 194 | II-5 | 1120 | 3.10 | 1.10 |
| 195 | II-14 | 1310 | 20.10 | 1.03 |
| 196 | II-50 | 980 | 1.90 | 1.09 |
| 197 | III-1 | 1290 | 8.02 | 1.10 |
| 198 | III-15 | 1100 | 5.50 | 1.21 |
| 199 | IV-3 | 1410 | 11.20 | 1.09 |
| 200 | IV-5 | 1020 | 9.10 | 1.04 |
| 201 | V-1 | 1290 | 9.20 | 1.07 |
| 202 | V-8 | 1300 | 11.30 | 1.10 |
| 203 | VI-1 | 1420 | 13.90 | 1.02 |
| 204 | VI-27 | 1120 | 10.50 | 1.08 |
| 205 | VII-1 | 1240 | 11.10 | 1.02 |

Example 206

1 wt. part of polyester resin (the same one as employed in Example 1), 1 wt. part of No. II-50 disazo pigment, and 26 wt. parts of tetrahydrofuran were pulverized and mixed in a ball mill. The thus obtained dispersion was coated onto an aluminized polyester film by means of a doctor blade, and the same was dried at 100° C. for 10 minutes, thereby obtaining a 7μ-thick photosensitive layer. An element of the type illustrated in FIG. 3 was thus prepared. The thus obtained element was measured in accordance with the same procedure as Example 1 with the exception that said element was subjected to +6 KV corona discharge, whereby the following values were obtained in respect of Vpo, $T\frac{1}{2}$ and $T'\frac{1}{2}/T\frac{1}{2}$:

Vpo=180 volts
$T\frac{1}{2}$=4.59 second
$T'\frac{1}{2}/T\frac{1}{2}$=1.09

Examples 207 to 218

Figure 3:
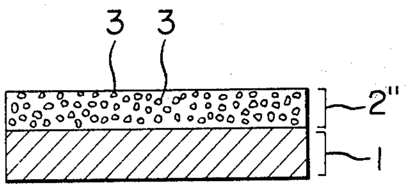

Elements of the type illustrated in FIG. 3 were prepared in accordance with the same procedure as Example 206 with the exception that the disazo pigments numbered in the following Table-4 were employed in place of No. II-50 disazo pigment. Each element was measured in respect of Vpo, $T\frac{1}{2}$ and $T'\frac{1}{2}/T\frac{1}{2}$ according to the same procedure as described previously, whereby the results as shown in Table 4 were obtained.

TABLE 4

| Example No. | Disazo pigment No. | Vpo (volt) | $T\frac{1}{2}$ (second) | $T'\frac{1}{2}/T\frac{1}{2}$ |
|---|---|---|---|---|
| 207 | II-4 | 150 | 6.30 | 1.11 |
| 208 | II-14 | 120 | 14.70 | 1.09 |
| 209 | II-50 | 180 | 4.55 | 1.14 |
| 210 | III-1 | 165 | 1.09 | 1.11 |

TABLE 4-continued

| Example No. | Disazo pigment No. | Vpo (volt) | $T_{\frac{1}{2}}$ (second) | $T'_{\frac{1}{2}}/T_{\frac{1}{2}}$ |
|---|---|---|---|---|
| 211 | III-13 | 170 | 2.80 | 1.07 |
| 212 | IV-1 | 125 | 21.00 | 1.10 |
| 213 | IV-19 | 190 | 14.50 | 1.05 |
| 214 | V-1 | 145 | 22.50 | 1.08 |
| 215 | V-9 | 230 | 11.05 | 1.03 |
| 216 | VI-1 | 340 | 23.01 | 1.02 |
| 217 | VI-10 | 520 | 21.05 | 1.10 |
| 218 | VII-1 | 215 | 30.00 | 1.02 |

Example 219

A charge carrier generating layer was formed on an aluminized polyester film in accordance with the same procedure as Example 1 with the exception that No. II-14 disazo pigment was replaced by No. III-1 diazo pigment. By using the thus formed charge carrier generating layer as the measuring sample, a spectroscopic reflection spectrum was obtained by means of a color analyzer 607 type available from HITACHI K.K. It was observed from the thus obtained spectrum (see FIG. 4) that No. III-1 disazo pigment had an absorption edge of 635 nm.

Comparative Example 3

A measuring sample was prepared by repeating the exactly same procedure as Example 219 with the exception that 4′,4″-bis(2-hydroxy-3-phenylcarbamoyl-1-naphthylazo)-1,4-distyrylbenzene disclosed in Japanese Laid-open Patent Application No. 133445/1978 and represented by the following formula:

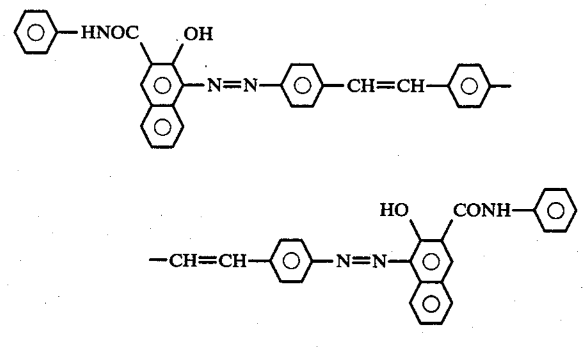

was employed in place of No. III-1 disazo pigment. The thus prepared sample was measured. It was observed from the obtained spectrum (see FIG. 4) that said sample had an absorption edge of 696 nm.

Examples 220 to 224

Measuring samples were prepared in accordance with the same procedure as Example 219 with the exception that the disazo pigments as shown in Table-5 were employed in place of No. III-1 disazo pigment. The absorption edge values of these samples were measured from their spectroscopic reflection spectrums respectively. The obtained absorption edge results are as shown in Table 5.

Figure 4:
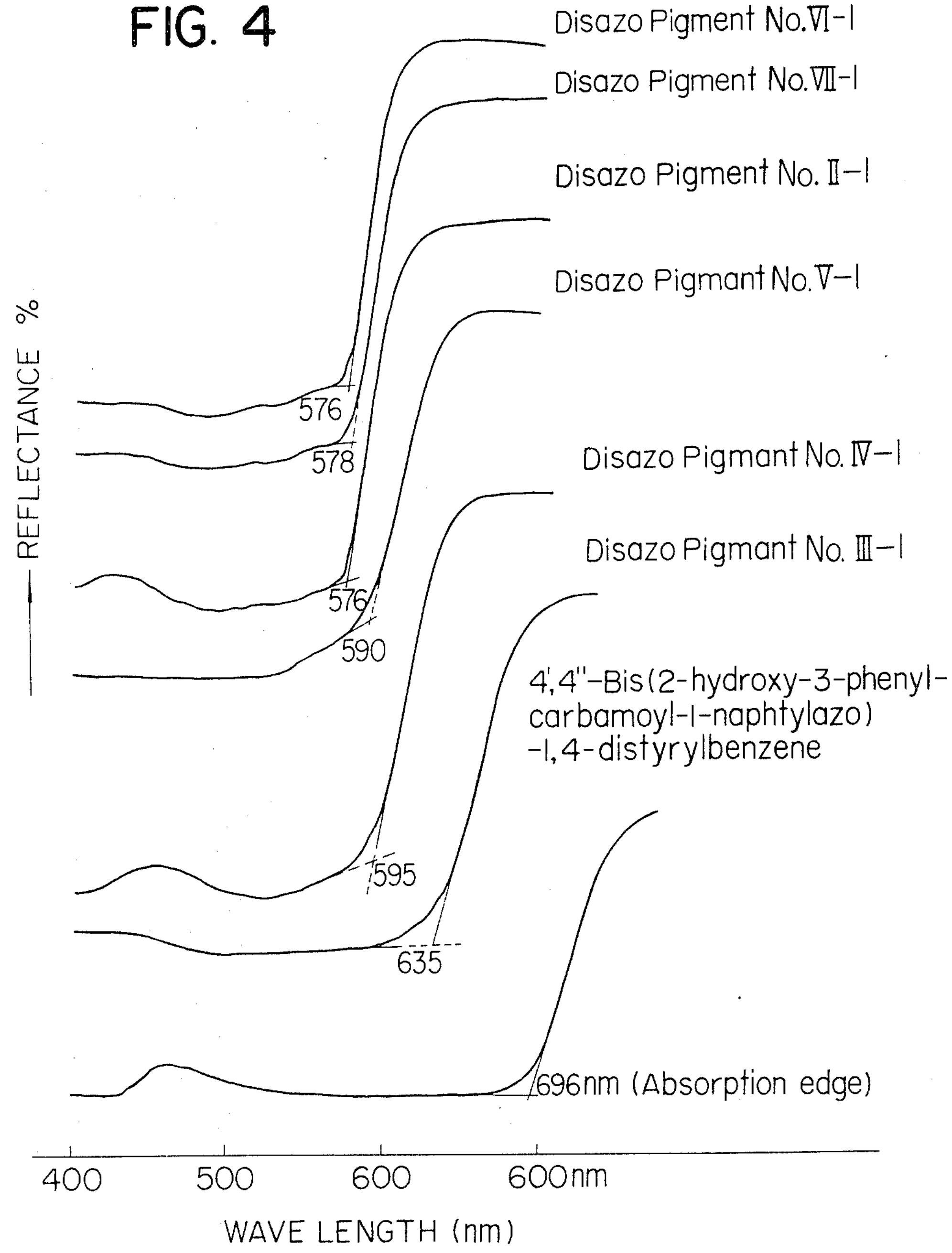
FIG. 4 is a spectroscopic reflection spectrum of disazo pigments according to the present invention and the control disazo pigment. In this view, the ordinate denotes their reflection factors. In this connection, it is to be understood that their spectrum curves are shown in a shifted manner from the necessity of placing seven spectrum curves in the same view.
Figure 4:
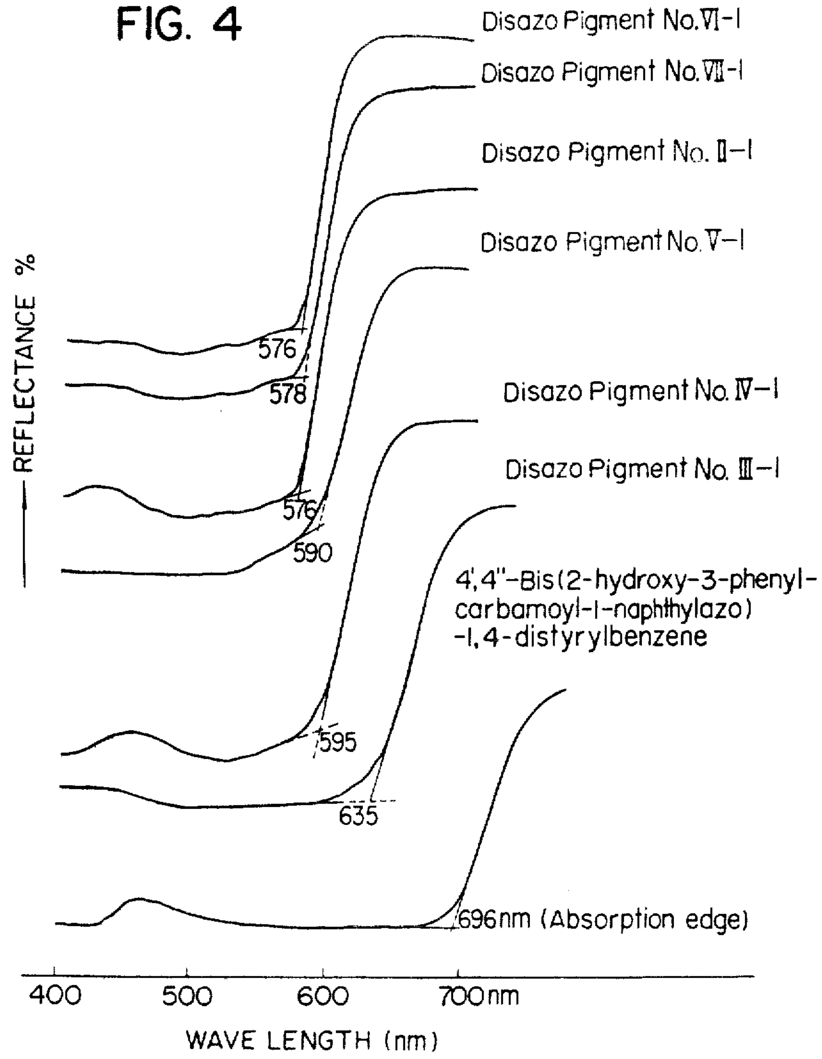

In this connection, it is to be noted that the aforesaid spectrums are shown in FIG. 4.

TABLE 5

| Example No. | Disazo pigment No. | Absorption edge (nm) |
|---|---|---|
| 220 | IV-1 | 595 |
| 221 | V-1 | 590 |
| 222 | II-1 | 576 |
| 223 | VII-1 | 578 |
| 224 | VI-1 | 576 |

As the results of Examples 219 to 224 and Comparative Example 3 clearly show, the absorption edges of the disazo pigments having the following general formula tend to shift depending on the bonding modes of phenylene groups $Ar^1$ and $Ar^2$:

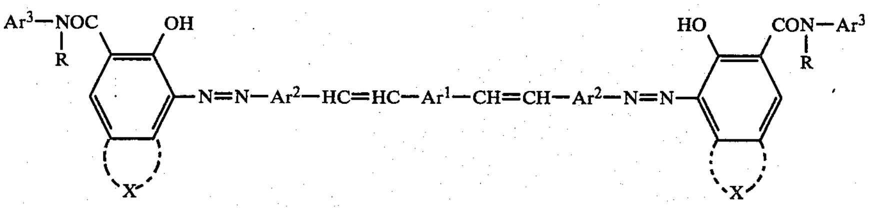

(wherein $Ar^1$ and $Ar^2$ can each represent a phenylene group; X can represent aromatic rings such as benzene ring, naphthalene ring and the like, hetero rings such as indole ring, carbazole ring, benzofuran ring and the like or their substitution products; $Ar^3$ can represent aromatic rings such as benzene ring, naphthalene ring, hetero rings such as dibenzofuran ring and the like or their substitution products; and R can represent a hydrogen atom, a lower alkyl group, phenyl group or its substitution product.)

In this connection, it can be seen that the absorption edges of the disazo pigments employed in the present invention shift to the short wavelength side as compared with the 4′,4″-bis(2-hydroxy-3-phenylcarbamoyl-1-naphthylazo)-1,4-distyrylbenzene wherein both $Ar^1$ and $Ar^2$ are 1,4-phenylene groups.

It is to be understood that the element according to this invention, which is highly sensitive to the visible light region, in particular the short wavelength region, can exhibit a superior reproducibility in the visible region irrespective of various kinds of light sources to be employed in electrophotographic copying machines, and further the element according to this invention, which as a matter of course can dispense with a filter for cutting off the long wavelength light, is advantageous in that it can enhance the sensitivity of the copying system as a whole and so forth.

What is claimed is:

1. An electrophotographic element comprising an electrically conductive substrate; a charge carrier generating layer of a thickness in the range of 0.01 to 5 microns containing 30% or more by weight of at least one disazo pigment having the formula (I):

(I)

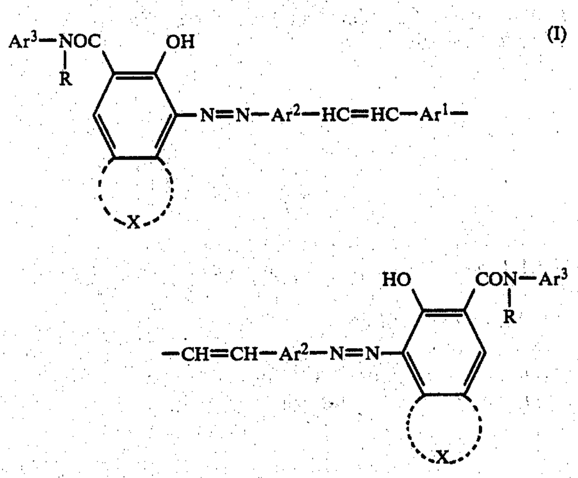

wherein $Ar^1$ and $Ar^2$ are phenylene, with the provisos that (1) when $Ar^1$ is 1,4-phenylene, $Ar^2$ is 1,2- or 1,3-phenylene, (2) when $Ar^1$ is 1,3-phenylene, $Ar^2$ is 1,2-, 1,3- or 1,4-phenylene, and (3) when $Ar^1$ is 1,2-phenylene, $Ar^2$ is 1,3-phenylene, X is selected from the group consisting of substituted or unsubstituted aromatic rings, indole, carbazole, or benzofuran, $Ar^3$ is selected from the group consisting of substituted or unsubstituted aromatic rings, carbazole, or dibenzofuran, and R is hydrogen, lower alkyl, or substituted or unsubstituted phenyl; and a charge transfer layer of a thickness in the range of 3 to 50 microns containing 10 to 95 percent by weight of a charge transfer material and a binder, said charge carrier generating layer and said charge transfer layer being superposed on said substrate.

2. An electrophotographic element as claimed in claim 1 wherein said charge carrier generating layer is interposed between said charge transfer layer and said electrically conductive substrate, said charge transfer layer forming an exposed surface.

3. An electrophotographic element as claimed in claim 1 wherein the film thickness of said charge carrier generating layer is in the range of from 0.05 to 2 microns and the film thickness of said charge transfer layer is in the range of from 5 to 20 microns.

4. An electrophotographic element comprising an electrically conductive substrate and a photosensitive layer superposed thereon, said photosensitive layer having a thickness in the range of 3 to 50 microns and containing less than 50% by weight of at least one disazo pigment having the formula (I):

(I)

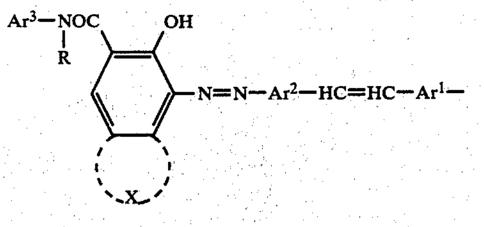

-continued

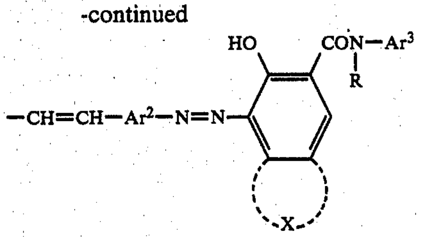

wherein $Ar^1$ and $Ar^2$ are phenylene, with the provisos that (1) when $Ar^1$ is 1,4-phenylene, $Ar^2$ is 1,2- or 1,3-phenylene, (2) when $Ar^1$ is 1,3-phenylene, $Ar^2$ is 1,2-, 1,3- or 1,4-phenylene, and (3) when $Ar^1$ is 1,2-phenylene, $Ar^2$ is 1,3-phenylene, X is selected from the group consisting of substituted or unsubstituted aromatic rings, indole, carbazole, or benzofuran, $Ar^3$ is selected from the group consisting of substituted or unsubstituted aromatic rings, carbazole, or dibenzofuran, and R is hydrogen, lower alkyl, or substituted or unsubstituted phenyl, a charge transfer material and a binder.

5. An electrophotographic element comprising an electrically conductive substrate and a photosensitive layer superposed thereon, said photosensitive layer having a thickness in the range of 3 to 50 microns and containing 30 to 70 percent by weight of at least one kind of disazo pigment having the formula (I):

(I)

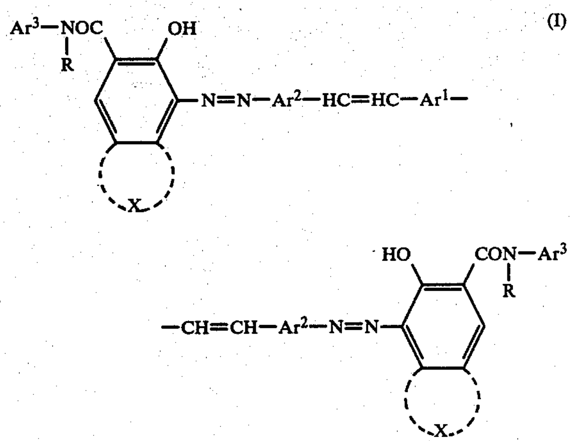

wherein $Ar^1$ and $Ar^2$ are phenylene, with the provisos that (1) when $Ar^1$ is 1,4-phenylene, $Ar^2$ is 1,2- or 1,3-phenylene, (2) when $Ar^1$ is 1,3-phenylene, $Ar^2$ is 1,2-, 1,3- or 1,4-phenylene, and (3) when $Ar^1$ is 1,2-phenylene, $Ar^2$ is 1,3-phenylene, X is selected from the group consisting of substituted or unsubstituted aromatic rings, indole, carbazole, or benzofuran, $Ar^3$ is selected from the group consisting of substituted or unsubstituted aromatic rings, carbazole, or dibenzofuran, and R is hydrogen, lower alkyl, or substituted or unsubstituted phenyl; and a binder.

6. An electrophotograhic element as claimed in claim 1, claim 4 or claim 5 wherein $Ar^1$ is 1,4-phenylene and $Ar^2$ is 1,3-phenylene.

7. An electrophotographic element as claimed in claim 1, claim 4 or claim 5 wherein $Ar^1$ is 1,3-phenylene and $Ar^2$ is 1,4-phenylene.

8. An electrophotographic element as claimed in claim 1, claim 4 or claim 5 wherein $Ar^1$ is 1,4-phenylene and $Ar^2$ is 1,2-phenylene.

9. An electrophotographic element as claimed in claim 1, claim 4 or claim 5 wherein $Ar^1$ is 1,3-phenylene and $Ar^2$ is 1,2-phenylene.

10. An electrophotographic element as claimed in claim 1, claim 4 or claim 5 wherein $Ar^1$ is 1,3-phenylene and $Ar^2$ is 1,3-phenylene.

11. An electrophotographic element as claimed in claim 1, claim 4 or claim 5 wherein $Ar^1$ is 1,2-phenylene and $Ar^2$ is 1,3-phenylene.

12. An electrophotographic element as claimed in claim 1, claim 4 or claim 5 wherein X is a benzene ring, $Ar^3$ is a substituted or non-substituted phenyl and R is hydrogen.

13. An electrophotographic element as claimed in claim 1, claim 4 or claim 5 wherein X is benzene ring, R is hydrogen and $Ar^3$ is

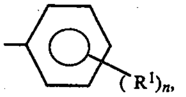

where $R^1$ is selected from the group consisting of lower alkyl, lower alkoxy, halogen and nitro, n is an integer of from 1 to 3, and when n is 2 or 3, the various R groups are the same or different.

14. An electrophotographic element as claimed in claim 1, 4 or 5 wherein the disazo pigment is selected from the group consisting of

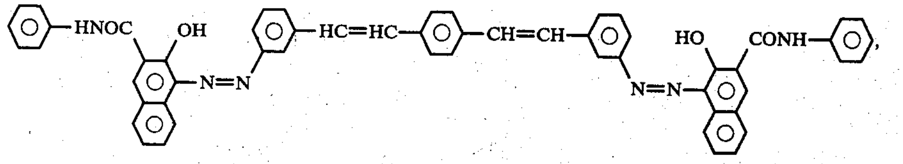

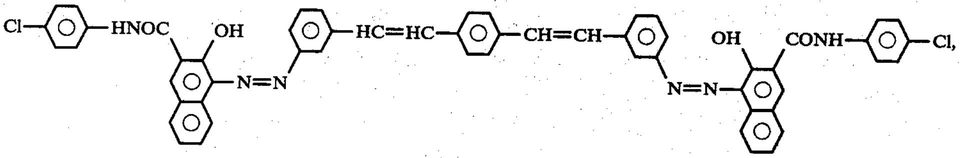

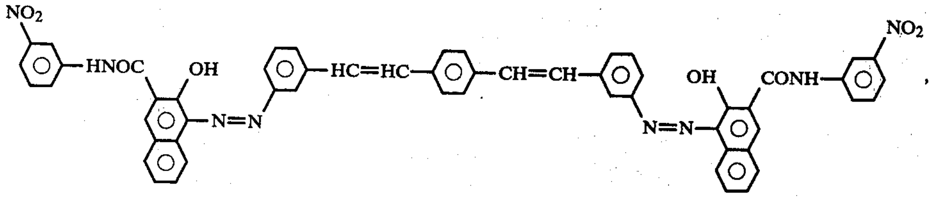

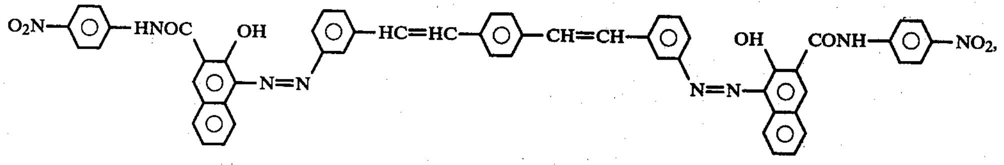

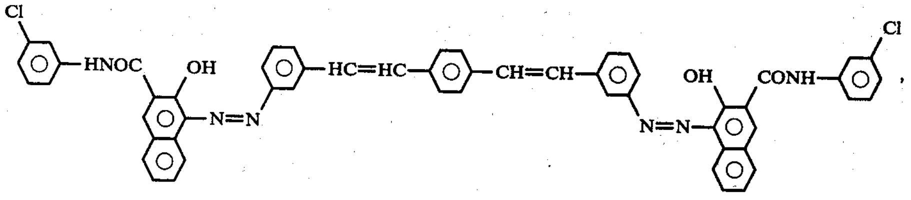

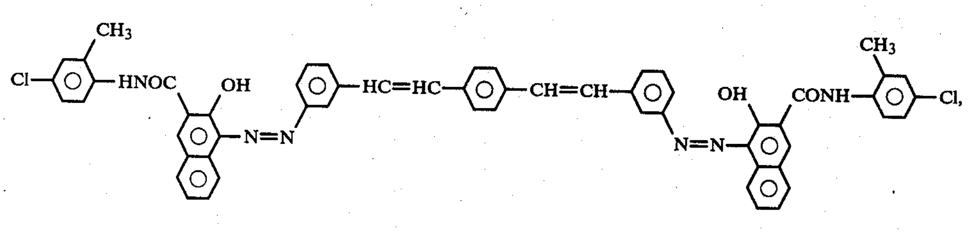

-continued
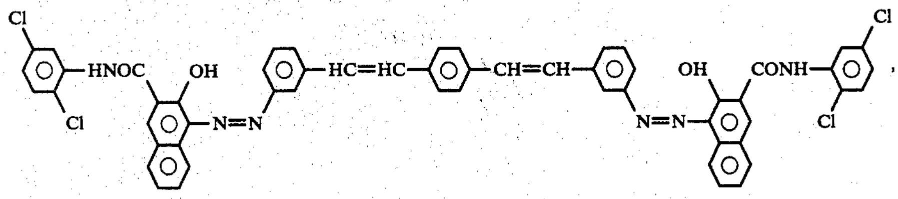
,
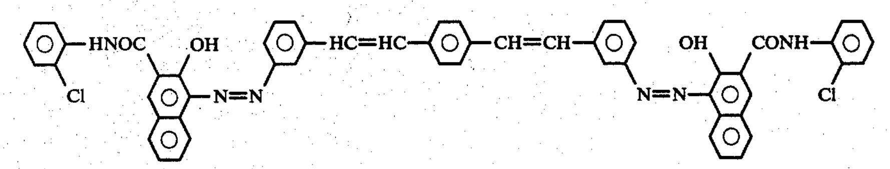
,
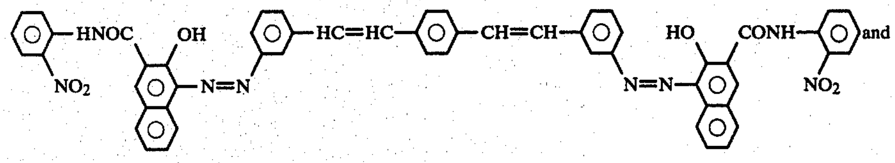
and
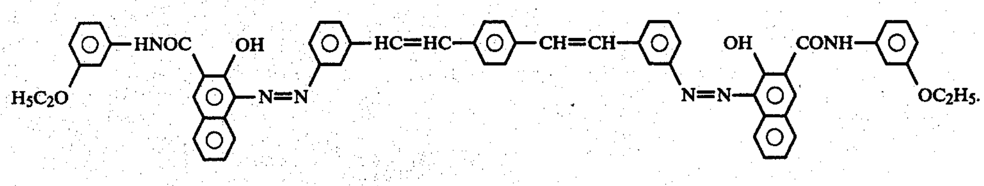
15. An electrophotographic element as claimed in claim 1, 4 or 5 wherein the disazo pigment is selected from the group consisting of
16. An electrophotographic element as claimed in claim 1, 4 or 5 wherein the disazo pigment is selected from the group consisting of
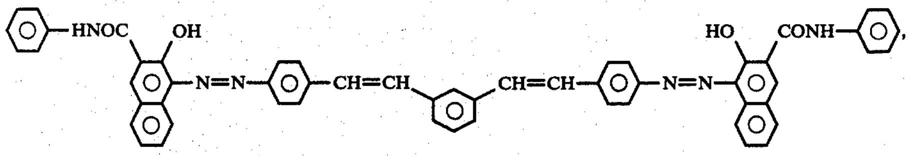
,
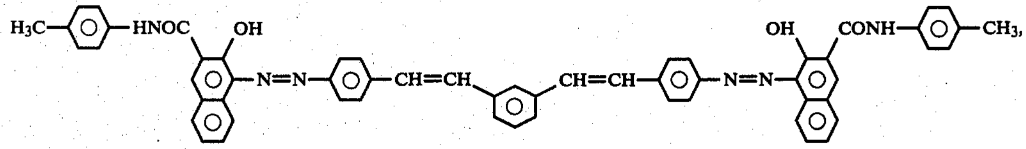
,
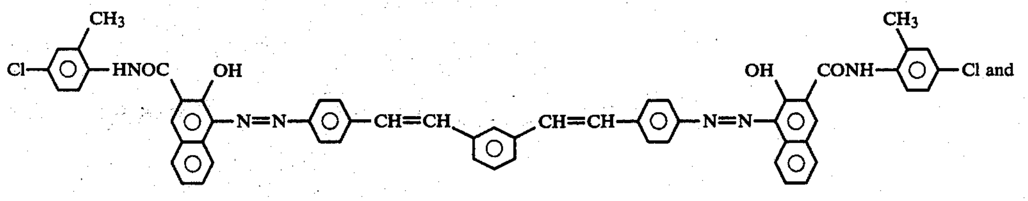
and
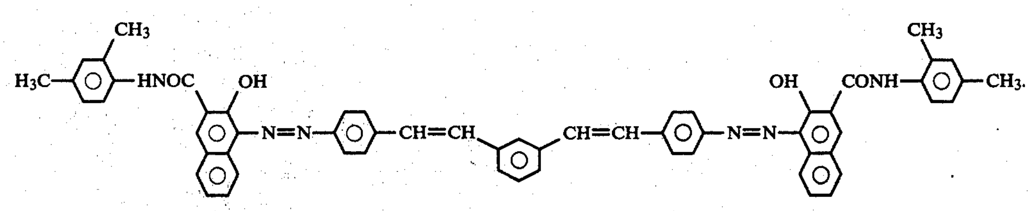

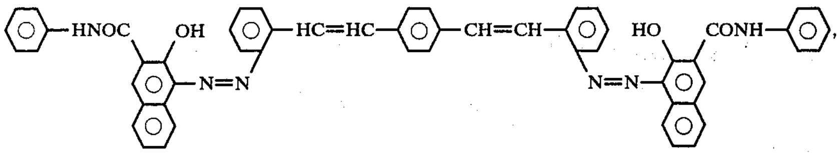
,
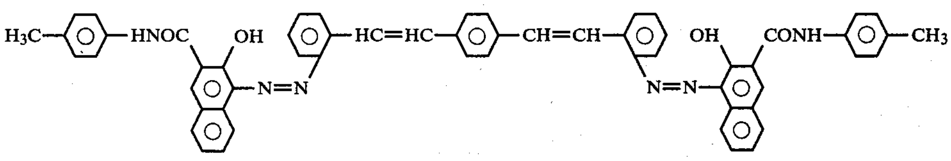
and
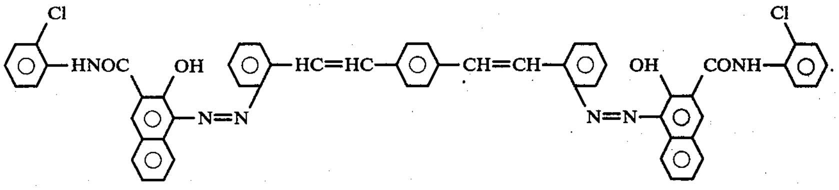
.
17. An electrophotographic element as claimed in claim 1, 4 or 5 wherein the disazo pigment is selected from the group consisting of
18. An electrophotographic element as claimed in claim 1, 4 or 5 wherein the disazo pigment is selected from the group consisting of
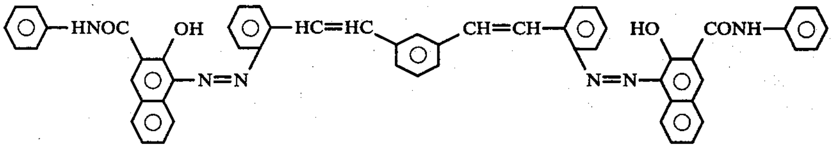
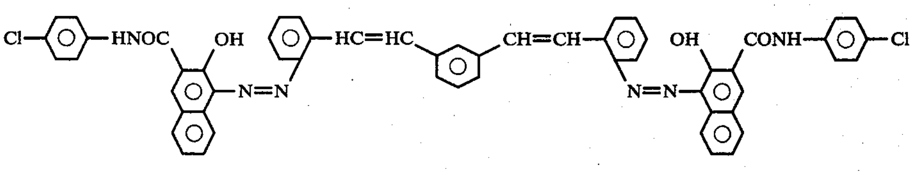
and
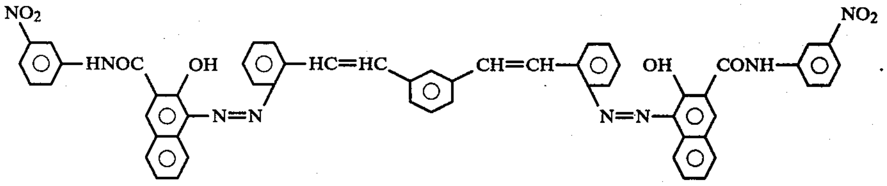
.
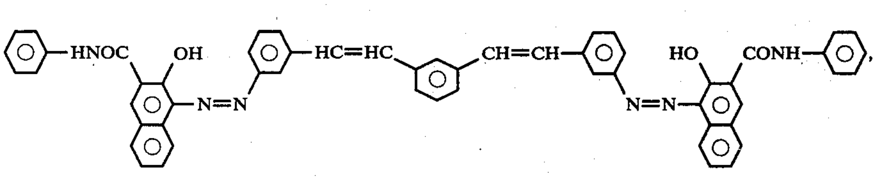
,
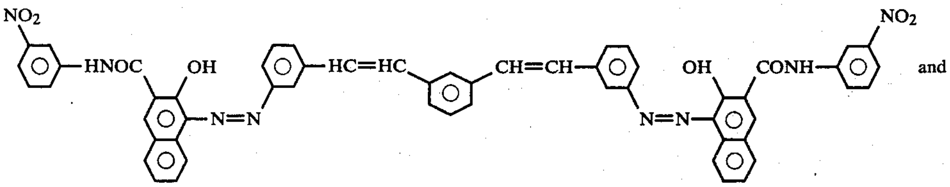
and -continued
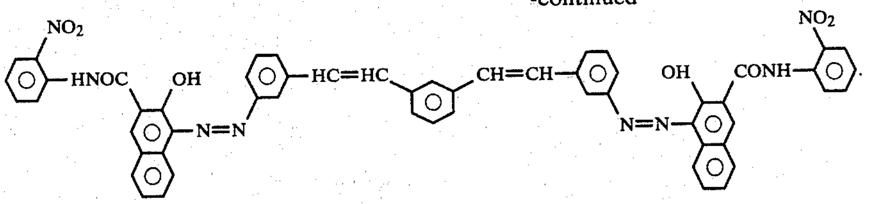
19. An electrophotographic element as claimed in claim 1, 4 or 5 wherein the disazo pigment is selected from the group consisting of
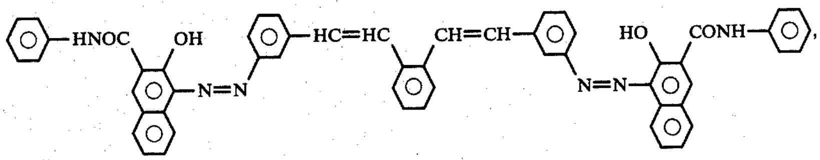
,
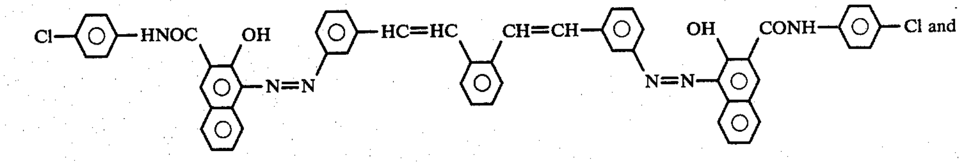
and
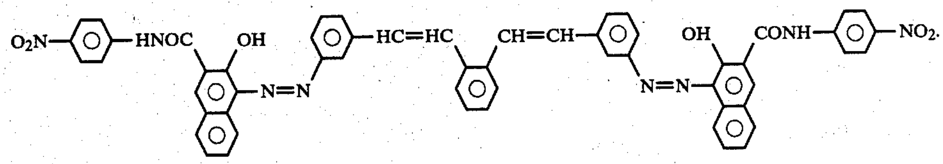
.
* * * * *

UNITED STATES PATENT AND TRADEMARK OFFICE

CERTIFICATE OF CORRECTION

PATENT NO. : 4,349,616

Page 1 of 2

DATED : September 14, 1982

INVENTOR(S) : Masaomi Sasaki

It is certified that error appears in the above-identified patent and that said Letters Patent is hereby corrected as shown below:

The sheet of drawing consisting of Figure 4 should be deleted to appear as per attached sheet.

Signed and Sealed this

*Nineteenth* Day of *April 1983*

[SEAL]

*Attest:*

GERALD J. MOSSINGHOFF

*Attesting Officer* *Commissioner of Patents and Trademarks*